United States Patent
Fernandez

(10) Patent No.: US 8,902,105 B2
(45) Date of Patent: Dec. 2, 2014

(54) METHOD AND APPARATUS FOR DETERMINING AN INTEGRITY INDICATING PARAMETER INDICATING THE INTEGRITY OF POSITIONING INFORMATION DETERMINED IN A GOBAL POSITIONING SYSTEM

(75) Inventor: Francisco Amarillo Fernandez, Madrid (ES)

(73) Assignee: European Space Agency, Paris (FR)

( * ) Notice: Subject to any disclaimer, the term of this patent is extended or adjusted under 35 U.S.C. 154(b) by 376 days.

(21) Appl. No.: 13/295,646

(22) Filed: Nov. 14, 2011

(65) Prior Publication Data
US 2012/0146851 A1  Jun. 14, 2012

(30) Foreign Application Priority Data
Dec. 1, 2010  (EP) .................................. 10193395

(51) Int. Cl.
 G01S 19/20  (2010.01)
 G01S 19/02  (2010.01)
 G01S 19/08  (2010.01)
(52) U.S. Cl.
 CPC .............. G01S 19/02 (2013.01); G01S 19/20 (2013.01); *G01S 19/08* (2013.01)
 USPC .................................................. 342/357.58
(58) Field of Classification Search
 USPC ........................ 342/357.58, 357.45, 357.75
 See application file for complete search history.

(56) References Cited

U.S. PATENT DOCUMENTS

| | | | |
|---|---|---|---|
| 8,570,217 B2 * | 10/2013 | Oehler | 342/357.58 |
| 2008/0288167 A1 * | 11/2008 | Trautenberg et al. | 701/214 |
| 2009/0043503 A1 * | 2/2009 | Trautenberg | 701/213 |
| 2010/0289696 A1 * | 11/2010 | Krueger et al. | 342/357.58 |

FOREIGN PATENT DOCUMENTS

| | | |
|---|---|---|
| EP | 1 832 891 A1 | 9/2007 |
| EP | 1 965 219 A1 | 9/2008 |
| WO | WO 2006/032422 AI | 3/2006 |

OTHER PUBLICATIONS

Oehler, V. et al., "The Galileo Integrity Concept," *Ion GNSS 17th International Technical Meeting of the Satellite Division*, Sep. 21-24, 2004, pp. 604-615.

* cited by examiner

*Primary Examiner* — Harry Liu
(74) *Attorney, Agent, or Firm* — Oliff PLC

(57) ABSTRACT

The present invention relates to a method and an apparatus for determining an integrity indicating parameter (e.g. an integrity risk IR or a protection level PL) indicating the integrity of positioning information determined from positioning information signals disseminated from a plurality of space vehicles SAT1, SAT2, SAT3 of a global positioning system. An input parameter (e.g. an alert limit AL or an integrity risk IR) is provided, a plurality of integrity information parameters ($\sigma_{SISA}$, $\sigma_{SISMA}$ or equivalent, $\sigma_X$, $k_X$) are received, and the integrity indicating parameter (IR; PL) is determined on the basis of the input parameter (AL; IR) and on the basis of a first relation between the integrity indicating parameter (IR; PL) and the input parameter (AL; IR) and the plurality of integrity information parameters ($\sigma_{SISA}$, $\sigma_{SISMA}$ or equivalent, $\sigma_X$, $k_X$).

14 Claims, 19 Drawing Sheets

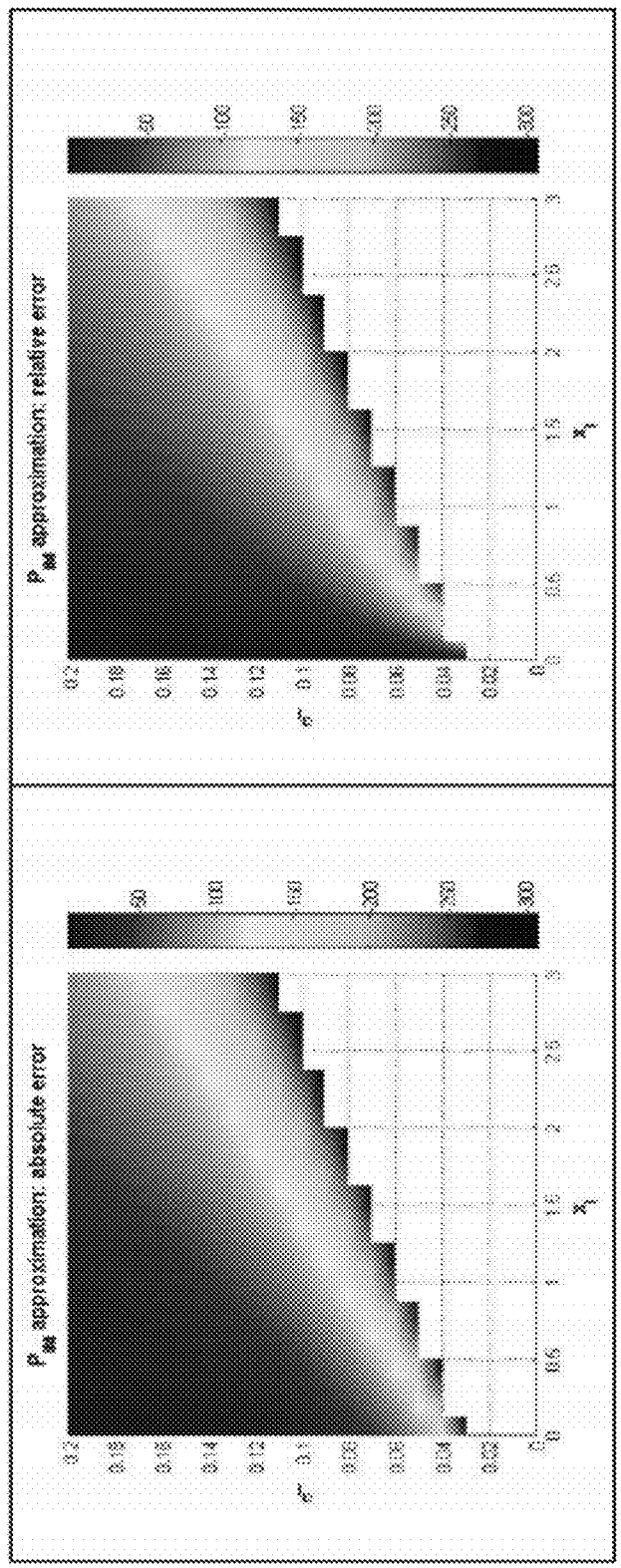
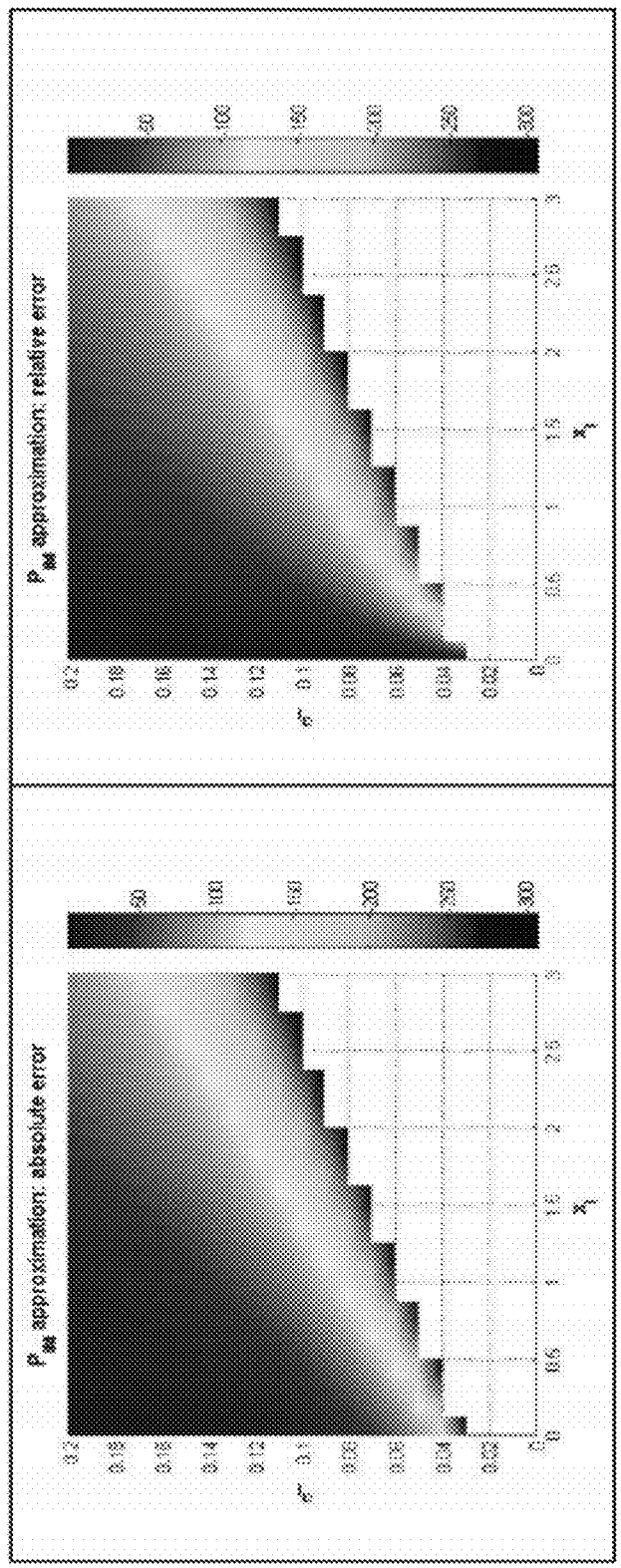
Fig. 18B
Fig. 18A

METHOD AND APPARATUS FOR DETERMINING AN INTEGRITY INDICATING PARAMETER INDICATING THE INTEGRITY OF POSITIONING INFORMATION DETERMINED IN A GOBAL POSITIONING SYSTEM

FIELD OF THE INVENTION

A first aspect of the present invention relates to a method and an apparatus for determining an integrity indicating parameter (e.g. an integrity risk IR or a protection level PL), which indicates the integrity of positioning information determined from positioning information signals disseminated from a plurality of space vehicles of a global positioning system, the method comprising providing an input parameter (e.g. an alert limit AL for determining an integrity risk IR at the given alert limit AL or an integrity risk IR for determining a protection level PL at the given integrity risk IR), receiving a plurality of integrity information parameters (e.g. parameters such as signal-in-space error related parameters SISA, SISMA etc.), and determining the integrity indicating parameter on the basis of the input parameter and on the basis of a first relation between the integrity indicating parameter and the input parameter and the plurality of integrity information parameters.

A second aspect of the present invention relates to a method and an apparatus for determining an integrity indicating parameter (e.g. an integrity risk IR or a protection level PL) which indicates the integrity of positioning information determined from positioning information signals disseminated from a plurality of space vehicles of a global positioning system in which it is detected if said space vehicles are in a normal condition or in an abnormal condition, wherein only positioning information signals disseminated from space vehicles for which a normal condition is detected are used for said position information determination, the method comprising providing an input parameter (e.g. an alert limit AL for determining an integrity risk IR at the given alert limit AL or an integrity risk IR for determining a protection level PL at the given integrity risk IR), receiving a plurality of integrity information parameters (e.g. parameters such as signal-in-space error related parameters SISA, SISMA etc.), and determining the integrity indicating parameter on the basis of said input parameter and on the basis of a first relation which is a relation between:
- a first probability, the first probability indicating a probability that a positional error of said positioning information determination exceeds an error threshold because of an abnormal condition of a space vehicle which is not detected,
- the error threshold, and
- a plurality of said received integrity information parameters, wherein the first relation is based on a second probability and a third probability, the second probability indicating a probability for the occurrence of a single failure event, the single failure event being defined as an event in which exactly one of the plurality of space vehicles is in an abnormal condition, and the third probability indicating a probability of an impact of the occurrence of said single failure event to the positional error of said positioning information determination.

BACKGROUND OF THE INVENTION

In the field of global positioning systems, the term "integrity" means on the one hand a capability of the global navigation system to warn its users within predetermined time periods if the system or parts of the system, such as e.g. one or more satellites and/or one or more ground stations, should not be relied on, e.g. because of a detected failure thereof, and on the other hand, the term "integrity" is commonly used as a term relating to the trust a user can have with respect to the reliability of the information received from the system or parts of the system, such as e.g. from one or more satellites and/or from one or more ground stations, in particular the accuracy of the information, and/or the reliability of results such as position information determined from the information received from the system.

In known satellite-based global navigation systems such as e.g. GPS and planned satellite-based global navigation systems such as e.g. Galileo, the space vehicles such as e.g. satellites are monitored by themselves and/or by one or more ground stations (also referred to as GSS) in order to detect failure operations of the space vehicles which could affect the accuracy and/or the reliability of the information received from the space vehicles. For example, if it is detected that a specific single satellite is having a failure or cannot provide accurate and/or reliable information for another reason, it is required to issue a warning in case the signals disseminated from this specific satellite (i.e. a single satellite signal), which can be used for navigation and/or determination of a position, contains defects or errors. Such defects may have an influence on the apparent rung length of the signal from the satellite to a receiver and, therefore, may have a strong impact on the accuracy of determined positioning information which is determined from the signals received from the satellites of the global positioning system on the basis of run length of the signal and position of the sending satellite, in this context, also time errors can be considered as run length errors. Such defects or errors are generally referred to as a signal-in-space error (generally abbreviated as SISE). The term "signal-in-space" comes from the task of a global navigation system based on space vehicles, such as e.g. satellites or a satellite navigation system which disseminate signals in space generated at space vehicles to allow a determination of the position of a receiver which receives the signals from the space vehicles.

As mentioned above, the term "integrity" is commonly used in the field space vehicle based global positioning systems (i.e. global navigation systems) and refers to a measure of trust that can be placed by a user or Application in the correctness and reliability of information provided by the navigation system or determined from the information provided by the navigation system. This is necessary since safety-critical applications such as e.g. determining positions in connection with landing and starting of airplanes or other safety-critical applications require an integrity measure in order to be able to determine with which level of confidence the navigation information determined from the signals received from the global positioning systems may be used for the safety-critical application.

The integrity risk IR is defined as a probability that a positional error exceeds a certain tolerance such as a predetermined error magnitude threshold without being detected and without an alert being issued in time (e.g. within a predetermined time period). Such an integrity risk IR is then used by a user or an application as an integrity performance indicator. For example, the user or the application can refrain from using position information determined from signals received from the global positioning system if the determined integrity risk IR is larger than a predetermined integrity risk threshold, where the integrity risk threshold may depend on the requirements of the user and/or the application.

Furthermore, there are known two different scenarios for determining such integrity indicating parameters as the integrity risk IR and/or the protection level PL, wherein the users may either determine the integrity indicating parameter according to a receiver autonomous algorithm (generally referred to RAIM abbreviation for receiver autonomous integrity monitoring), by using external integrity data sources, such as for example the SBAS systems, or by using integrity data which is provided already within the navigation message.

With regard to the above-described different concepts and scenarios for determining integrity indicating parameters, such as the integrity risk IR or the protection level PL, it is to be noted that the existing systems such as GPS (combined with data from SBAS) generally make use of the protection level concept, while the currently planned global positioning system Galileo intends to make use the integrity risk at the alert limit as the integrity indicating parameter. Based on the used concept, different parameters may be required as input parameters. While it is generally possible to estimate the integrity of the system according to both concepts, the results of the different concepts cannot be easily compared directly and it is also preferable to have an algorithm in the future which makes it possible to easily and efficiently calculate both, e.g. protection level as well as the integrity in order to make it advantageously possible to compare results of the different concepts easily.

For the current algorithms discussed for integrity risk determination in the Galileo system, there has been proposed a general algorithm in the article "The Galileo Integrity Concept" by Veit Oehler at al., published in the proceedings of the ION GNSS, 2004; 17$^{th}$ International Technical Meeting of the Satellite Division, Sep. 21-24, 2004, Long Beach, Calif., USA. Regarding the intended Galileo integrity concept as described in the above-mentioned article, please also refer to patent application publication WO 2006/032422 A1 which is directed to the intended Galileo integrity concept as described in the above-mentioned article. According to the Galileo integrity concept, a user can determine an individual integrity risk value by taking into account the received integrity information parameters which comprise the signal-in-space accuracy SISA, the signal-In-space monitoring accuracy SISMA, and the integrity flag IF for each of the space vehicles from which the user receives position information signals for determining a position. It is to be noted that the integrity risk determination algorithm as described in WO 2006/032422 A1 only relates to the determination of an integrity risk IR at a given alert limit AL.

In the following, the currently intended Galileo integrity risk determination concept will be briefly described. For details thereof, please refer to the article "The Galileo Integrity Concept" by Veit Oehler et al, or WO 2006/032422 A1. For the determination of the integrity risk IR at a given alert limit AL, according to the currently planned Galileo integrity concept, there has to be provided integrity information parameters to the user such as the so-called signal-in-space accuracy (abbreviated as SISA), the so-called signal-in-space monitoring accuracy (abbreviated as SISMA), and a so-called integrity flag (the integrity flag for a satellite indicates either "OK" or "not OK"/"don't use" or possibly also "not monitored" for indicating if the signal from a satellite can be used or not)

The signal-in-space accuracy SISA indicates a prediction of a minimum standard deviation of a Gaussian distribution that over-bounds the distribution of the signal-in-space error SISE in case of a fault-free signal-in-space SIS (fault-free indicates that no error and no non-nominal operation such as e.g. a fault condition or failure operation is detected for any of the space vehicles). The signal-in-space monitoring accuracy SISMA corresponds to the minimum standard deviation of a Gaussian distribution which over-bounds the difference between the signal-in-space error SISE, which cannot be measured directly, and the estimated signal-in-space error eSISE, which is estimated from measurements. The integrity flag IF is handled such that the integrity flag for a satellite is set to "not OK" or "don't use" in case the estimated signal-in-space error eSISE for a signal-in-space SIS of a space vehicle is larger than the integrity flag threshold value for this signal-in-space SIS. The integrity flag threshold can be computed from the SISA, SISMA, and a probability of an allowed false alert probability.

According to the Galileo integrity concept as described in WO 2006/032422 A1, an overall integrity risk IR is determined as a sum of various partial integrity risks. First of all, the overall determined integrity risk IR can be separated into two contributions. A first contribution comes from the assumption of an occurrence of a single failure event which is defined as an event in which exactly one of the plurality of space vehicles is in an abnormal condition (i.e. non-nominal condition), also referred to as a faulty condition, in which the signal disseminated from the faulty space vehicle does not exhibit the required accuracy. Partial integrity risks relating to the occurrence of a single space vehicle failure event (also referred to as e.g. a single-SIS fault feared event, a single-SIS event or single-SIS HMI event; HMI for hazardous misleading information) are determined for each available space vehicle (because each available space vehicle could be the faulty space vehicle in a single failure event). Partial integrity risks relating to a single failure event are commonly denoted with a sub-script F such as e.g. $IR_F$. For each space vehicle in each positional domain X (X can be one of the directions of three-dimensional Cartesian or spherical coordinates, or only one of two positional domains such as vertical and horizontal; horizontal including two degrees of freedoms in a horizontal plane).

The integrity risk for the single failure event of a certain space vehicle sat in a certain positional domain X is herein labeled $IR_{sat,F,X}$.

The partial integrity risk $IR_{F,X}$ associated to the occurrence of a single failure event in a certain positional domain X is, then, given by the sum over all available space vehicles (e.g. the number N) used for positioning, i.e. from which space vehicles position information is received and used for the determination of a position, of the partial integrity risks associated to each of these space vehicles in this certain positional domain X as given in formula (1) below;

$$IR_{F,X} = \sum_{sat=1}^{N} IR_{sat,F,X} \qquad (1)$$

Here, the integrity risk $IR_{F,X}$ indicates the integrity risk related to the occurrence of a single failure event in the certain positional domain X obtained by a sum over partial integrity risks $IR_{sat,F,X}$ for each single space vehicle sat. It is to be noted that the sum is determined due to the fact that the integrity risks relate to estimations of probabilities so that the integrity risk $IR_{F,X}$ may be regarded as an estimate of probability that exactly one of the plurality of available space vehicles is in an abnormal or faulty condition and the error exceeds the tolerance in the positional domain X. It is given by the sum of an estimate of the corresponding probability of a single failure event for each of the specific space vehicles sat represented by $IR_{sat,F,X}$.

The overall integrity risk relating to the occurrence of a single failure event is then given by a sum over all positional domains X (here, e.g. for the two positional domains vertical V and horizontal H; horizontal including two degrees of freedom) as illustrated in equation (2):

$$IR_F = \sum_{X=V,H} IR_{F,X} = \sum_{\forall X} \sum_{sat=1}^{N} IR_{sat,F,X} \quad (2)$$

For the determination of the overall integrity received IR, there is further considered a second contribution relating to a so-called "fault-free" feared event which corresponds to the assumption that non of the plurality of space vehicles is in a abnormal or faulty condition so that there is no single failure event, however, the small errors or error-fluctuations of the signals disseminated by the plurality of space vehicles still statistically lead to an overall positional error in the position determination based on the position information received from the plurality of space vehicles that exceeds a certain tolerance.

Also in this case, especially since there is no single failure event, no alarm of alert would be issued although the overall positional error exceeds the tolerance. For this reason, such a failure-free event is also considered in the integrity risk determination and contributes to the overall integrity risk to be determined. Integrity risk parameters relating to the assumption of a fault free event are generally labeled with the subscript N for nominal or normal such as e.g. $IR_N$. In general, there can also be determined a partial integrity risk relating to the fault-free event for each different positional domain X, which is generally labeled as $IR_{N,X}$. Then, the overall integrity risk $IR_N$ relating to the fault-free condition is given by the sum over all integrity risks $IR_{N,X}$ for each positional domain X. Here, as well as above in formula (2), the positional domains X can be, for example vertical V and horizontal H or also the three positional domains such as Cartesian coordinates x, y, z or spherical coordinates. Here, z of the Cartesian coordinates or the radial component of the spherical coordinates may correspond to the single degree of freedom corresponding to vertical V domain and x, y of the Cartesian coordinates or the two angular components of the spherical coordinates (such as e.g. longitude and latitude) may correspond to the two degrees of freedom of the horizontal positional domain H. However, it is to be noted that WO 2006/032422 A1 only considers an algorithm for two positional domains vertical V and horizontal H. Integrity risk determination in three one-dimensional positional domains is not considered in WO 2006/032422 A1.

The overall integrity risk IR is, then, determined by the sum of the integrity risks $IR_F$ relating to the single failure condition, and $IR_N$ relating to the fault-free condition.

For example, the following equation (3) shows the formula for the calculation of the overall integrity risk IR according to the basic Galileo integrity concept as described in the above mentioned article and WO 2006/032422 A1. Here, the integrity risk IR is labeled as $P_{HMI}$ for indicating that it relates to an estimate of the probability of the occurrence of hazardous misleading information:

$$P_{HMI}(VAL, HAL) = P_{IntRisk,V} + P_{IntRisk,H} = 1 - \mathrm{erf}\left(\frac{VAL}{\sqrt{2}\,\sigma_{u,V,FF}}\right) + \quad (3)$$

$$e^{-\frac{HAL^2}{2\xi_{FF}^2}} + + \frac{1}{2}\sum_{j=1}^{N_{sat\_Galileo}} P_{fail,sat_j}\left(\left(1 - \mathrm{erf}\left(\frac{VAL+\mu_{u,V}}{\sqrt{2}\,\sigma_{u,V,FM}}\right)\right) + \right.$$

$$\left.\left(1 - \mathrm{erf}\left(\frac{VAL-\mu_{u,V}}{\sqrt{2}\,\sigma_{u,V,FM}}\right)\right)\right) + +$$

$$\sum_{j=1}^{N_{sat\_Galileo}} P_{fail,sat}\left(1 - \chi^2_{2,\delta_a,H}cdf\left(\frac{HAL^2}{\xi_{FM}^2}\right)\right)$$

As can be seen from equation (3), the integrity risk IR depends on input parameters such as the vertical alert limit VAL and the horizontal alert limit HAL (in case of the prior art of WO 2006/032422 A1, the positional domains are only vertical V and horizontal H), where the overall integrity risk IR is given by a sum of contributions from the vertical positional domain, herein labeled as $P_{intRisk,V}$, and from the horizontal positional domain, herein labeled as $P_{intRisk,H}$.

The terms on the right hand side of the second equal sign of the first line of equation (3) relates to contributions to the overall integrity risk which relate to the fault-free condition or fault-free event, i.e. to the assumption that none of the plurality of space vehicles is in an abnormal or faulty condition. The second and third of the lines of equation (3) above relate to contributions to the overall integrity limit from the assumption of a single failure event which is indicated by the fact that the second and the third line of equation (3) above comprise sums over the plurality of space vehicles (here, the number of available space vehicles is indicated by $N_{sat\_Galileo}$). The second line in equation (3) above relates to the single fault event contribution relating to the vertical positional domain as indicated by the fact that the parameter of the vertical alert limit VAL is introduced in this line as well as the fact that the second line of equation (3) is based on a one-dimensional Gaussian distribution indicating that it relates to a single degree of freedom, i.e. the vertical direction.

The third line in equation (3) above relates to the contributions to the overall integrity risk from the occurrence of a single failure event in the horizontal positional domain which is indicated by the fact that the third line of equation (3) depends on the horizontal alert limit parameter HAL and involves a chi-squared function with two degrees of freedom indicating the two degrees of freedom of the horizontal a positional domain.

As can be, for example, derived from the second line of equation (3) above, the contribution to the overall integrity risk IR from the vertical positional domain according to the algorithm of WO 2006/032422 A1 involves contributions relating to the single failure event which are determined based on two probabilities, namely a probability referred to as $P_{fail,sat\_j}$ (in the following referred to as $P_{sat,OC,F}$) which indicates a probability for the occurrence of a single failure event, and a probability, which is given by the factor of ½ and the content of the bracket in the second line of equation (3) indicating a probability of an impact of the occurrence of the occurred single failure event to the positional error of the positioning information determination in the vertical positional domain (here, the vertical positional domain as indicated by the vertical alert limit VAL, this probability relating to the impact will be labeled in the following as $I_{sat,F,X}$). The third line in equation (3) above relates to the contributions from the horizontal domain.

Accordingly, the partial integrity risk $IR_{sat,F,X}$ relating to the single failure event of a certain space vehicle sat in a certain positional domain X according to the algorithm of WO 2006/032422 A1 is given by the below formula (3a):

$$IR_{sat,F,X} = P_{sat,OC,F} \cdot I_{sat,F,X}[\xi = T_{sat}, \sigma_{ID}(\sigma_{UERE}, \sigma_{SISMA,sat}, \sigma_{SISA,all-sat}), k_X, l_X] \quad (3a)$$

In the above formula (3a), according to the algorithm of WO 2006/032422 A1, the parameter $P_{sat,OC,F}$ indicates an upper bound of an estimate of the probability of a occurrence of a single failure event and the term $I_{sat,F,X}$ indicates the probability of an impact of the single failure event on the certain positional domain X in the faulty condition. As indicated in equation (3a) above, the term $I_{sat,F,X}$ is a function of the so-called detection threshold $T_{sat}$ which is given according to the formula (4):

$$T_{sat} = k_{fa} \sqrt{\sigma_{SISA,sat}^2 + \sigma_{SISMA,sat}^2} \quad (4)$$

The detection threshold $T_{sat}$ can be calculated from a constant $k_{fa}$, which is related to the probability of a false alarm, the signal-in-space accuracy SISA relative to the space vehicle sat (herein labeled $\sigma_{SISA,sat}$), and the signal-in-space monitoring accuracy SISMA relative to the space vehicle sat (herein labeled as $\sigma_{SISMA,sat}$).

Furthermore, the term $I_{sat,F,X}$ is a function of a standard deviation $\sigma_X$ of the positional error in the positional domain X, in the case of a one-dimensional error also labeled as $\sigma_{1D}$. The standard deviation $\sigma_X$ of the error in a certain positional domain X is a function of the standard deviation $\sigma_{UERE}$ of the user equivalent range error, the signal-in-space accuracy $\sigma_{SISA,sat}$ and the signal-in-space accuracy of all the space vehicles used in the positioning determination except the space vehicle sat which signal-in-space accuracy is labeled as $\sigma_{SISA,all,sat}$. Furthermore, the term $I_{sat,F,X}$ is a function of a parameter $k_X$ which describes the parameter relevant for the transformation from range to the positional domain X and the error magnitude $I_X$ in the certain positional domain X relating to a position error threshold in the certain a positional domain X.

Summarizing, the determination of the integrity risk IR according to the basic Galileo integrity risk determination algorithm as described in WO 2006/032422 A1 introduces approximations that lead to biased estimations of the integrity risk IR for the assumption of single failure events (e.g. a faulty condition). This typically leads to very conservative results since the determination is based on the two contributions relating to the determination of an upper bound of a probability of an occurrence of the single failure event and an estimate of the probability of impact of the single failure event on the positional domain X. Here, conservative approximation means that the estimated integrity risk is estimated larger than necessary. Although this might be acceptable in terms of safety, it is disadvantageous with regard to the availability of the system since users and applications might refrain from using position information determined from signals received from the global positioning system when the conservatively determined integrity risk already exceeds a predetermined threshold indicating the requirements of the user or the application although the actual integrity of the global positioning system is still compliant with these requirements of the user or the application. However, for global positioning systems such as Galileo and GPS, it is necessary to provide a system which has high integrity as well as high continuity and high availability at the same time. Moreover, the algorithm as described WO 2006/032422 A1 still involves complex computational efforts in the determination of the integrity risk.

In general, it is preferable to provide a method and an apparatus for determining an integrity indicating parameter which indicates the integrity of positioning information determined from positioning information signals disseminated from a plurality of space vehicles of a global positioning system which has high integrity, high continuity, and high availability at the same time. It is therefore preferable to provide a method and an apparatus for determining an integrity indicating parameter according to an algorithm which allows to increase at least one of continuity, integrity, and availability compared to the algorithms as known from the prior art. In addition, it is also preferable to provide a method and an apparatus for determining an integrity indicating parameter such that the computational effort is reduced compared to the algorithms as known from the prior art, so that the integrity indicating parameter can be preferably calculated easily and with reduced computational burdens allowing to efficiently determine the integrity indicating parameter at a receiver of a user in real time locally for each single user or application. Moreover, it is preferable to provide a method and an apparatus for determining an integrity indicating parameter, wherein an integrity risk as well as a protection level can be determined as the integrity indicating parameter so as to allow an efficient possibility for comparison of the two known concepts of integrity, i.e. integrity risk based concepts and protection level based concepts.

SUMMARY OF THE INVENTION

In view of the above description of the prior art, it is an object of the present invention to provide an improved method and apparatus for determining an integrity indicating parameter which indicates the integrity of positioning information determined from positioning information signals disseminated from a plurality of space vehicles of a global positioning system according to which improvement at least one of the following can be achieved:

being more efficient and requiring less computational efforts such as e.g. less processing requirements and/or less storage requirements, providing more accurate results of the determination of the integrity indicating parameter such as for example the integrity risk and/or the protection level, allowing efficient determination of an integrity risk at a certain alert limit as well as a protection level at a certain integrity risk for allowing efficient comparison of different integrity concepts such as e.g. integrity risk and protection level based concepts, increasing availability of the system while at the same time also improving or at least keeping a high level of continuity and integrity.

For solving the above-described object of the present invention, a method for determining an integrity indicating parameter, an apparatus for determining an integrity indicating parameter, and a computer program product are proposed. Dependent claims relate to preferred embodiments of the present invention.

According to the present invention, there is provided a technique for a method and an apparatus for determining an integrity indicating parameter such as the integrity risk and/or the protection level associated to a user position which is derived from a global positioning system such as for example a satellite radio navigation system.

According to a first aspect of the present invention, a method for determining an integrity indicating parameter is provided, wherein the integrity indicating parameter indicates the integrity of positioning information that is determined from positioning information signals disseminated from a plurality of space vehicles of a global positioning system. The method comprises providing an input parameter, receiving a plurality of integrity information parameters, and determining the integrity indicating parameter on the basis of the input parameter and on the basis of a first relation between the integrity indicating parameter and the input parameter and the plurality of integrity information parameters. According to the first aspect of the present invention, the method further comprises providing data indicating an auxiliary relation representing the first relation, the auxiliary relation being provided (e.g. stored/pre-stored) in the form of a look-up table, in particular preferably in the form of a two-dimensional look-up table, wherein determining the integrity indicating parameter is performed on the basis of the auxiliary relation.

Here, the term "integrity indicating parameter" relates to integrity parameter such as in integrity risk IR or partial integrity risks such as e.g. $IR_F$, $IR_{F,X}$, $IR_{F,X,sat}$ or also corresponding protection level parameters PL, $PL_F$, $PL_{F,X}$, or $PL_{F,X,sat}$ as explained in the detailed description below. Furthermore, the term "integrity indicating parameter" may also relate to parameters which relate to or are functions of an integrity risk IP, a partial integrity risk parameter, a protection level PL or a partial protection level parameter or combinations thereof. In general, such an integrity indicating parameter allows to indicate the integrity of positioning information that is determined from positioning information signals which are disseminated from a plurality of space vehicles of a global positioning system such as e.g. GPS or Galileo or the like. Such global positioning systems may comprise plurality of space vehicles such as e.g. satellites which are orbiting Earth and/or one or more ground stations (GSS) which may monitor the space vehicles or also provide the user or receiver with positioning information signals.

According to the method, for determining the integrity indicating parameter, an input parameter is provided such as for example an alert limit AL for the determination of an integrity risk IR or an integrity risk IR for determining a protection level PL. Furthermore, the input parameter may also relate to or be based on an integrity risk IR or an alert limit AL or combinations thereof. Such an input parameter may be given by a user or an application, it may also be predetermined and/or pre-stored for determining the integrity indicating parameter. The step of providing an input parameter may also involve inputting a parameter value of the input parameter by a user or setting the value of the input parameter by an application, for example, based on the underlying requirements of the application or the user.

Furthermore, for the determination of the integrity indicating parameter, a plurality of integrity information parameters are received, which may be received from one or more of the space vehicles and/or one or more of ground stations of the global positioning system, integrity indicating parameter may for example comprise parameters such as the signal-in-space accuracy SISA and the signal-In-space monitoring accuracy SISMA (or equivalent) or other parameters which are available or determinable from parameters received from the space vehicles and/or the ground stations of the global positioning system and/or from the positioning information signals which are disseminated from a plurality of space vehicles of a global positioning system such as e.g. GPS or Galileo or the like.

After providing the input parameter and after receiving the plurality of integrity information parameters, the integrity indicating parameter can be determined on the basis of a first relation which is a relation between the integrity indicating parameter to be determined and the group of the input parameter and the plurality of integrity information parameters. This first relation may relate to the integrity indicating parameter as a function of the input parameter and the plurality of integrity information parameters.

According to the first aspect of the present invention, however, the integrity indicating parameter is not directly determined from the first relation but on the basis of an auxiliary relation which represents the first relation, where the auxiliary relation is of such kind of relation that it is possible to be stored in the form of a look-up table, in particular a two-dimensional look-up table, such that the integrity indicating parameter can be efficiently and easily determined with significantly reduced computational efforts and/or processing efforts based on the auxiliary relation which is stored in the form of a look-up table according to the first aspect of the present invention.

This has the advantage that the computational effort and processing effort which is usually involved in the determination of integrity indicating parameters according to algorithms known to the prior art can be significantly reduced. This allows to provide compact and efficient means for determining the integrity indicating parameter on a user side, such as an apparatus as will be described later, which can efficiently and in real time with less computational effort and less processing time determine the integrity indicating parameter on the basis of the auxiliary relation which is stored in form of a look-up table, in particular a two-dimensional look-up table, for example, in a storage means of the means for determining the integrity indicating parameter. Such storage means may be realized by any known memory means known to the prior art such as for example flash memory, USB sticks, RAM and ROM of an apparatus for determining the integrity indicating parameter, and/or hard disks or the like.

Preferably, determining the integrity indicating parameter comprises determining a first auxiliary parameter and a second auxiliary parameter on the basis of the input parameter and the plurality of received integrity information parameters, and/or determining an output parameter in dependence of the first and the second auxiliary parameters on the basis of the auxiliary relation, the auxiliary relation being preferably a relation between the first and second auxiliary parameters and the output parameter, wherein the output parameter preferably corresponds to the integrity indicating parameter or the integrity indicating parameter may be alternatively determined from the output parameter.

According to this preferred aspect of the first aspect of the present invention, the determination of the integrity indicating parameter comprises a step of determining a first auxiliary parameter and a step of determining a second auxiliary parameter on the basis of the input parameter and the plurality of received integrity information parameters, wherein the auxiliary relation, which is stored in form of a look-up table, in particular a two-dimensional look-up table, is preferably a relation between the first and second auxiliary parameters and an output parameter, i.e. involving two input parameters and one output parameter, which allows to efficiently represent the auxiliary relation in a form of a look-up table, in particular a two-dimensional look-up table. Then, the output parameter can be easily and efficiently determined by utilizing the look-up table at significantly reduced computational effort and with significantly reduced processing time. In this case, the output parameter is preferably a parameter which already corresponds to the integrity indicating parameter or is at least a parameter that allows easily determining the integrity indicating parameter from the output parameter so that the integrity indicating parameter can be easily derived from the output parameter or already corresponds to the output parameter. The output parameter can be efficiently extracted from the look-up table representing the auxiliary relation based on only two input parameters, namely, the first auxiliary parameter and the second auxiliary parameter. This has the further advantage that only one look-up table, in particular a two-dimensional look-up table, has to be stored or provided for a particular integrity indicating parameter since the output parameter can be directly determined based on the look-up table by only inputting the first and the second auxiliary parameters.

Preferably, it is detected or at least monitored if the space vehicles are in a normal condition or in an abnormal condition, wherein preferably only positioning information signals disseminated from space vehicles for which a normal condition is detected are used for the position information determination, wherein the first relation is preferably a relation between

- a first probability (e.g. $P_{OMI,F,sat}$), the first probability preferably indicating a probability that a positional error of the positioning information determination exceeds an error threshold because of an abnormal condition of a space vehicle which is not detected,
- the error threshold, and/or
- a plurality of said received integrity information parameters.

Accordingly, the integrity indicating parameter according to this preferred aspect of the present invention is determined based on a relation between the first probability which indicates the probability that a positional error of the positioning information determination exceeds an error threshold because of an abnormal condition of one of the space vehicles which is not detected although the space vehicles are preferably monitored, such as for example monitored by themselves and/or by ground stations, and the group of the error threshold and/or the plurality of received integrity information parameters.

This has the advantage that the method can be applied to the determination of an integrity risk as well as the determination of a protection level since the determination of the integrity risk can be performed by inputting the error threshold as an input parameter an receiving the integrity information parameters so as to determine the integrity risk based on the relation, the integrity risk corresponding to the first probability or at least the first probability indicating a partial integrity risk. Then, the error threshold corresponds to the alert limit AL which is used as the input parameter for determining the integrity risk IR at the alert limit AL. Also, in case the integrity indicating parameter is intended to correspond to or be related to the protection level PL, the error threshold corresponding to a given first probability can be determined on the basis of the first relation by considering the first probability and the plurality of received integrity information parameters, wherein the obtained error threshold then corresponds to the determined protection level PL. The integrity risk or at least a partial integrity risk as an input parameter may enter into the determination of the first probability or already corresponds to or relates to the first probability.

Preferably, the first relation is based on a second probability (e.g. $P_{OC,F,sat}$), a third probability (e.g. $P_{I,F,X}$), and a fourth probability (e.g. $P_{MD,sat}$). The second probability is preferably indicating (or at least depending on) a probability for the occurrence of a single failure event, the single failure event being preferably defined as an event in which exactly one of the plurality of space vehicles is in an abnormal condition. The third probability is preferably indicating a probability of an impact of the occurrence of the single failure event to the positional error of the positioning information determination.

The fourth probability is preferably indicating a probability that an occurrence of an abnormal condition of a monitored space vehicle is not detected.

According to this preferred aspect of the first aspect of the present invention, a first relation is not only based on the second probability and the third probability, which indicate the probability for the occurrence of a single failure event and the probability of an impact of the occurrence of the single failure event to the positional error of the positioning information determination, but further involves a fourth probability which indicates the probability that the occurrence of an abnormal condition of a monitored space vehicle is not detected. This fourth probability may, therefore, be related or correspond to a probability indicating a so-called "missed detection".

For example, the algorithm according to the WO 2006/032422 A1 does not involve or consider a probability of missed detection or at least an estimate of a probability of missed detection which leads to the fact that the integrity risk as determined based on the teaching of WO 2006/032422 A1 represents only a conservative upper bound for the actual integrity risk. This leads to the problem that the determined integrity risk results in an unnecessarily decreased availability of the global positioning system. In particular, the determined integrity risk represents only a conservative estimate of the actual integrity risk so that it reflects a worse integrity than the actual integrity. As a result, a user or an application may unnecessarily refrain from using the positioning information since the determined integrity indicates a worse integrity than the actual integrity of the global positioning system, thereby unnecessarily decreasing availability thereof. By contrast, according to this preferred aspect of the present invention, the fourth probability which relates or is corresponding to a probability of missed detection is additionally considered, thereby decreasing the value of the determined integrity risk in comparison to the determined integrity risk according to the algorithm of WO 2006/032422 A1 so as to more accurately reflect the actual integrity of the global positioning system, thereby leading to an improved availability thereof.

Preferably, the integrity indicating parameter indicates (or at least relates to) an integrity risk IR. Then, the input parameter relates (or corresponds) to a predetermined alert limit AL. Alternatively, the integrity indicating parameter indicates (or at least relates to) a protection level PL. Then, the input integrity parameter relates (or corresponds) to a predetermined integrity risk IR.

According to this preferred aspect of the first aspect of the present invention, the input parameter either may relate to a predetermined alert limit AL so as then be able to determine the integrity risk or at least partial integrity risk as the integrity indicating parameter. Alternatively, or also in combination, if the provided input parameter relates to a predetermined integrity risk or at least a predetermined partial integrity risk, the method may allow to determine a protection level PL as the integrity indicating parameter. In particular, according to this preferred aspect of the present invention, it is possible to determine the integrity risk as well as the protection level PL based on a similar algorithm which advantageously allows to compare the integrity risk IR at an alert limit AL as well as a corresponding protection level PL at the integrity risk IR so as to compare the results for different concepts of integrity, namely, the integrity risk based concept and the protection level based concept.

For example, the current global positioning system GPS in combination with SBAS is mainly based on the protection level based concept, and for the planned Galileo global positioning system, it is currently intended to make use mainly of the integrity risk based concept, wherein future applications may still use either integrity risk based or protection level based concepts. However, according to this preferred aspect of the present invention, it is for example possible to calculate an integrity risk as well as protection level for comparison, or also utilize integrity concepts which are based on both of the determination of the integrity risk and the determination of the protection level. Therefore, according to this preferred aspect of the invention, compatibility of applications to the different integrity concepts can be improved.

In this case, there can also be provided a method for determining a first integrity indicating parameter and a second integrity indicating parameter which first and second integrity indicating parameters indicate the integrity of positioning information that is determined from positioning information signals disseminated from a plurality of space vehicles of a global positioning system. Then, the method preferably comprises providing a first input parameter and a second input parameter, receiving a plurality of integrity information parameters and determining the first integrity indicating parameter on the basis of the first input parameter and on the basis of a first relation between the first integrity indicating parameter and the first input parameter and the plurality of integrity information parameters, and/or determining the second integrity indicating parameter on the basis of the second input parameter and on the basis of the first relation between the second input parameter and the second integrity indicating parameter and the plurality of integrity information parameters. Further preferably, such a method may comprise a step of providing data indicating a first auxiliary relation representing the first relation for the determination of the first integrity indicating parameter and a second auxiliary relation representing the first relation for the determination of the second integrity indicating parameter, wherein the first auxiliary relation and the second auxiliary relation are provided so and/or stored in the form of a first and a second look-up table, in particular a first and a second two-dimensional look-up table.

According to a second aspect of the present invention, a method for determining an integrity indicating parameter is provided, wherein the integrity indicating parameter indicates the integrity of positioning information determined from positioning information signals disseminated from a plurality of space vehicles of a global positioning system in which it is detected (or at least monitored) if said space vehicles are in a normal condition or in an abnormal condition, wherein only positioning information signals disseminated from space vehicles for which a normal condition is detected are used for said position information determination. The method comprises providing an input parameter, receiving a plurality of integrity information parameters, and determining the integrity indicating parameter on the basis of said input parameter and on the basis of a first relation between

- a first probability (e.g. $P_{OMI,F,sat}$), wherein the first probability is indicating a probability that a positional error of the positioning information determination exceeds an error threshold because of an abnormal condition of a space vehicle which is not detected,
- the error threshold, and
- a plurality of the received integrity information parameters.

According to the second aspect of the present invention, terms which have been already used in connection with the above described first aspect of the present invention may have the same or at least similar meaning as described above for the first aspect of the present invention. According to the second aspect of the present invention, the integrity indicating parameter, such as for example an integrity risk or a partial integrity risk or a protection level or a partial protection level, is determined on the basis of the provided input parameter and on the basis of a relation which is a relation between the first probability and the input parameter and the received integrity information parameters. Again, the first probability is a probability indicating a probability that the positional error of the positioning information determination exceeds the error threshold because of an abnormal condition of a space vehicle which is not detected although the space vehicles are preferably monitored by themselves and/or by ground stations of the global positioning system.

According to the second aspect of the present invention, the first relation is based on a second probability (e.g. $P_{OC,F,sat}$) and a third probability (e.g. $P_{I,F,X}$), wherein the second probability is indicating a probability for the occurrence of a single failure event, the single failure event being defined as an event in which exactly one of the plurality of space vehicles is in an abnormal condition, and the third probability is indicating a probability of an impact of the occurrence of the single failure event to the positional error of the positioning information determination. According to the second aspect of the present invention, the first relation is further based on a fourth probability (e.g. $P_{MD,sat}$), wherein the fourth probability is indicating a probability that an occurrence of an abnormal condition of a monitored space vehicle is not detected.

Accordingly, in the second aspect of the present invention, the first relation is based on a second probability indicating the probability for the occurrence of a single failure event and a third probability indicating the impact of such a single failure event to the positional error of the positioning information determination, e.g. in a certain positional domain such as a one-dimensional and/or a two-dimensional positional domain. Furthermore, contrary to the algorithms of the prior art as for example described in WO 2006/032422 A1, the first relation is further based on a fourth probability which indicates the probability of an occurrence of an abnormal condition of a monitored space vehicle which is not detected, i.e. a probability which corresponds to or at least relates to a probability of missed detection.

According to the second aspect of the present invention, a first relation is not only based on the second probability and the third probability, which indicate the probability for the occurrence of a single failure event and indicating the probability of an impact of the occurrence of the single failure event to the positional error of the positioning information determination, but further involves a fourth probability which indicates the probability that the occurrence of an abnormal condition of a monitored space vehicle is not detected. This leads to the effect that the availability of the system can be advantageously increased since the determined integrity indicating parameter more closely reflects the actual integrity of the system. Please also refer to the respective discussion with respect to a preferred aspect of the first aspect of the present invention.

The above-mentioned features relating to the above-described first aspect of the present to invention and to the above-described second aspect of the present invention can be combined. Moreover, the preferable features as described in the following relate to preferred features of the first aspect and of the second aspect of the present invention.

Preferably, the first relation is based on a probability relation according to which the first is probability is equal to a product of the second probability, the third probability, and the fourth probability. According to this preferred aspect of the first as well as the second aspect of the present invention, the first relation is not only based on the first, second, third and fourth probabilities, but based on a probability relation according to which the first probability is equal to the product of the second, third, and fourth probability which is corresponding to the exact mathematical and theoretical formula for determining the first probability based on the second, third, and fourth probabilities as defined above. Namely, if providing the exact formula for the first probability as defined above, this probability would correspond to the exact product of the second, third, and fourth probabilities according to the above definitions thereof. This has the advantage, that the determined integrity indicating parameter is possible to be determined accurately closely based on the exact mathematical probability relations with no or at least almost no introduction of approximations such as in the prior art as described above. Therefore, the determined integrity indicating parameter can be determined closer or almost equal to the actual input parameter so that the availability of the global positioning system may be further increased.

Preferably, the first relation represents an approximation of the probability relation, wherein the approximation preferably introduces an absolute error less than (or equal to or less than) $10^{-7}$ times the first probability. Accordingly, the first relation upon which the determination of the integrity indicating parameter is based is then a very accurate approximation of the mathematical exact relation, wherein the absolute error is less than $10^{-7}$ times the second probability. Then, the determined integrity parameter is almost exactly and extremely accurately corresponding to the actual integrity of the global positioning system, thereby, allowing to even further optimize the availability of the global positioning system in terms of integrity measures.

Preferably, the integrity indicating parameter indicates (or at least relates to) an integrity risk IR. Then, the input parameter relates (or corresponds) to the error threshold which corresponds to (or at least relates to) a predetermined alert limit AL. Alternatively, the integrity indicating parameter indicates (or at least relates to) a protection level PL corresponding to (or at least relating to) the error threshold. Then, the input integrity parameter relates (or corresponds) to a predetermined integrity risk IR.

According to this preferred aspect, the input parameter relates either to a predetermined alert limit AL so as then be able to determine the integrity risk IR or at least partial integrity risk as the integrity indicating parameter. Alternatively, or also in combination, if the provided input parameter relates to a predetermined integrity risk IR or at least a predetermined partial integrity risk, the method allows to determine a protection level PL as the integrity indicating parameter. In particular, according to this preferred aspect of the present invention, it is possible to determine the integrity risk IR as well as the protection level PL based on a similar algorithm which allows to compare the integrity risk at an alert limit as well as a corresponding protection level PL at the integrity risk so as to compare the results for different concepts of integrity, namely, the integrity risk based concept an protection level based concept.

Preferably, the $IR_X$ integrity indicating parameter indicates an integrity risk in a certain positional is domain (X may be e.g. x, y, z or longitude, latitude and altitude, or vertical V and horizontal H, or the like), if the input parameter relates to the error threshold (e.g. $I_X$) in that certain positional domain X corresponding to a predetermined alert limit (e.g. $AL_X$) in that certain positional domain X; wherein the step of determining the integrity indicating parameter is preferably performed for a plurality of positional domains, and/or an overall integrity risk (e.g. IR) which is preferably determined based on a sum of the determined $IR_X$ integrity indicating parameters for those domains. Also, as an optional alternative or additionally provided alternative, the $PL_X$ integrity indicating parameter preferably indicates a protection level in a certain positional domain (X may be e.g. x, y, z or longitude, latitude and altitude, or vertical V and horizontal H, or the like) corresponding to the error threshold in a certain positional domain X, if the input integrity parameter relates to a predetermined integrity risk in that certain positional domain X; wherein the step of determining the integrity indicating parameter is preferably performed for a plurality of positional domains, and/or an overall protection level (e.g. PL) is preferably determined based on one of the plurality of the determined protection level or the maximum value of two or more of the plurality of determined protection levels.

Accordingly, the integrity indicating parameter such as for example an integrity risk IR or at least partial integrity risk and the protection level PL or at least a partial protection level can be determined for each certain positional domain X. Here, it is possible to either provide methods in which there are two positional domains such as vertical V and horizontal H, wherein vertical V corresponds to a one-dimensional direction relating to one positional degree of freedom, while horizontal H relates to a two-dimensional positional direction or domain having two positional degrees of freedom. Such two degrees of freedom in the horizontal domain may, for example, correspond to two Cartesian coordinates in a horizontal plane or to two spherical coordinates such as two angle degrees of freedom on a spherical surface. In terms of Cartesian coordinates, the vertical direction V may correspond to the z direction or the like, and for spherical coordinates, the vertical domain may correspond to a radial direction in the spherical coordinate system. In a spherical coordinate system based on the coordinate system of the Earth, the horizontal domain H can, for example, also be represented by parameters such as longitude and latitude angle information. In ease of three positional directions, each being one-dimensional, i.e. each having a single degree of freedom, the three positional directions may, for example, correspond to three Cartesian coordinates x, y, z, or also spherical coordinates such as radial direction and two angular directions, e.g. also longitude and latitude angles, or alternatively may correspond to the user trajectory intrinsic geometry (e.g. along-track, across track, radial or alternatively vertical), or alternatively may correspond to directions in which positioning errors are expected nominally to be maximum, or alternatively to any combination of any of the above.

According to this preferred aspect of the present invention, in case of determination of an integrity risk, a overall integrity risk is preferably determined on the basis of a plurality of partial integrity risk parameters, such as for example different integrity risk values relating to different positional domains and/or positional directions. In case of determination of a protection level, according to this preferred aspect, there are preferably determined a plurality of protection level parameters relating to the protection level in each of a plurality of positional directions or domains, where an overall protection level can then be easily determined based on the maximum value of one or more of the plurality of determined protection levels of the different positional directions. This has the advantage that a determined integrity risk and a determined protection level may not only be compared based on the overall determined integrity risk and the overall determined protection level, but it is further advantageously possible to already compare partial integrity risk parameters relating to a certain positional domain or direction with a corresponding protection level in this certain positional direction or positional domain.

Preferably, determining the integrity indicating parameter is further performed on the basis of a second relation which is preferably a relation between a fifth probability (e.g. $P_{OMI,N}$), the fifth probability is preferably indicating a probability that a positional error of the positioning information determination in a certain positional direction exceeds an error threshold although each of said space vehicles is in a normal condition, the error threshold, and two or more of the received integrity information parameters.

According to this preferred aspect of the present invention, the integrity indicating parameter is further determined on the basis of a second relation which may be a relation between a fifth probability indicating a probability that a positional error in a certain positional domain X exceeds an error threshold although each of the space vehicles is in normal condition (i.e. relating to a so-called fault-free condition or fault-free event, while the above described aspects preferably relate to or at least involve mainly the assumptions in connection with so-called single failure events, also referred to as faulty condition or single SIS failure event). Such a determination of an integrity indicating parameter or at least a partial integrity indicating parameter is then preferably based on two or more of the received integrity information parameters which may comprise one or more of the integrity information parameters already involved in the determination as described according to the above aspects and/or one or more integrity information parameters which are not used in or more of the above described aspects of the present invention. Here, the integrity indicating parameter can be based on both, the first and the second relation, for example in that a first integrity indicating parameter is determined based on the second relation and a second integrity indicating parameter is determined based on the first relation, wherein the integrity indicating parameter can be determined based on the first and the second integrity indicating parameters, such as for example by adding the first and second integrity indicating parameters or taking the maximum value of the first and second integrity indicating parameters or determining the integrity indicating parameter based on a function of the first and the second integrity indicating parameters.

This preferred aspect of the present invention, according to which integrity indicating parameter further performed on the basis of the second relation, further has the advantage that not only the single failure events but also the fault-free events in which the positional error exceeds the error threshold although each of the plurality of space vehicles is in a normal condition (i.e. fault-free) can be considered in the determination of the integrity indicating parameter, thereby, improving the determination of the integrity indicating parameter which may better represent or at least indicate the actual integrity of the global positioning system.

Preferably, the second relation is based on a sixth probability (e.g. $P_{OC,N}$) and a seventh probability (e.g. $P_{I,N,X}$), wherein the sixth probability is preferably indicating a probability for the occurrence of a fault-free failure event, the fault-free failure event being preferably defined as an event in which an overall positional error of the positioning information determination exceeds an error threshold, in particular although each of the plurality of space vehicles is in a normal condition, and the seventh probability is preferably indicating a probability of an impact of the occurrence of the fault-free failure event to the positional error of said positioning information determination in the certain positional direction.

According to this preferred aspect of the present invention, the above mentioned second relation is further based on the sixth probability which indicates the probability for the occurrence of a fault-free failure event and a seventh probability which indicates the probability of an impact of the occurrence of the fault-free failure event to the positional error in a certain positional direction or domain.

Preferably, the plurality of received integrity information parameters are disseminated from said space vehicles of said global positioning system; the plurality of received integrity information parameters are disseminated from one or more ground stations (e.g. GSS) of the global positioning system, which ground stations are preferably monitoring the space vehicles of the global positioning system; or a first group comprising one or more of the received integrity information parameters are disseminated from the space vehicles of the global positioning system and a second group comprising one or more of the received integrity information parameters are disseminated from one or more ground stations of the global positioning system; and/or from the positioning information signals which are disseminated from a plurality of space vehicles of a global positioning system such as e.g. GPS or Galileo or the like. Moreover some of these parameters may be pre-stored in the user receiver.

Preferably, determining the integrity indicating parameter comprises determining a first auxiliary parameter and a second auxiliary parameter on the basis of the input parameter and the plurality of received integrity information parameters, and/or determining an output parameter based on the first and second auxiliary parameters, wherein the output parameter preferably corresponds to the integrity indicating parameter or the integrity indicating parameter is may be determined from the output parameter.

According to this preferred aspect of the present invention, the determination of the integrity indicating parameter comprises a step of determining a first auxiliary parameter and a step of determining a second auxiliary parameter on the basis of the input parameter and the plurality of received integrity information parameters (wherein the auxiliary relation which may be further provided or stored in form of a look-up table, in particular a two-dimensional look-up table) is preferably a relation between the first and second auxiliary parameters and an output parameter, i.e. involving two input parameters and one output parameter which allows to efficiently represent the auxiliary relation in a form of a look-up table.

Preferably, the method further comprises a step of providing an auxiliary relation between the first and second auxiliary parameters and the output parameter, wherein the output parameter is preferably determined based on the auxiliary relation. Preferably, the auxiliary relation is provided in the form of a look-up table, in particular stored as a look-up table, in particular preferably in the form of a two-dimensional look-up table.

Then, the output parameter can be easily and efficiently determined from the look-up table with significantly reduced computational effort and with significantly reduced processing time. The output parameter is preferably a parameter which already corresponds to the integrity indicating parameter or is at least a parameter that allows to easily determine the integrity indicating parameter from the output parameter so that the integrity indicating parameter can be efficiently extracted from the look-up table representing the auxiliary relation based on only two input parameters, namely, the first auxiliary parameter and the second auxiliary parameter. This has the further advantage, that for a particular integrity indicating parameter, only one look-up table has to be stored or provided since the output parameter can be directly determined based on the look-up table by only inputting the first and the second auxiliary parameters.

According to this preferred aspect of the present invention, the integrity indicating parameter is not directly determined from the first relation but on the basis of an auxiliary relation which represents the first relation, where the auxiliary relation is preferably of such kind of relation that it is possible to be stored or provided in the form of a look-up cable such that the integrity indicating parameter. Accordingly, such a look-up table can be pre-computed and provided stored on a memory means. This allows to provide compact and efficient means for determining the integrity indicating parameter on a user side such as an apparatus as will be described later, which can efficiently determine the integrity indicating parameter in real time with less computational effort and less processing time on the basis of the auxiliary relation which is efficiently stored in form of a look-up table, for example, in a storage means of the means for determining the integrity indicating parameter. Such storage means may be realized by any known memory means known to the prior art such as for example flash memory, USB sticks, RAM and ROM of an apparatus for determining the integrity indicating parameter, and/or hard disks or the like.

Preferably, the auxiliary relation is based on the first relation between the first probability and the error threshold and the plurality of received integrity information parameters. Accordingly, it is possible that the first relation underlying the integrity indicating parameter determination may be reflected by the auxiliary relation.

Preferably, the auxiliary relation is based on the second probability (e.g. $P_{OC,F,sat}$), the third probability (e.g. $P_{I,F,X}$), and the fourth probability (e.g. $P_{MD,sat}$). Accordingly, the auxiliary relation advantageously considers also the fourth probability related to a probability of missed detection, which is neglected in the teaching of WO 2006/032422 A1 so that the results of the determination according to this preferred aspect can give less conservative and possibly very accurate estimations of the actual integrity of the system, thereby increasing the availability thereof (please also refer to the corresponding preferred aspect of the first aspect described above).

Preferably, the auxiliary relation represents an approximation of a probability relation according to which the first probability is equal to a product of the second probability, the third probability, and the fourth probability, wherein the approximation preferably introduces an absolute error less than (or equal to or less than) $10^{-7}$ times the second probability. According to this preferred aspect, the first relation is not only based on the first, second, third and fourth probabilities, but based on a probability relation according to which the first probability is equal to the product of the second, third, and fourth probability which is corresponding to the exact mathematical and theoretical formula for determining the first probability based on the second, third, and fourth probabilities as defined above. This has the advantage, that the determined integrity indicating parameter is possible to be determined accurately closely based on the exact mathematical probability relations with no or at least almost no introduction of so approximations such as in the prior art as described above. Therefore, the determined integrity indicating parameter can be determined closer or almost equal to the actual input parameter so that the availability of the global positioning system may be further increased. Furthermore, the first relation upon which the determination of the integrity indicating parameter is based can then be a very accurate approximation of the mathematical exact relation, wherein the absolute error may be less than $10^{-7}$ times the first probability. Then, the determined integrity parameter is almost exactly and extremely accurately corresponding to the actual integrity of the global positioning system, thereby, allowing to even further optimize the availability of the global positioning system in terms of integrity measures.

According to another aspect of the present invention, an apparatus for determining an integrity indicating parameter is provided, wherein the integrity indicating parameter indicates the integrity of positioning information determined from positioning information signals disseminated from a plurality of space vehicles of a global positioning system. The apparatus comprises input parameter providing means for providing an input parameter, receiving means for receiving a plurality of integrity information parameters, and processing means for determining the integrity indicating parameter on the basis of the input parameter and the plurality of received integrity information parameters. According to the present invention, the processing means is adapted to determine the integrity indicating parameter according to a method according to the present invention, i.e. according to at least the first and/or the second aspect of the present invention as described above, or also further combined with preferred features of the method according to the present invention, as described above. The apparatus can be realized by hardware and/or software in combination with a computer.

Accordingly, the apparatus according to this aspect of the present invention is adapted to perform at least a method according to the above described first aspect of the present invention and/or a method according to the above described second aspect of the present invention. Preferably, the apparatus is further adapted to perform a method having one or more of the above described preferred aspects of the present invention.

Preferably, the apparatus further comprises storage means for storing auxiliary relation data indicating at least one auxiliary relation, in particular preferably in the form of a look-up table, wherein the processing means is preferably adapted to determine the integrity indicating parameter on the basis of one or more of the stored auxiliary relations.

Accordingly, a compact and efficient apparatus for determining the integrity indicating parameter on a user side can be provided which can efficiently and in real time with less computational effort and less processing time determine the integrity indicating parameter on the basis of the auxiliary relation which may stored in form of a look-up table, for example, in a storage means of the means for determining the integrity indicating parameter. Such storage means may be realized by any known memory means known to the prior art such as for example flash memory, USB sticks, RAM and ROM of an apparatus for determining the integrity indicating parameter, and/or hard disks or the like.

According to yet another aspect of the present invention, a computer program product is provided which comprises computer program code means configured to adapt an apparatus for determining an integrity indicating parameter such that the apparatus is adapted to determine the integrity indicating parameter according to a method according to the present invention, i.e. according to at least the first and/or the second aspect of the present invention as described above, or also further combined with preferred features of the method according to the present invention, as described above. Preferably, such an apparatus comprises input parameter providing means for providing an input parameter, receiving means for receiving a plurality of integrity information parameters, and/or processing means for determining the integrity indicating parameter on the basis of the input parameter and the plurality of received integrity information parameters.

Features, components and specific details of the above-described aspects and preferred aspects of the present invention may be exchanged or combined to form further preferred aspects optimized for the respective application. As far as those modifications are readily apparent for an expert skilled in the art, they shall be disclosed implicitly by the above description without specifying explicitly every possible combination, for the sake of conciseness of the present description.

BRIEF DESCRIPTION OF THE FIGURES

FIG. 9 shows an example of a look-up table related to an auxiliary relation indicating Q-transformation for the determination of an integrity risk parameter according to an embodiment of the present invention.

FIG. 10 shows an example of a look-up table relating to an auxiliary relation indicating Q*-transformation for the determination of a protection level parameter according to an embodiment of the present invention.

FIGS. 18A and 18B exemplarily show an absolute error and a relative error of the simplification of the probability $P_{IM}$ of impact as a function of the non-dimensional variable $x_i$ and $\sigma_i$.

Figure 1:
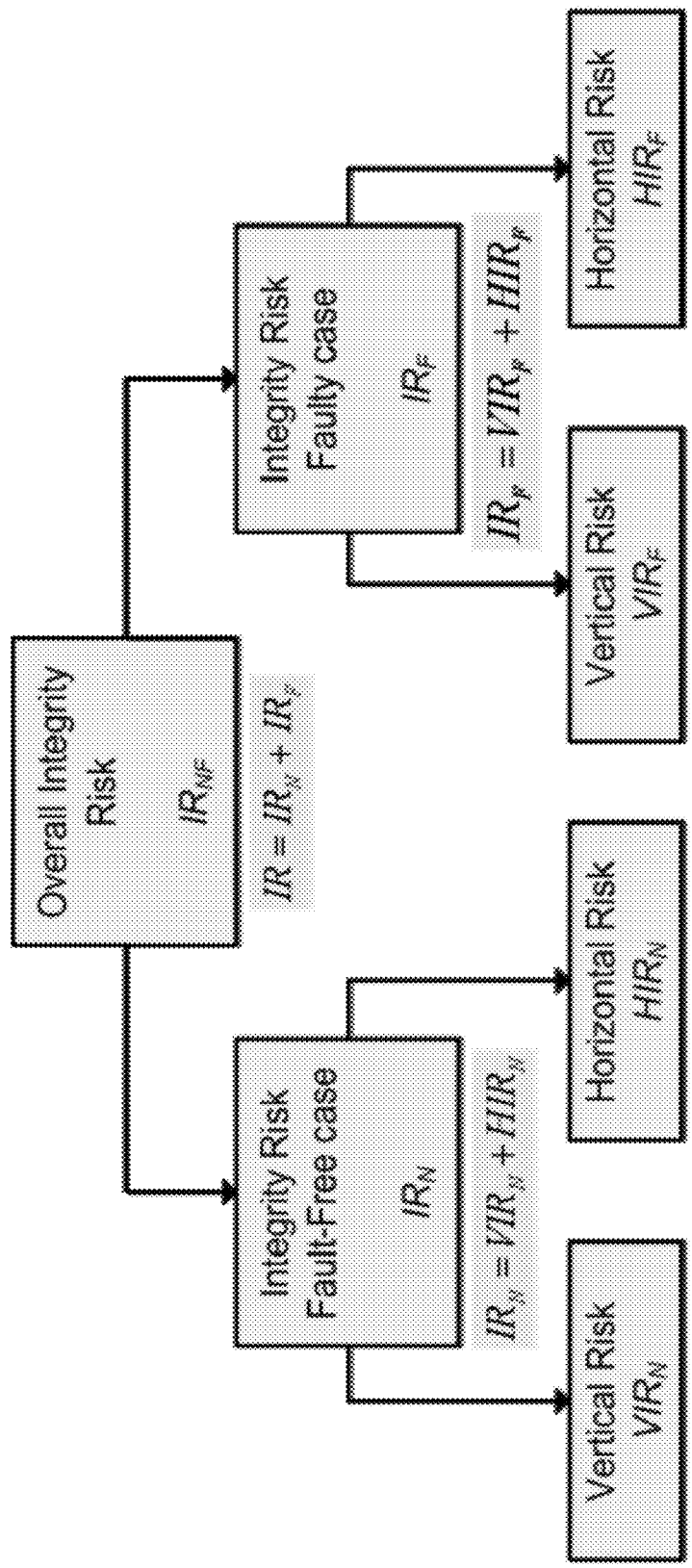
FIG. 1 exemplarily illustrates the contributions to an overall integrity risk from the fault-free condition (fault-free event) and the faulty condition (single failure event) and from the vertical and horizontal positional domains.

DETAILED DESCRIPTION OF THE FIGURES AND OF PREFERRED EMBODIMENTS OF THE PRESENT INVENTION

In the following, the underlying concepts of the present invention will be described in detail with reference to figures and, furthermore, embodiments of the present invention will be described. The present invention is, however, not limited to the below described embodiments of the present invention. The scope of the present invention is defined in the independent claims and by the scope thereof.

In the framework of so-called Safety-Of-Life (SoL) applications, for example, for the Galileo global positioning system, it will be crucial to find a definition of a method for evaluating at a user level the integrity risk bound or protection levels associated to a position estimation which is derived by means of the global positioning system.

The quality of a such a method may be generally measured by how low the integrity risk bound is is (without underestimating the integrity risk), how simple the involved computations are in terms of computational burden and processing time, and by the level of independence from "a priori" assumption of cumbersome justifications on the space vehicles failure characteristics.

In this context, Safety-Of-Life (SoL) services and applications are services and applications which provide integrity messages and/or integrity data being, for example, incorporated into navigation data messages so as to allow a user or an application to determine integrity indicating parameters such as, for example, the integrity risk or the protection level.

Underlying Mathematical Concept and Explanations of Possible Simplifications of the Involved Mathematical Expressions The improvements of the algorithms underlying the concepts of the present invention mainly relate to improvements in the estimations of contributions to integrity indicating parameters such as, for example, the integrity risk IR or the protection level PL relating to a faulty condition. In this context, although it may generally refer to situations in which one or more space vehicles are in an abnormal condition or faulty condition, the term "faulty condition" refers to a so-called "single failure event" or "single failure feared event", which is defined as an event in which exactly one of the plurality of space vehicles of the global positioning system from which signals are received is in an abnormal or faulty condition, e.g. because a position or orbit error and/or a time error exceeds a certain limit so that a signal in space error SISE exceeds a threshold value, while the faulty condition or abnormal condition of the space vehicle remains undetected.

The algorithms known from the prior art introduce approximations which lead to biased estimations of an integrity risk or a protection level in the faulty condition which leads to the determination of integrity indicating parameters which do not correspond to the actual integrity of the system but to conservative estimates thereof, thereby leading to integrity indicating parameter determinations which may unnecessarily reduce the availability of the system. Moreover, known algorithms of the prior art typically require high computational burdens and high processing time.

The algorithms underlying the concept of the present invention can be used for determining (e.g. computing) both of an integrity risk (IR) and/or a protection level (PL) while preferably considering the single failure event conditions as well as fault-free feared event contributions.

The concept is based on the identification and characterization of the worst condition of the positioning service in terms of:
- either the maximum probability that the positional error exceeds a given threshold limit without an alert being issued in time (generally referred to as integrity risk based concept),
- and/or the positional error that corresponds to a given maximum probability that an alert is not issued and an impact on the position solution is present although no abnormal condition has been detected in case of a single failure event (or also multi failure event) or also due to a fault-free feared event in which none of the available space vehicles is an abnormal condition but the overall error fluctuations lead to an overall positioning error exceeding the error threshold.

According to the underlying concept of the present invention, a probability $P_{OMI}$ is defined as probability that a one-dimensional positional error considering both nominal (normal, i.e. fault-free) and system-undetected faulty conditions exceeds a certain limit.

FIG. 1 illustrates the general principle of the plural contributions that contribute to an overall integrity risk IR. The overall integrity risk IR has contributions from an assumed fault-free case indicated by the integrity risk $IR_N$ and a contribution from the assumption of a faulty case (i.e. a single failure event condition) indicated by the integrity risk $IR_F$. The integrity risk $IR_N$ and the integrity risk $IR_F$ both have contributions from the different positional domains. In the example of FIG. 1, this is indicated by the vertical contributions $VIR_N$ and $VIR_F$ and the horizontal contributions indicated by $HIR_N$ and $HIR_F$.

Here, in the example of FIG. 1, the illustration shows that the fault-free case as well as the faulty case have contributions from the vertical and the horizontal positional domains while the overall integrity risk has contributions from the fault-free case and the faulty case. However, it is also possible to consider the contributions such that the overall integrity risk has contributions from the vertical as well as the horizontal domain, while the contributions from the vertical as well as the contributions from the horizontal positional domain have contributions from both, the fault-free case and the faulty case, respectively, which is due to the fact that the different contributions are summed and summations are commutative.

For example, in the equation (3) above in which the overall integrity risk has contributions from the vertical positional domain, i.e. $P_{intRisk,V}$, and from the horizontal positional domain, i.e. $P_{intRisk,H}$. Moreover, the horizontal positional domain H has generally two degrees of freedom and may have contributions from two different one-dimensional degrees of freedoms such as for example two Cartesian coordinates x, y as well as two spherical angle coordinates such as, for example, longitude and latitude angles.

The probability $P_{OMI}$ is calculated as follows according to equation (5):

$$P_{OMI} = P_{OMI,N} + P_{OMI,F} = P_{OMI,N} + \sum_{sat=1}^{N_{sat}} P_{OMI,F,sat} \quad (5)$$

The probability $P_{OMI}$ is given by the sum of the probability $P_{OMI,N}$ and the probability $P_{OMI,F}$. The probability $P_{OMI,N}$ defines the probability that the one-dimensional positional error considering the nominal (normal) condition exceeds a certain limit (nominal or normal condition relates to a condition in which the positional error exceeds the limit although all available space vehicles are in a normal condition, i.e. fault-free). The probability $P_{OMI,F}$ defines the probability that a one-dimensional positional error considering is system-undetected fault states exceeds a certain limit.

The term "faulty states" relates to a so-called abnormal condition or faulty condition of at least one of the available space vehicles, wherein in the following, it will only be assumed that there is a possibility of a so-called single failure event according to which exactly one of the available space vehicles is in an abnormal or faulty condition while contributions from probabilities that two or more of the space vehicles are in an abnormal condition or faulty condition will be neglected. These can be neglected since the probability thereof. Is significantly smaller and negligible compared to the probabilities of the occurrence of a single failure event.

As can be derived from equation (5) above, the probability $P_{OMI,F}$ corresponds to a sum over the corresponding probabilities for each single space vehicle sat, i.e. a sum over all available space vehicles up to the number $N_{sat}$ of available space vehicles. In this connection, it is important to note that there are $N_{sat}$ possible faulty states while there is only one nominal state associated to the fault-free condition. Here, $N_{sat}$ corresponds to the number of available space vehicles that can be or are used for determining the position information and not to the overall number of space vehicles of the global positioning system. Each of these considered faulty states is characterized by an individual single failure event affecting a certain space vehicle during a certain time interval.

The above mentioned probabilities $P_{OMI,N}$ and $P_{OMI,F}$ will be analyzed in more detail in the following.

Fault-Free Condition (Fault-Free Feared Event)

The probability $P_{OMI,N}$ is mathematically given by a product of two probabilities, namely, a probability of the occurrence of a fault-free feared event, in the following labeled $P_{OC,N}$, and a probability of an impact of the fault-free feared event on the one-dimensional position direction or domain, i.e. that the one-dimensional positional error is greater than a certain limit. This probability of impact is hereafter labeled $I_{X,N}$ or $I_{1D,N}$.

Mathematically, the probability of impact $I_{1D,N}$ on the one-dimensional positional domain in a fault-free condition is given according to the following equation (6):

$$I_{N,1D}(\sigma_{1D,N}, l_{1D}) = \operatorname{erfc}\left(\frac{\frac{l_{1D}}{k_{1D,N}}}{\sqrt{2}\frac{\sigma_{1D,N}}{k_{1D,N}}}\right) = \operatorname{erfc}\left(\frac{l_{1D}}{\sqrt{2}\,\sigma_{1D,N}}\right) \quad (6)$$

The probability of impact on the positional domain X (sometimes also labeled 1D) is a function of a standard deviation $\sigma_{X,N}$ (also labeled $\sigma_{1D,N}$) of a positional error in the positional domain X relating to the fault-free condition (indicated by the subscript N for nominal) and the error threshold $I_X$ (also referred to as $I_{1D}$) as indicated in equation (6) above. It is given by the complementary error function erfc of the quotient of the error threshold $I_X$ and the product of the square root of 2 and the standard deviation $\sigma_{X,N}$ as indicated in equation (6) above. The parameter $k_{X,N}$ relates to a parameter for the transformation from range to the positional domain X in the nominal condition.

In this connection, please note that the complementary error function erfc(x) is defined as 1−erf(x), wherein erf(x) denotes the well-known Gauss error function.

Accordingly, the probability $P_{OMI,N}$ that the one-dimensional the positional error in the positional domain X is greater than the error limit $I_X$ in a nominal condition is given according to equation (7) below:

$$P_{OMI,N} = P_{OC,N} \cdot \mathrm{erfc}(K_{L,N}) \tag{7}$$

Here, the parameter $K_{L,N}$ is defines as the quotient of the error limit $I_X$ and the product of the square root of 2 and the standard deviation $\sigma_{X,N}$ of the positional error in the positional domain X in the nominal condition according to equation (8) below:

$$K_{L,N} = \frac{\frac{l_{1D}}{k_{1D,N}}}{\sqrt{2}\,\frac{\sigma_{1D,N}}{k_{1D,N}}} = \frac{l_{1D}}{\sqrt{2}\,\sigma_{1D,N}} \tag{8}$$

Faulty Condition (Single Failure Feared Event)

For reducing the computational burden in the determination of integrity indicating parameters, which are associated with the probability according to which a one-dimensional positional error is above a certain given limit $I_X$ in certain positional domain X in a single failure event condition, the underlying concepts of the present invention allow to simplify the formulas for both, the probability of missed detection $P_{MD}$ as well as the probability of impact $I_{X,F}$.

The simplifications may introduce only negligible errors so that the determination of the integrity indicating parameters can be performed very accurate and rigorous. Therefore, it becomes possible to accurately reflect the actual integrity of the system, thereby allowing to improve the availability of the system compared to the algorithms known from the prior art.

Referring again to equation (5) above, for considering the single failure events referred to as faulty conditions, there is considered a probability $P_{OMI,F,sat}$, which is the product of three probabilities, namely, a probability of an occurrence of a single feared event, referred to as $P_{OC,F}$, a probability of a missed detection of a single failure event, referred to as $P_{MD}$, and a probability of an impact on the one-dimensional positional domain in the domain X of the single failure event, referred to a $I_{X,F}$ (i.e. the probability that the one-dimensional positional error is greater than a certain limit).

Accordingly, in contrast to the algorithms such as for example the algorithm known from WO 2006/032422 A1, there is additionally considered a probability of missed detection of a single failure event according to such an aspect of embodiments of the present invention, thereby allowing to make the estimation of the integrity indicating parameter more exact and less conservative so as to allow to significantly increase the availability of the system.

The probability of missed detection $P_{MD}$ of the single failure event is the sum of two terms, hereafter referred to as $P_{MD\_1}$ and $P_{MD\_2}$, as given in the below equation (9):

$$P_{MD}(\xi,\sigma_{SISA},\sigma_{SISMA}) = P_{MD\_1}(\xi,\sigma_{SISA},\sigma_{SISMA}) + P_{MD\_2}(\xi,\sigma_{SISA},\sigma_{SISMA}) \tag{9}$$

Here, the two terms $P_{MD\_1}$ and $P_{MD\_2}$ are given as indicated in the equations (9a) and (9b) below:

$$P_{MD\_1}(\xi, \sigma_{SISA}, \sigma_{SISMA}) = -\frac{1}{2}\mathrm{erf}\!\left(\frac{\xi - T}{\sqrt{2}\,\sigma_{SISMA}}\right) \tag{9a}$$

$$P_{MD\_2}(\xi, \sigma_{SISA}, \sigma_{SISMA}) = +\frac{1}{2}\mathrm{erf}\!\left(\frac{\xi + T}{\sqrt{2}\,\sigma_{SISMA}}\right) \tag{9b}$$

The letter $\xi$ corresponds to a feared event magnitude of the space vehicle and is a dimensionless parameter which is used, for example, in integrations for determining related probabilities. T is a detection threshold e.g. corresponding to a detection threshold as determined according to equation (4) above, i.e. being a function of the parameter $k_{fa}$ being the constant related to a probability of a false alarm, the signal in space SISA, indicated by the standard deviation $\sigma_{SISA,sat}$, and the signal in space monitoring accuracy SISMA, indicated by the standard deviation $\sigma_{SISMA,sat}$.

The signal in space accuracy SISA and the signal in space monitoring accuracy SISMA also enter directly the formulas for the two terms $P_{MD\_1}$ and $P_{MD\_2}$, as can be seen from the formulas (9a) and (9b) above.

Figure 2:
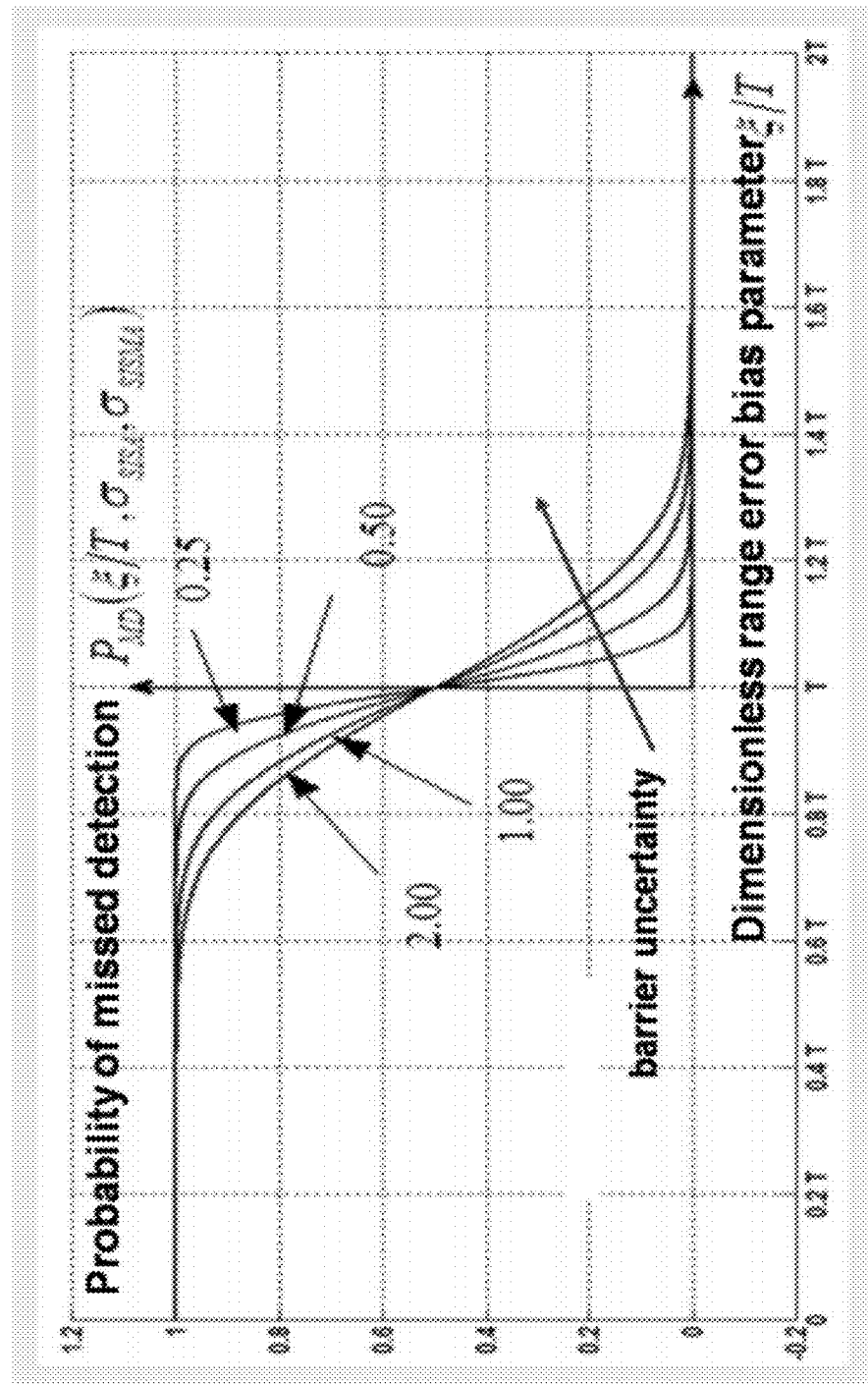
FIG. 2 illustrates an example curve of a probability of missed detection in a faulty condition (single failure event).

FIG. 2 shows an example of the probability $P_{MD}$ of missed detection in a faulty condition (single failure event) for one space vehicle for different values of $\sigma_{SISMA}$ (e.g. $\sigma_{SISMA}$ is 0.25, 0.5, 1, and 2; $\sigma_{SISA}$ is 0.96 in all of the shown probabilities in FIG. 2). The probability of missed detection is a function of the parameters $\xi$, T, $\sigma_{SISA}$, and $\sigma_{SISMA}$, where the probability of missed detection is plotted as a function of the dimensionless range error biased parameter $\xi/T$ in FIG. 2.

As can be seen in FIG. 2, for error magnitude values $\xi$ well below the threshold T, the probability $P_{MD}$ of missed detection is equal to 1 and, on the other hand, for error magnitude values $\xi$ which are significantly larger than the threshold T, the probability $P_{MD}$ of missed detection is zero. However, for error magnitudes $\xi$ close to the threshold T, the evolution of the probability $P_{MD}$ of missed detection depends on the actual values of σSISA and σSISMA and decreases from 1 to 0 for increasing error magnitudes $\xi$ close the threshold T.

It is possible to simplify the second term $P_{MD\_2}$ according to formula (10) below:

$$P_{MD\_2} \cong \frac{1}{2} \tag{10}$$

By performing this simplification, the probability for missed detection becomes as follows:

$$P_{MD}(\xi, \sigma_{SISA}, \sigma_{SISMA}) \cong -\frac{1}{2}\mathrm{erf}\!\left(\frac{\xi - T}{\sqrt{2}\,\sigma_{SISMA}}\right) + \frac{1}{2} = \tag{11}$$

$$\frac{1}{2}\mathrm{erfc}\!\left(\frac{\xi - T}{\sqrt{2}\,\sigma_{SISMA}}\right) = \tilde{P}_{MD}(\xi, \sigma_{SISA}, \sigma_{SISMA})$$

The absolute and relative errors introduced by such a simplification will be discussed quantitatively in the next section.

The probability of impact on the one-dimensional domain X in case of a single feared event is also given by a sum of two terms, in the following equation (12) being labeled as $I_{F,1D\_1}$ and $I_{F,1D\_2}$:

$$I_{F,1D}(\xi,\sigma_{1D,F},k_{1D,F},l_{1D})=I_{F,1D\_1}(\xi,\sigma_{1D,F},k_{1D,F},l_{1D})+I_{F,1D\_2}(\xi,\sigma_{1D,F},k_{1D,F},l_{1D}) \quad (12)$$

Here, the two terms $I_{F,1D\_1}$ and $I_{F,1D\_2}$ are given according to the following equations (12a) and (12b):

$$I_{F,1D\_1}(\xi,\sigma_{1D,F},k_{1D,F},l_{1D}) = \frac{1}{2}\mathrm{erfc}\left(\frac{\frac{l_{1D}}{k_{1D,F}}-\xi}{\sqrt{2}\frac{\sigma_{1D,F}}{k_{1D,F}}}\right) \quad (12a)$$

$$I_{F,1D\_2}(\xi,\sigma_{1D,F},k_{1D,F},l_{1D}) = \frac{1}{2}\mathrm{erfc}\left(\frac{\xi+\frac{l_{1D}}{k_{1D,F}}}{\sqrt{2}\frac{\sigma_{1D,F}}{k_{1D,F}}}\right) \quad (12b)$$

The two terms are given as functions of the parameter $\xi$, the standard deviation $\sigma_{1D,F}$ of the positional error in a certain positional domain X in a single failure event, the parameter $k_{1D,F}$ relating to transformation from range to the positional domain X, and the error threshold $I_X$ in the positional domain X (it is again noted that the subscripts 1D and X both relate to a certain positional domain X and may be interchanged in this context).

When putting in equations (12a) and (12b) into equation (12), the probability of impact $I_{F,1D}$ closely corresponds to the second line of equation (3) above in which the terms are additionally multiplied by the probability corresponding to the above mentioned probability $P_{OC,F}$, thereby making it evident that the algorithm of WO 2006/032422 A1 only considers these two probabilities and neglects a probability $P_{MD}$ of missed detection.

Figure 3:
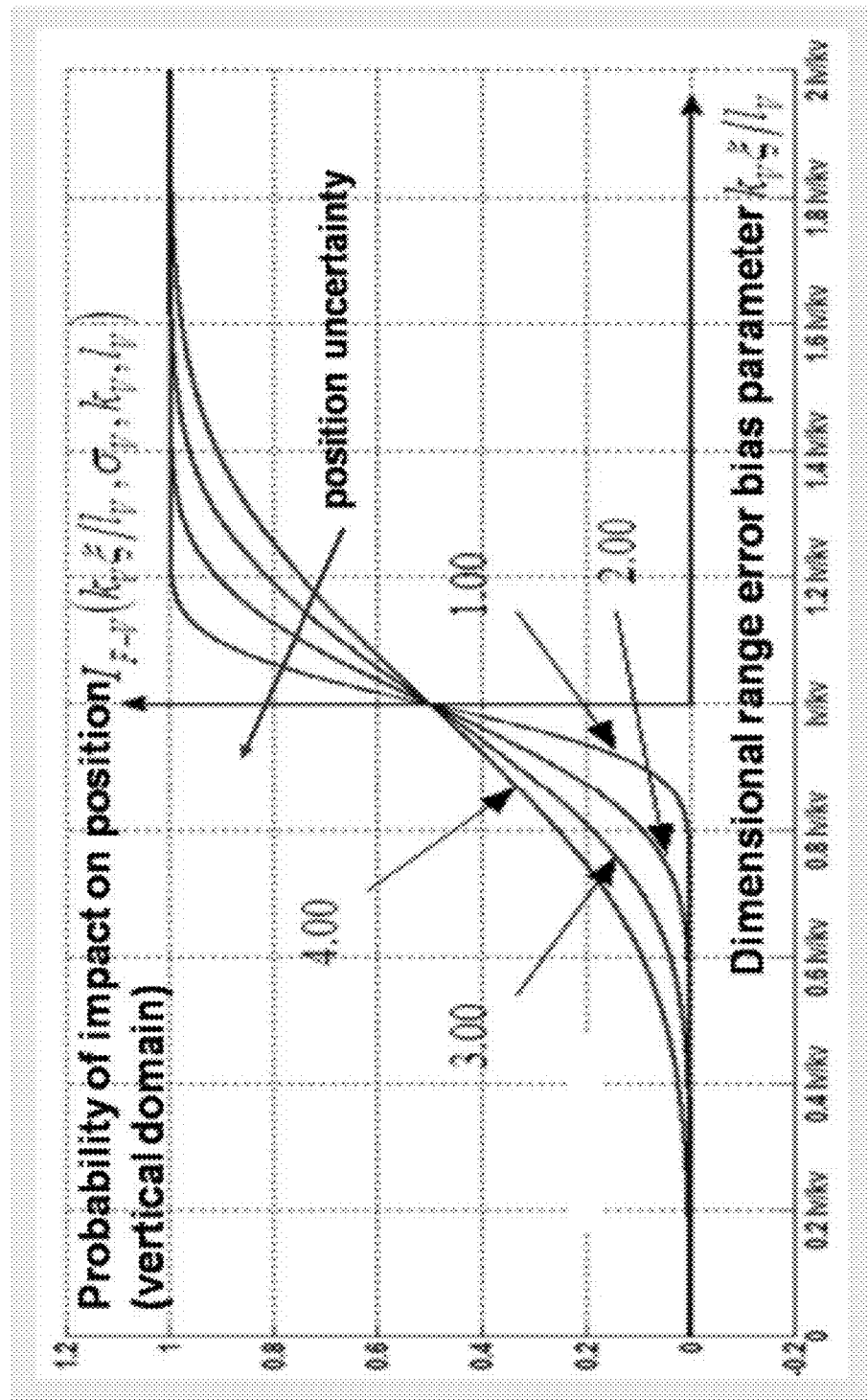
FIG. 3 illustrates an example curve of a probability of impact on a positional domain in a faulty condition (single failure event).

FIG. 3 shows an example of the probability $I_F$ for the vertical domain V as a function of the dimensionless range error bias parameter $K\xi/I_V$. The evolution of the probability of impact on the positional domain V is shown for different values of the standard deviation of the positional error in the positional domain V (e.g. $\sigma_V$=1.0, 2.0, 3.0, and 4.0).

For small error magnitudes $\xi$ close the zero, the probability $I_F$ of impact on the positional domain V is equal to 0 and for error magnitudes significantly larger than $I_V/k_V$, the probability $I_F$ of impact on the positional domain V is equal to 1. However, for error magnitude values $\xi$ close to a value of $I_V/k_V$, the probability $I_F$ of impact on the positional domain V increases from 0 to 1 depending on the actual value of $\sigma_V$.

Regarding the probability $I_F$ of impact on the positional domain X in case of a single failure event can be simplified by assuming that the second term is approximately zero according to the following formula (13):

$$I_{F\_1D\_2}\approx 0 \quad (13)$$

Accordingly, the formula for the probability of impact on the positional domain X in case of the single failure event can be simplified as given in the following formula (14):

$$I_{F,1D}(\xi,\sigma_{1D,F},k_{1D,F},l_{1D}) \cong \frac{1}{2}\mathrm{erfc}\left(\frac{\frac{l_{1D}}{k_{1D,F}}-\xi}{\sqrt{2}\frac{\sigma_{1D,F}}{k_{1D,F}}}\right) = \quad (14)$$

$$\tilde{I}_{F,1D}(\xi,\sigma_{1D,F},k_{1D,F},l_{1D})$$

In this regard, it is to be noted that, after the simplification described above, due to a loss of symmetry of the simplified function, the parameter $k_{1D,F}$ now represents an absolute value of $k_{1D,F}$.

The absolute error and the relative error that are introduced by the above described simplification of the probability of impact on the positional domain X of a single failure event will be described later in the next section.

In accordance with the above simplifications regarding the probability $P_{MD}$ of missed detection and the probability $I_{1D,F}$ of impact on a one-dimensional positional domain X, there can be provided approximated expressions of the probabilities according to the above equations (14) and (11), specifically, the expressions defined as $\tilde{P}_{MD}$ and $\tilde{I}_{1D,F}$.

Accordingly, taking into account the fact that the probability $P_{OMI,F,sat}$ can be given as a product of the probability of the occurrence of a single failure event $P_{OC,F}$, the probability of missed detection $P_{MD}$, and the probability of impact $I_{1D,F}$ on the one-dimensional positional domain X in case of a single failure event, and taking into account the above described simplifications, the contribution of one space vehicle to the probability having a one-dimensional positional error exceeding the error threshold limit $I_{1D}$, i.e. the probability $P_{OMI,F,sat}$ in the fault condition as a function of the range error bias $\xi$ (magnitude of the feared event), can be approximated as given in the following formula (15);

$$P_{OMI,F,sat}(\xi) \cong \frac{P_{OC,F,sat}}{4}\cdot\left[\mathrm{erfc}\left(\frac{\xi-T}{\sqrt{2}\,\sigma_{SISMA}}\right)\right]\cdot\left[\mathrm{erfc}\left(\frac{\frac{l_{1D}}{k_{1D,F}}-\xi}{\sqrt{2}\frac{\sigma_{1D,F}}{k_{1D,F}}}\right)\right] = \quad (15)$$

$$\tilde{P}_{OMI,F,sat}(\xi)$$

Figure 4:
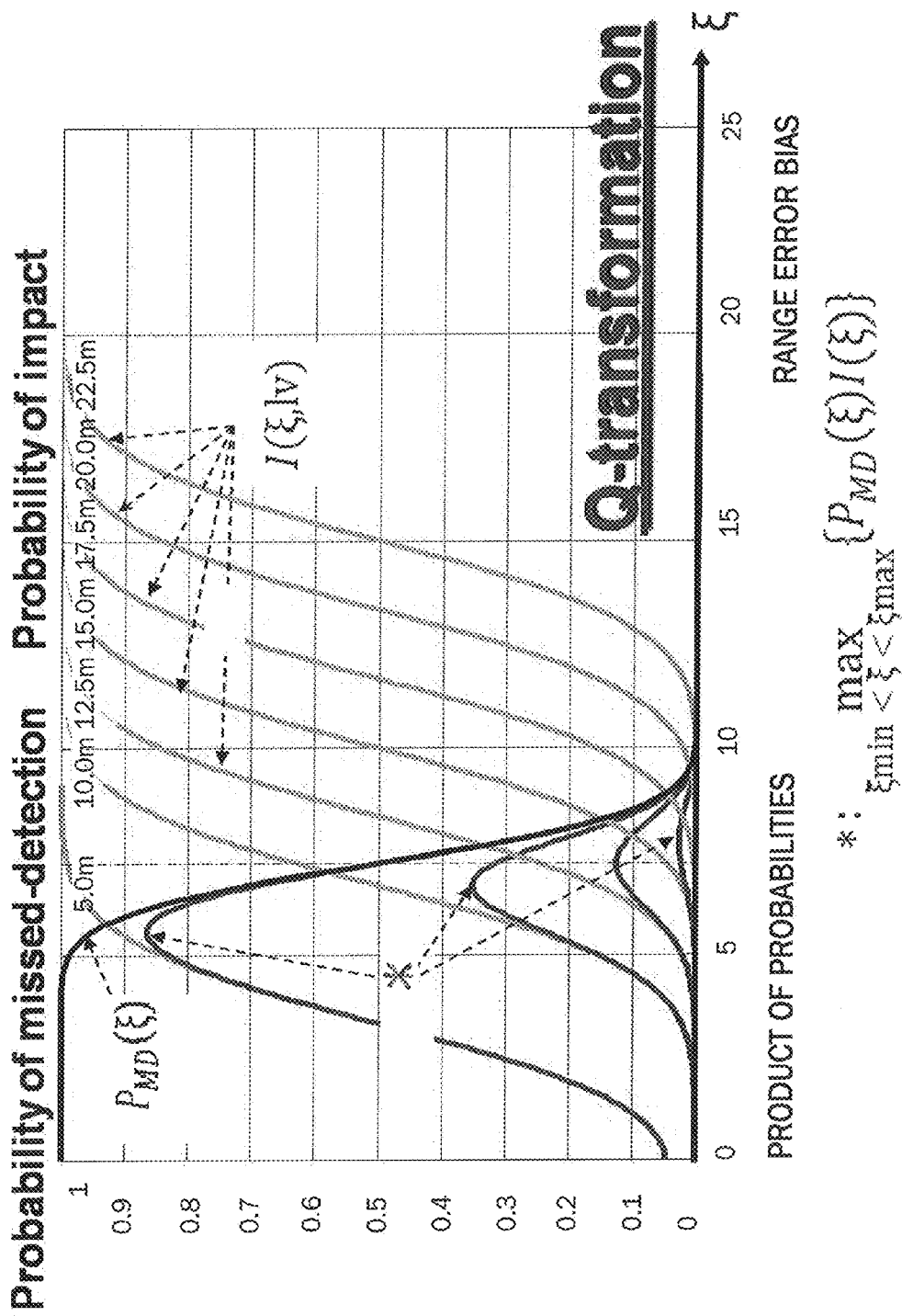
FIG. 4 exemplarily illustrates a curve of the product of the probabilities of missed detection and of impact on a positional domain in the faulty condition (single failure event).

FIG. 4 shows the resulting evolutions of the product of the probability $P_{MD}$ of missed detection and the probability $I_F$ of impact in accordance with the contributions from these probabilities to the probability $P_{OMI,F,sat}$ of equation (5) above.

Here, the different evolutions of the probability $I_F$ of impact are given for plural values of error thresholds $I_V$ (e.g. $I_V$=5.0 m, 10.0 m, 12.5 m, 15.0 m, 12.5 m, 20.0 m, and 22.5 m). However, the probability $P_{MD}$ is not depending on the value of the error threshold $I_V$ and remains the same.

As can be seen in FIG. 4, the product of the probability $P_{MD}$ of missed detection and the probability $I_{F,V}$ of impact changes with changing error thresholds $I_V$. For the determination of an upper bound of the integrity risk IR, the maximal value of the product has to be considered.

According to an embodiment of the present invention, this can be assured by a derivative condition as for example indicated in equation (20) below. The strength of the embodiments of the present invention according to the second aspect and according to preferred aspects of the first aspect of the present invention is that the probability of missed detection is not only considered as an independent parameter but can be exactly considered in terms of the product of the probability $P_{MD}$ of missed detection and the probability of impact $I_{F,X}$ as shown in FIG. 4. By considering the product of the probability $P_{MD}$ of missed detection and the probability of impact $I_{F,X}$, the determination of the integrity indicating parameter such as the integrity risk IR and/or the protection level PL can be performed more accurately and less conservative than according to methods and algorithms known to the prior art.

According to a preferred aspect of the present invention, there is now provided a definition for two auxiliary functions $a(\xi)$ and $b(\xi)$ which are defined according to the following equations (16) and (17):

$$a(\xi) = \frac{\xi - T}{\sqrt{2}\,\sigma_{SISMA}} \quad (16)$$

$$b(\xi) = \frac{\frac{l_{1D}}{k_{1D,F}} - \xi}{\sqrt{2}\,\frac{\sigma_{1D,F}}{k_{1D,F}}} \quad (17)$$

According to these definitions of the auxiliary functions $a(\xi)$ and $b(\xi)$ the formula for the overall space vehicle contribution to the probability $P_{OMI,F,sat}$ can be reformulated according to the formula (18) below:

$$P_{OMI,F,sat}(a,b) \cong \frac{P_{OC,F,sat}}{4} \cdot [\text{erfc}(a(\xi))] \cdot [\text{erfc}(b(\xi))] = \tilde{P}_{OMI,F,sat}(a,b) \quad (18)$$

This can be rewritten in an equivalent (implicit) form as follows:

$$P_{OMI,F,sat} - \frac{P_{OC,F,sat}}{4} \cdot [\text{erfc}(a(\xi))] \cdot [\text{erfc}(b(\xi))] = \quad (19)$$
$$Q_P(P_{OMI,F,sat}a, b) = 0$$

According to this equivalent form of formula (18) as written in equation (19), the left hand side of equation (19) is equal to zero, and the result is defined as a function $Q_P$ which is a function of the probability $P_{OMI,F,sat}$ and the auxiliary functions $a(\xi)$ and $b(\xi)$.

By further determining the first derivative condition for finding the worst range error bias, i.e. a bias corresponding to the maximum of the probability $P_{OMI,F,sat}$ as a function of $\xi$ is given according to formula (20):

$$\frac{d\tilde{P}_{OMI,F,sat}[a(\xi),b(\xi)]}{d\xi} = 0 \quad (20)$$

According to the product rule for derivatives, this can be reformulated in terms of partial derivatives as follows:

$$\frac{d\tilde{P}_{OMI,F,sat}}{da} \cdot \frac{da}{d\xi} + \frac{d\tilde{P}_{OMI,F,sat}}{db} \cdot \frac{db}{d\xi} = 0 \quad (21)$$

This can be rewritten according to equation (22) below by putting in the definition of equation (15) into equation (20) above:

$$\frac{d\,\text{erfc}(a)}{da} \cdot \text{erfc}(b) \cdot \frac{da}{d\xi} + \text{erfc}(a) \cdot \frac{d\,\text{erfc}(b)}{db} \cdot \frac{db}{d\xi} = 0 \quad (22)$$

Furthermore, the general expression for the computation of the derivative of the error function erf according to the below equation (23) can be used in equation (22):

$$\frac{d\,\text{erfc}(a)}{da} = \frac{d[1 - \text{erf}(a)]}{da} = -\frac{2}{\sqrt{\pi}}e^{-a^2} \quad (23)$$

Furthermore, the derivatives of the auxiliary functions $a(\xi)$ and $b(\xi)$ can be derived according to the following equations (24) and (25):

$$\frac{da}{d\xi} = \frac{1}{\sqrt{2}\,\sigma_{SISMA}} \quad (24)$$

$$\frac{db}{d\xi} = \frac{-1}{\sqrt{2}\,\frac{\sigma_{1D,F}}{k_{1D,F}}} \quad (25)$$

When inputting the above formulas (23) to (25) into formula (22), one arrives at the equation according to formula (26) below:

$$-e^{-a^2} \cdot \text{erfc}(b) \cdot \frac{1}{\sigma_{SISMA}} + \text{erfc}(a) \cdot e^{-b^2} \cdot \frac{1}{\frac{\sigma_{1D,F}}{k_{1D,F}}} = 0 \quad (26)$$

This can be rewritten according to equation (27):

$$-e^{-a^2} \cdot \text{erfc}(b) + K_S \cdot \text{erfc}(a) \cdot e^{-b^2} = Q_{dP}(a,b,K_S) = 0 \quad (27),$$

wherein the following definition is used for the parameter $K_S$:

$$K_S = \frac{\sigma_{SISMA}}{\frac{\sigma_{1D,F}}{k_{1D,F}}} \quad (28)$$

Also according to the above reformulations, the left-hand side of equation (27) is equal to zero and is further defined to be a function $Q_{dP}$ which is a function of the auxiliary functions $a(\xi)$, $b(\xi)$ and the defined auxiliary parameter $K_S$.

Furthermore, from the definitions of the auxiliary functions $a(\xi)$ and $b(\xi)$ according to equations (16) and (17) above, equation (16) can be solved for $\xi$, which can be then inputted in equation (17) as given in the below equations (29) and (30):

$$\xi = \sqrt{2}\,\sigma_{SISMA} \cdot a + T \quad (29)$$

$$b = -\frac{\sigma_{SISMA}}{\frac{\sigma_{1D,F}}{k_{1D,F}}} \cdot a + \frac{\frac{l_{1D}}{k_{1D,F}} - T}{\sqrt{2}\,\frac{\sigma_{1D,F}}{k_{1D,F}}} \quad (30)$$

By shifting all parameters to the left-hand side, the equation (30) can be reformulated according to equation (31):

$$b + K_S \cdot a - (K_L - K_T) = Q_{ab}(a,b,K_S,K_L,K_T) = 0 \quad (31),$$

in which the following definitions of the auxiliary parameters $K_{L,F}$ and $K_T$ according to equations (32) and (33) are used:

$$K_{L,F} = \frac{\frac{l_{1D}}{k_{1D,F}}}{\sqrt{2}\frac{\sigma_{1D,F}}{k_{1D,F}}} = \frac{l_{1D}}{\sqrt{2}\,\sigma_{1D,F}} \quad (32)$$

$$K_T = \frac{T}{\sqrt{2}\frac{\sigma_{1D,F}}{k_{1D,F}}} \quad (33)$$

In equation (31), the left-hand side is equal to zero and is further defined as a function $Q_{ab}$ which is a function of the auxiliary functions $a(\xi)$, $b(\xi)$, and the defined auxiliary parameters $K_S$, $K_L$, and $K_T$, as defined in equations (32), (33), and (28) above.

Accordingly, as defined in equations (19), (27), and (31) above, there is derived a system of non-linear equations according to the following equations (34).

$$\begin{cases} Q_P(P_{OMI,F,sat}, a, b) = 0 \\ Q_{dP}(a, b, K_S) = 0 \\ Q_{ab}(a, b, K_S, K_{L,F}, K_T) = 0 \end{cases} \quad (34)$$

This system of non-linear equations identifies the so-called O-transformation and also Q*-transformation that can be used to solve a problem of computation of an integrity risk and the problem of computing a protection level in accordance with an embodiment of the present invention. Here, the terms Q-transformation and Q*-transformation are terms given to the above set of non-linear equations according to equation (34) by the inventors of the present invention.

Determination of Integrity Indicating Parameters

The so-called Q-transformation and Q*-transformation are based on these parameter functions $Q_P$, $Q_{dP}$, and $Q_{ab}$. Specifically, using the above-mentioned three non-linear equations of formula (34) above for the determination of an integrity risk parameter is referred to as the so-called Q-transformations, and the determination of a protection level parameter based on the above three non-linear equations are referred to as the so-called Q*-transformations.

The so-called Q-transformation is a mathematical solution of the probability $P_{OMI,F,sat}$ from the above non-linear equations system according to equation (34), when the auxiliary parameters $K_S$ and $K_{L,F}$-$K_T$ are known (here, the parameters $K_S$ and $K_{L,F}$-$K_T$ correspond to an embodiment of the first and second auxiliary parameters as determined in a preferred aspect of the present invention as described under the section "Summary of the Invention"). Then, the solution $P_{OMI,F,sat}$ can be determined as an output parameter of the Q-transformation when inputting the auxiliary parameters $K_S$ and $K_{L,F}$-$K_T$.

On the other hand, the so-called Q*-transformation corresponds to the mathematical solution of the output parameter $k_{L,F}$-$K_T$ from the above non-linear equation system according to equation (34) when the auxiliary parameters $K_S$ and $P_{OMI,F,sat}$ are known (in this case, the parameters $K_S$ and $P_{OMI,F,sat}$ are embodiment of first and second auxiliary parameters as described with reference to preferred aspects of the present invention). The parameter $K_{L,F}$-$K_T$ can then be determined as an output parameter from the Q*-transformation, when inputting the auxiliary parameters $K_S$ and $P_{OMI,F,sat}$, wherein it is possible to directly derive a protection level PL from the output parameter $K_{L,F}$-$K_T$.

Figure 5:
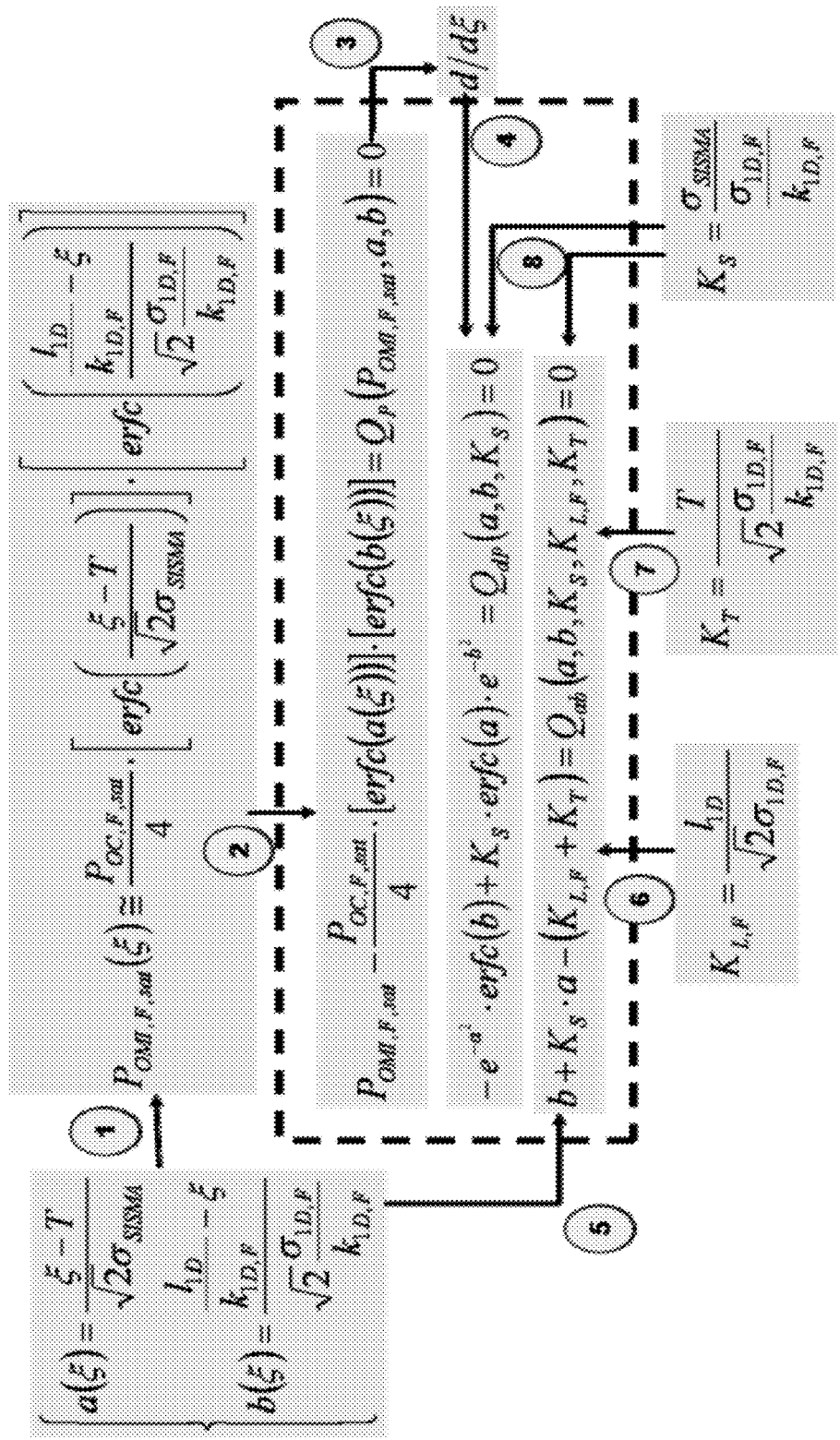
FIG. 5 illustrates an example of the derivation of non-linear equations for auxiliary relation indicating parameter functions $Q_P$, $Q_{dP}$, and $Q_{ab}$ according to an embodiment of the present invention.

FIG. 5 exemplarily illustrates the derivation of the non-linear equations of the functions $Q_P$, $Q_{dP}$, and $Q_{ab}$ as given in equation (34) above, wherein the illustrations in FIG. 5 are based on the above so mentioned equation (15) in combinations with equations (16) and (17), i.e. the definitions of the auxiliary functions $a(\xi)$ and $b(\xi)$ are inserted in equation (15) in order to arrive at equation (19). Then, equation (18) is used for a derivative condition with respect to a derivative in terms of the variable $\xi$ in order to arrive at equation (27). On the other hand, the definitions of the parameters $K_{L,F}$, $K_P$, and $K_S$ are inserted in the definitions of the auxiliary functions $a(\xi)$ and $b(\xi)$ of equations (16) and (17) in order to arrive at equation (31). By these steps, the three non-linear equations for the parameter functions $Q_P$, $Q_{dP}$, and $Q_{ab}$ can be derived.

Figure 6:
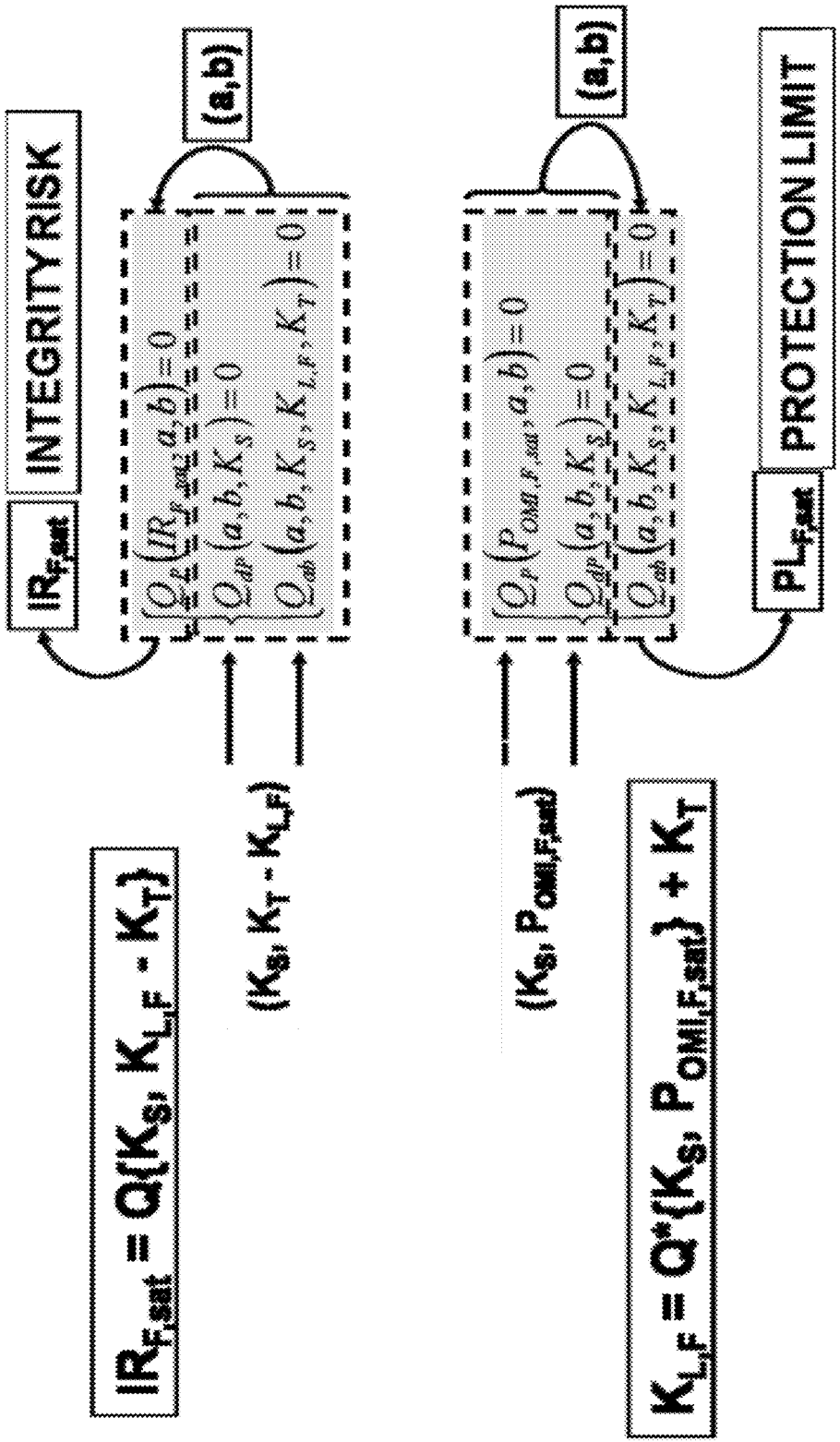
FIG. 6 illustrates the determination of an integrity risk and of a protection limit based on the so-called Q-transformation and the so-called Q*-transformation based on the set of auxiliary relation indicating non-linear equations for $Q_P$, $Q_{dP}$, and $Q_{ab}$ according to an embodiment of the present invention.

The basic principle of determination of the integrity risk parameter and a protection level parameter using the three non-linear equations for the parameter functions $Q_P$, $Q_{dP}$, and $Q_{ab}$ are illustrated in FIG. 6 in connection with an embodiment of the present invention.

When determining an integrity risk parameter, the auxiliary parameters $K_S$ and $K_L$-$K_T$ have to be determined based on an input parameter and a protection level of integrity indicating parameters so as to be inserted in the two non-linear equations for the parameter functions $Q_{dP}$, and $Q_{ab}$ so as to solve these two non-linear equations for the auxiliary parameters a and b. Then, the determined parameters a and b can be inputted into the non-linear equation for $Q_P$ in order to determine the integrity risk parameter, e.g. $IR_{F,sat}$. Such a determination is referred to as Q-transformation which relates to a "transformation" of the auxiliary parameters $K_S$ and $K_L$-$K_T$ into the integrity risk indicating parameters such as the integrity risk $IR_{F,sat}$.

When determining a protection limit parameter, the auxiliary parameter $K_S$ is determined and is used together with the auxiliary parameter $P_{OMI,F,sat}$ for determining the auxiliary parameters a and b based on the two non-linear equations for $Q_P$ and $Q_{dP}$. Then, the determined parameters a, b can be used to determine the parameter $K_L$-$K_T$ based on the non-linear equation for the parameter function $Q_{ab}$ on the basis of the determined parameters a and b and the determined parameter $K_S$. Then, the protection limit parameter such as for example $PL_{F,sat}$ can be determined from the parameter $K_L$-$K_T$. This is referred to as the so-called Q*-transformation of the parameters $K_S$ and $P_{OMI,F,sat}$ into the parameter $K_L$-$K_T$ for determining a protection limit parameter from the output parameter of the Q*transformation $K_L$-$K_T$.

Figure 7:
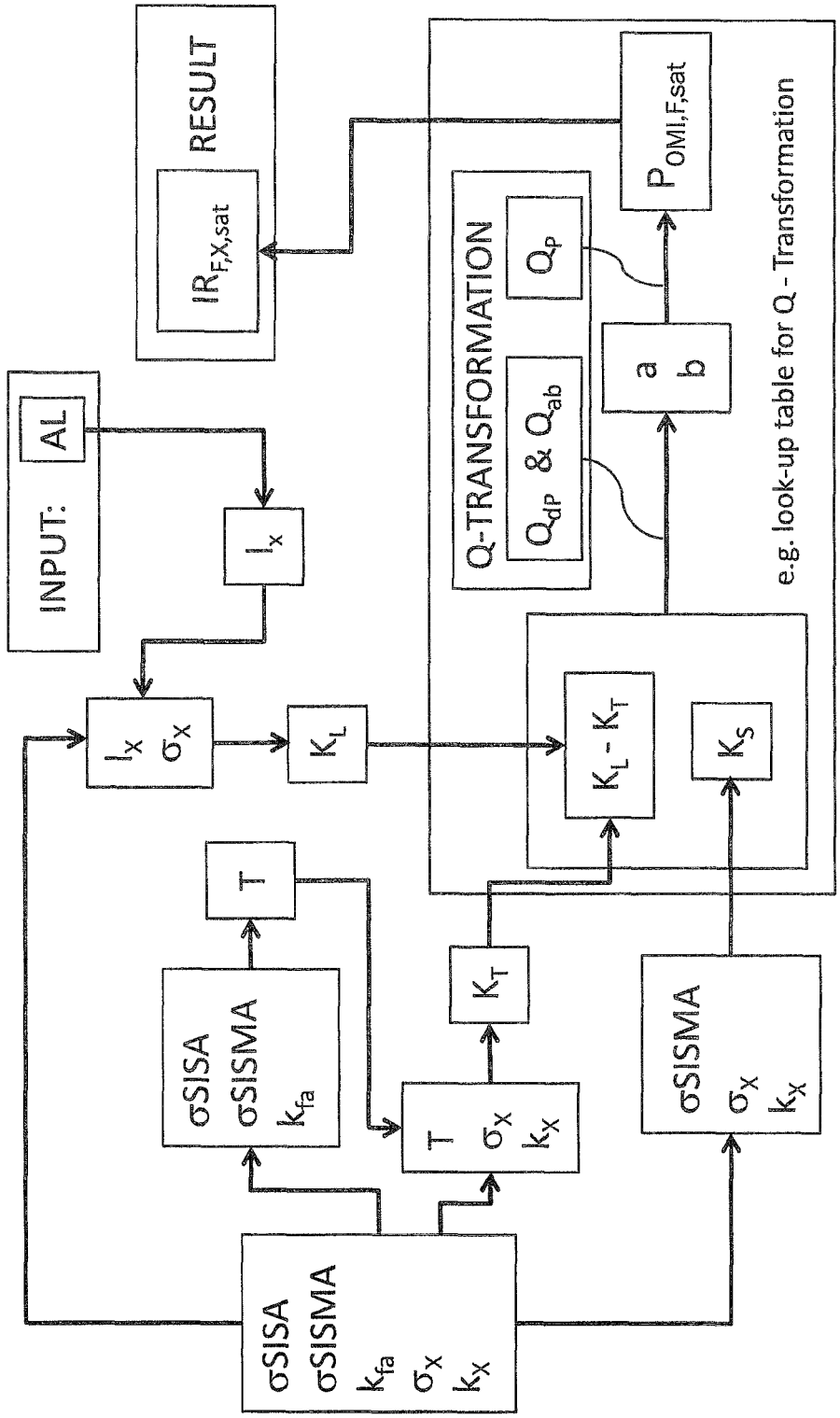
FIG. 7 exemplarily illustrates a determination of an integrity risk parameter at a predetermined alert limit AL according to an embodiment of the present invention.

FIG. 7 shows a principle of determination an integrity risk parameter such as $IR_{F,X,sat}$ on the basis of the above-mentioned Q-transformation according to an embodiment of the present invention. For determining an integrity risk parameter, an input parameter relating to the error threshold $I_X$ is required. The error threshold $I_X$ as an input parameter is referred to as an alert limit $AL_X$ in the positional domain X, i.e. the input parameter $AL_X$ defines the value of the parameter $I_X$. Furthermore, for the determination of an integrity risk parameter, the integrity information parameters $\sigma_{SISA}$, $\sigma_{SISMA}$, $k_{fa}$, $\sigma_X$, and $k_X$ have to be provided.

Here, at least the parameters $\sigma SISA$ and $\sigma SISMA$ can be received from one or more of the space vehicles and/or one or more of ground stations of the global positioning system. The parameter $k_{fa}$ may so be also received or can be provided on the basis of a predetermined value which may, for example, be already stored in a storage means. It is preferred that also the parameters $\sigma_X$ and $k_X$ are provided and/or received at an apparatus for determining the integrity risk indicating parameter.

In case the parameters $I_X$, $\sigma SISA$, $\sigma SISMA$, $k_{fa}$, $\sigma_X$, and $k_X$ are known, the integrity risk indicating parameter can be determined on the basis of these parameters by using the concept as illustrated in FIG. 7. For instance, the threshold parameter T can be determined on the basis of the parameters $k_{fa}$, $\sigma SISMA$, and $\sigma SISA$, as indicated in FIG. 7 on the basis of formula (4) above.

Furthermore, the parameter $K_T$ can be determined from the parameters T, $\sigma_X$, and $k_X$ on the basis of equation (33) above. Furthermore, the parameter $K_L$ can be determined from the parameters $I_X$ and $\sigma_X$ on the basis of equation (32) above.

From the parameters $K_T$ and $K_L$, the parameter $K_L$-$K_T$ can be determined. In addition the parameter $K_S$ can be determined from the parameters $\sigma_{SISMA}$, $\sigma_X$, and $k_X$ on the basis of equation (28) above. When the auxiliary parameters $K_L$-$K_T$ and $K_S$ are known (for example realizing the first and the second auxiliary parameter of some of the preferred aspects as described under the section "Summary of the Invention"), these parameters can be used to determine the parameters a and b on the basis of the relations for the parameter functions $Q_{dP}$ and $Q_{ab}$ as also indicated in FIG. 6. From the parameters a, b, the probability $P_{OMI,F,sat}$ can be determined on the basis of the equation (19) for the parameter function $Q_P$. Here, the successive utilization of the linear equations for $Q_{dP}$, $Q_{ab}$, and $Q_P$ is referred to as the Q-transformation, having the probability $P_{OMI,F,sat}$ as an output parameter thereof.

The Q-transformation can embody an auxiliary relation which may be provided and/or stored as a look-up table for the Q-transformations as will be described later. Then, the probability $P_{OMI,F,sat}$ is corresponding to the partial integrity risk parameter $IR_{F,X,sat}$ so that this partial integrity risk parameter can be determined according to the concept of FIG. 7 according to an embodiment of the present invention. This can be then summed together with other partial integrity risks for example for other positional domains X and/or for other space vehicles sat, so as to arrive at an integrity risk parameter $IR_F$, which may be further combined with an integrity risk indicating parameter such as $IR_N$ which indicates the integrity risk contribution coming from the fault-free condition.

Figure 8:
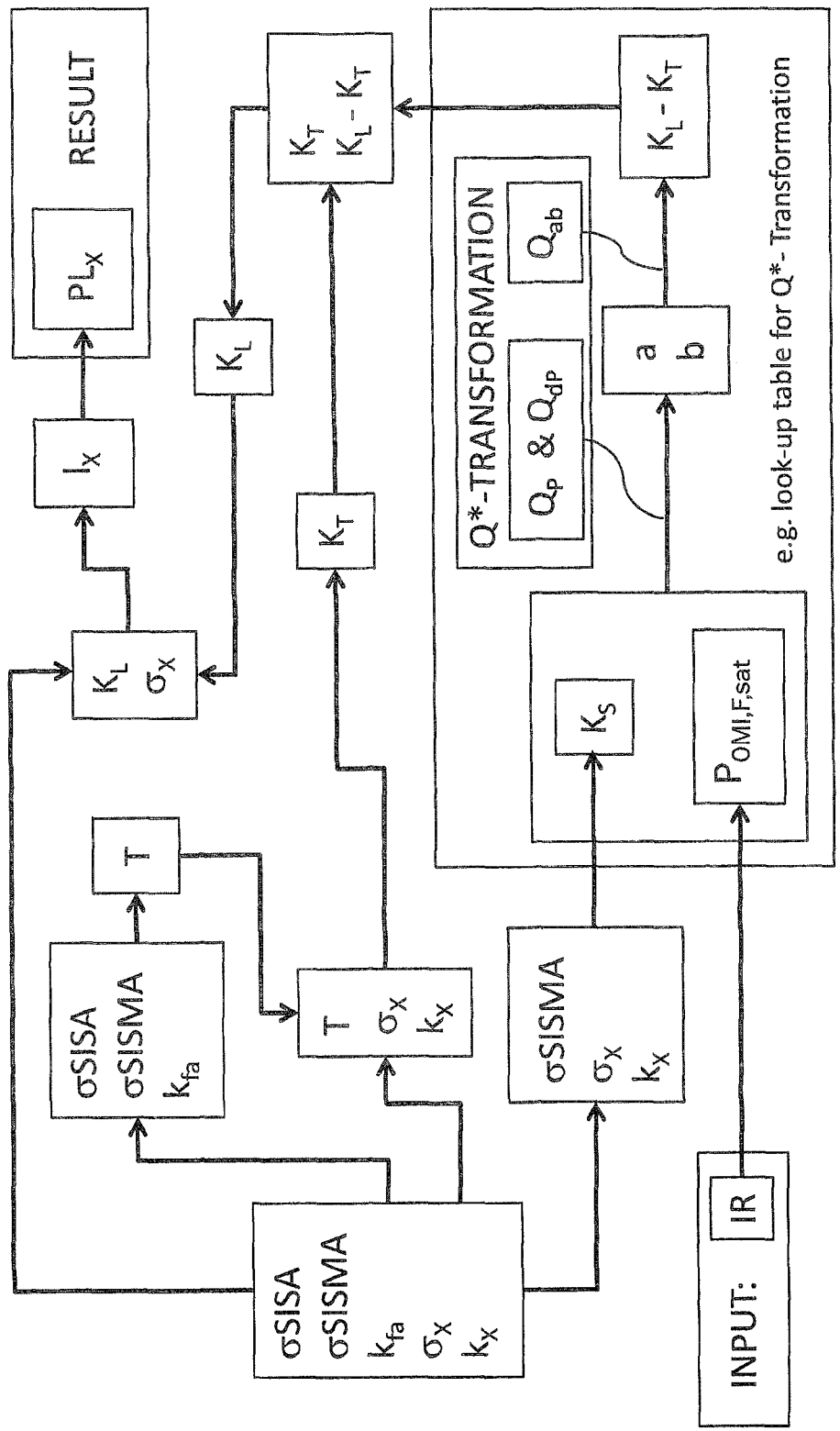
FIG. 8 exemplarily illustrates a determination of a protection limit PL depending on a predetermined integrity risk IR according to an embodiment of the present invention.

FIG. 8 shows a concept of determining a protection level parameter PL on the basis of the so-called Q*-transformation. Here, for the determination of a probability level parameter PL, an integrity risk indicating parameter such as IR or at least a partial integrity risk IR being related to at least one of a positional domain X and/or a specific space vehicle sat is required as input parameter. From such an input parameter, a probability $P_{OMI,F,sat}$ can be determined and, in addition thereto, the further integrity information parameters $\sigma_{SISA}$, $\sigma_{SISMA}$, $k_{fa}$, $\sigma_X$, and $k_X$ are required according to this embodiment of the present invention similar to the concept of FIG. 7 as described above.

Again, on the basis of the parameters $k_{fa}$, $\sigma_{SISA}$, and $\sigma_{SISMA}$, the threshold parameter T can be determined which can be further used to determine the parameter $K_T$ in combination with the knowledge about the parameters $\sigma_X$ and $k_X$. Furthermore, the parameter $K_S$ can be determined from the parameters $\sigma_{SISMA}$, $\sigma_X$, and $k_X$ similar to the determination of the parameter $K_S$ as described with reference to the FIG. 7. The parameters $K_S$ and $P_{OMI,F,sat}$ can then be inputted into the non-linear equations for the parameter functions $Q_P$ and $Q_{dP}$ for determining the parameters a and b. Here, the parameters $K_S$ and $P_{OMI,F,sat}$ embody the first and second auxiliary parameters as described above under the section "Summary of the Invention" according to an embodiment of the present invention.

Then, the parameters a and b can be inputted into the equation for the parameter function $Q_{ab}$ for determining the parameter $K_L$-$K_T$ as an output parameter of the Q*-transformation. Here, the term Q*-transformation refers to the successive application of the non-linear equations $Q_P$ and $Q_{dP}$ and then $Q_{ab}$ as indicated in FIG. 8. Similar to the description of FIG. 7, also the Q*-transformation may be represented as an auxiliary relation which may be, for example, provided and/or stored in a look-up table representing an auxiliary relation based on the Q-transformation.

Finally, upon the knowledge of the auxiliary parameters $K_T$ and $K_L$-$K_T$, the parameter $K_L$ can be determined, which can be used for determining the corresponding error threshold $I_X$ from the parameters $K_L$ and $\sigma_X$ on the basis of the equation (32) above. Then, the determined error threshold $I_X$ can be identified as a protection level indicating parameter $PL_X$ in the positional domain X. This can be used as the to be determined integrity indicating parameter or an integrity indicating parameter can be determined on the basis of the parameter $PL_X$ and other protection level indicating parameters such as protection level indicating parameters from other positional domains X and/or other space vehicles sat.

Figure 9:
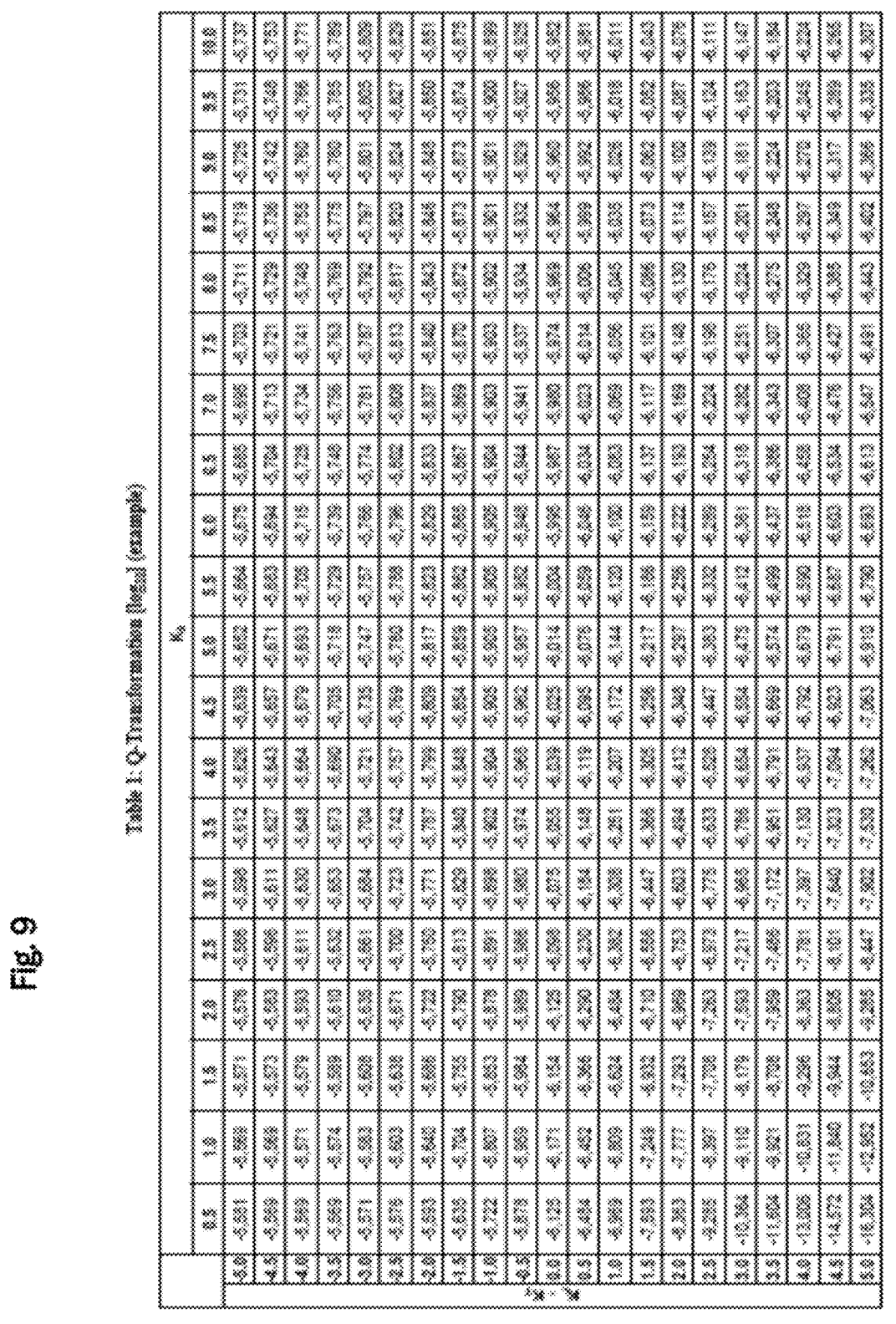

FIG. 9 shows an example of a look-up table relating to an example of a Q-transformation as described above, for example, with reference to FIG. 7. The look-up table as shown in FIG. 9 comprises different output values indicated in lines and columns in dependence of the auxiliary parameters $K_L$-$K_T$ on the left-hand side and $K_S$ on the upper-hand side.

A look-up table for a Q-transformation as exemplarily shown in FIG. 9 makes it efficiently and easily possible to determine an output parameter of the Q-transformation on the basis of the auxiliary parameter $K_L$-$K_T$ and $K_S$ by simply looking up the right column and the right line and identifying the corresponding output parameter. Furthermore, it is possible to interpolate values in between on the basis of the look-up table.

A look-up table for a Q-transformation as exemplarily shown in FIG. 9 can be pre-calculated to be efficiently provided, for example stored in a storage means of an apparatus, for determining an integrity indicating parameter so that there a significant reduction of computational burden, required processing power and processing time is possible since the output parameter can be easily determined on the basis of the previously determined auxiliary parameter $K_L$-$K_T$ and $K_S$. $K_L$-$K_T$ and $K_S$ which can be determined from the received and/or provided integrity indicating parameters by simple calculation steps involving addition and multiplication operations.

Figure 10:
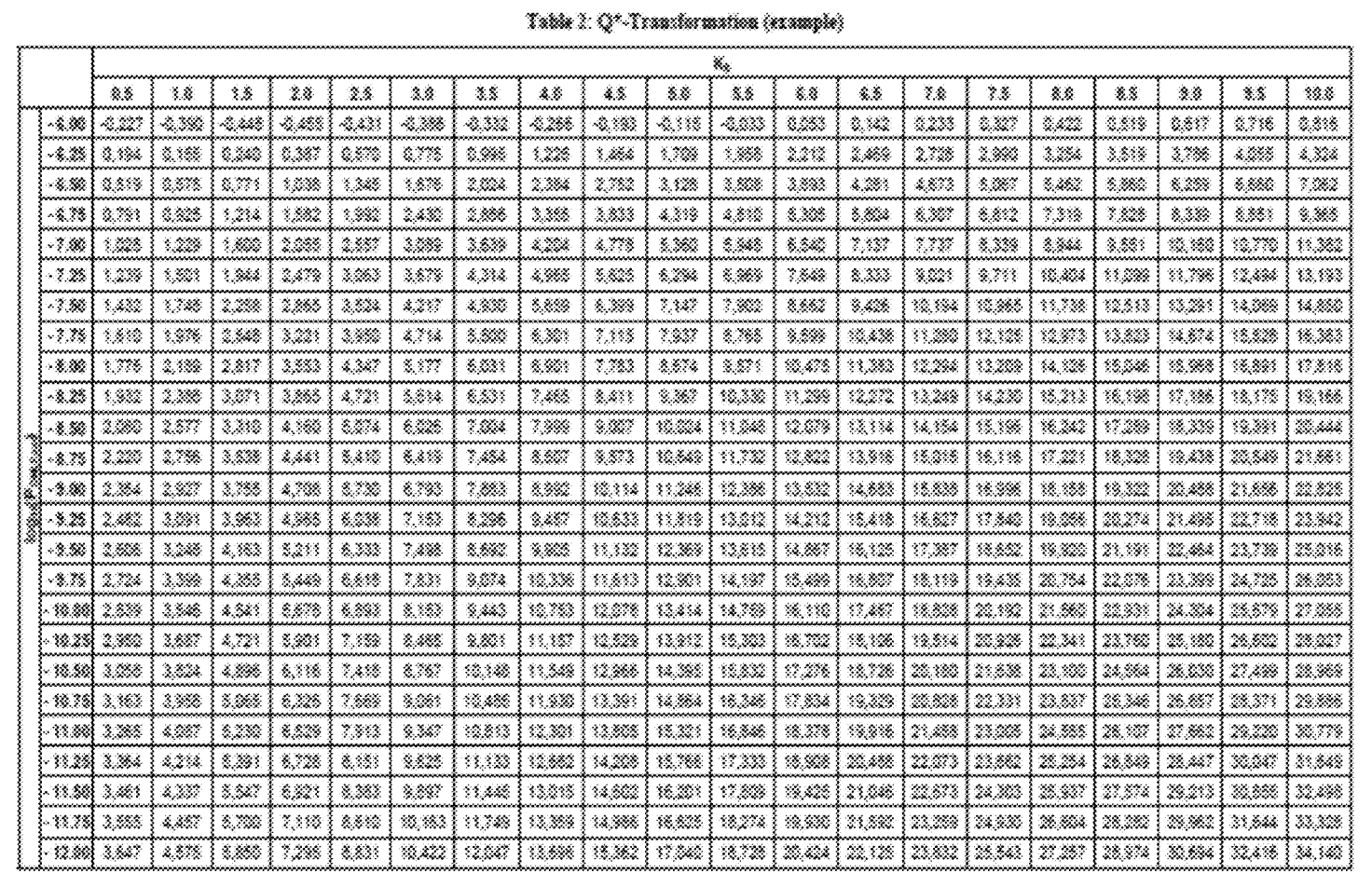

FIG. 10 shows an example of a look-up table relating to an example of a Q-transformation as described above, for example with reference to FIG. 7. The look-up table as shown in FIG. 10 comprises different output values indicated in lines and columns in dependence of the auxiliary parameters $P_{OMI,F,sat}$ on the left-hand side and $K_S$ on the upper-hand side.

A look-up table for a Q*-transformation as exemplarily shown in FIG. 10 makes it efficiently and easily possible to determine an output parameter of the Q*-transformation on the basis of the auxiliary parameter $P_{OMI,F,sat}$ and $K_S$ by simply looking for the right column and the right line and identifying the corresponding output parameter. Furthermore, it is possible to easily interpolate values in between on the basis of the look-up table.

A look-up table for a Q*-transformation as exemplarily shown in FIG. 10 can be pre-computed to be efficiently provided, for example stored in a storage means of an apparatus, for determining an integrity indicating parameter so that a significant reduction of computational burden, required processing power and processing time is possible since the output parameter can be easily determined on the basis of the previously determined auxiliary parameter $P_{OMI,F,sat}$ and $K_S$ which can be determined from the received and/or provided integrity indicating parameters by simple calculation steps involving addition and multiplication operations.

Figure 11:
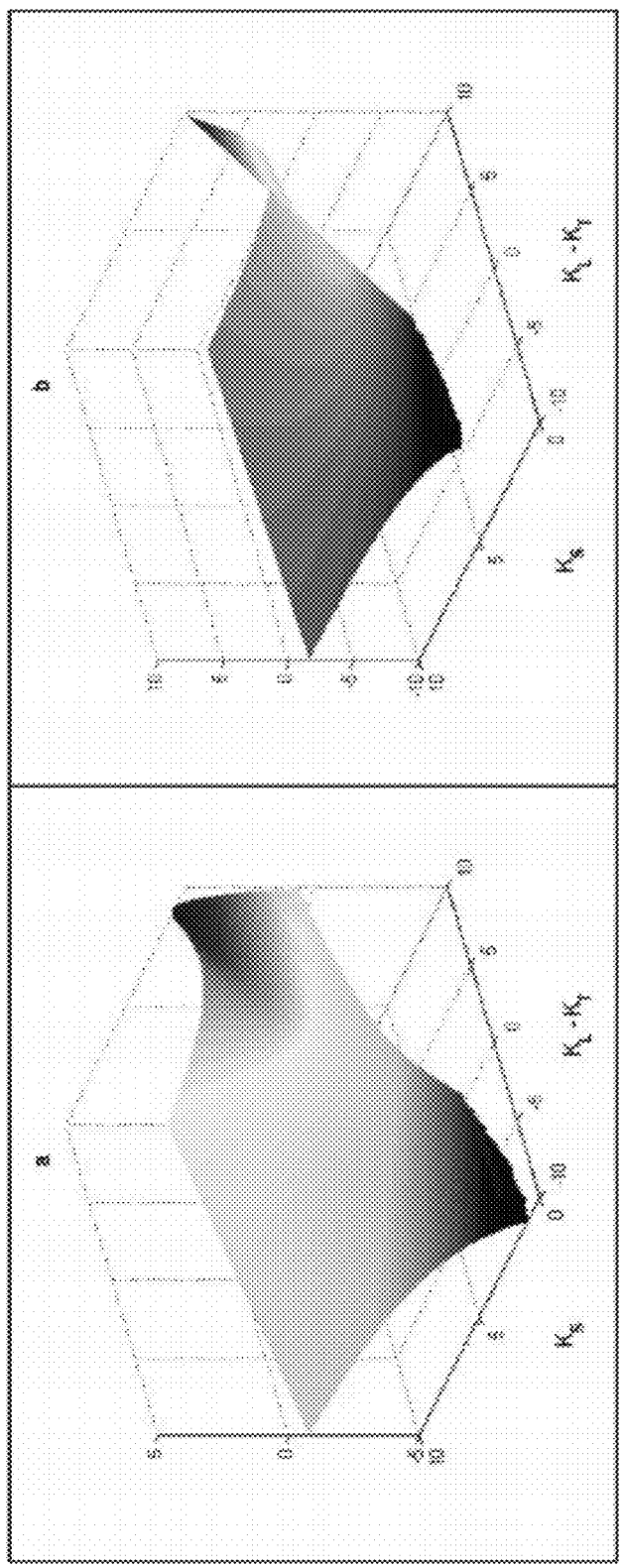
FIGS. 11A and 11B exemplarily show values of the auxiliary parameter functions a and b in dependence on the auxiliary parameters $K_S$ and $K_L$-$K_T$ according to an embodiment of the present invention.
Figure 12:
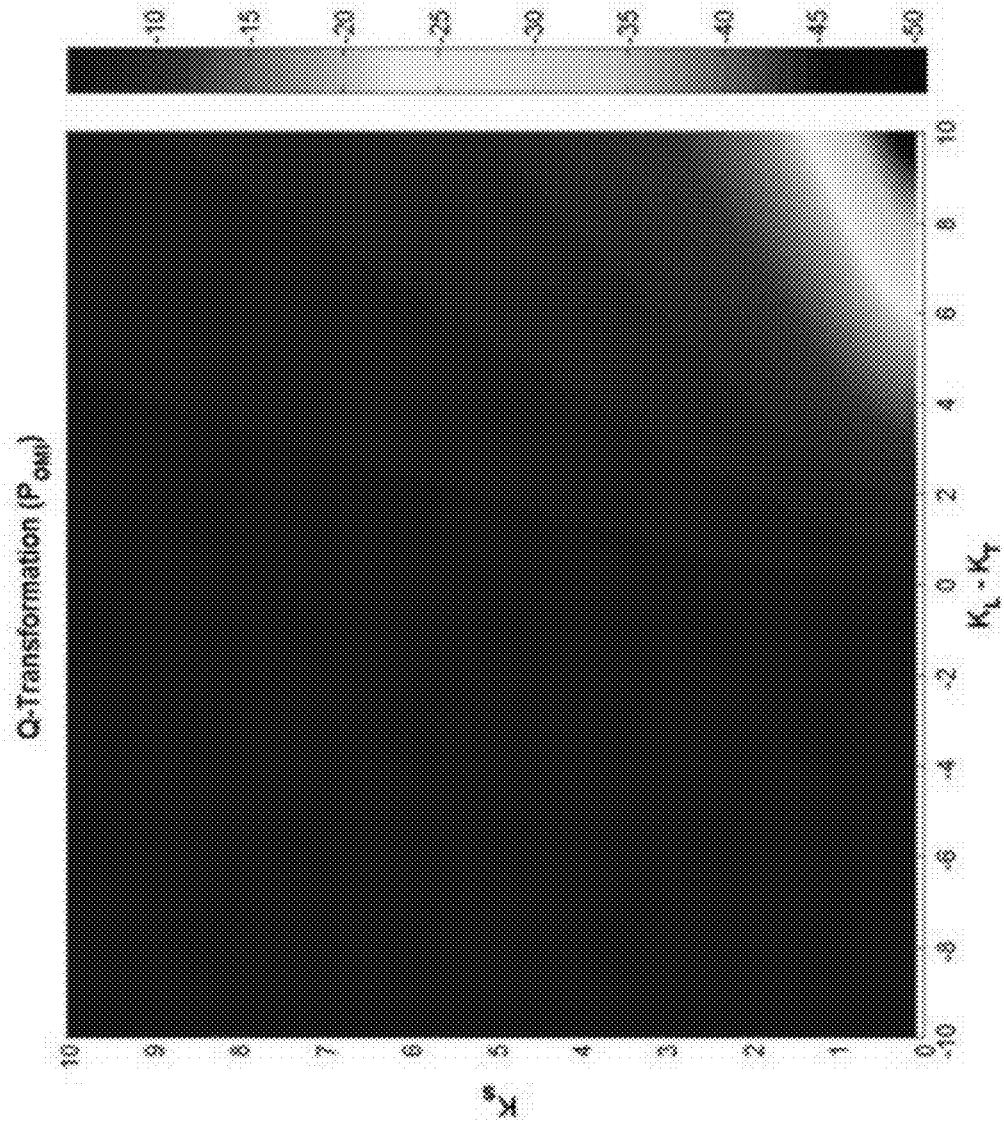
FIG. 12 exemplarily illustrates values of a probability $P_{OMI}$ according to a Q-transformation based so on the auxiliary parameters $K_S$ and $K_L$-$K_T$ for determining parameters of a look-up table as, for example, shown in FIG. 9.

FIGS. 11A and 11B exemplarily show values of the auxiliary parameter functions a and b in dependence on the auxiliary parameters $K_S$ and $K_L$-$K_T$ according to an embodiment of the present invention. FIG. 12 exemplarily illustrates values of a probability $P_{OMI}$ according to a Q-transformation based on the auxiliary parameters $K_S$ and $K_L$-$K_T$ for determining parameters of a look-up table as, for example, shown in FIG. 9.

Figure 13:
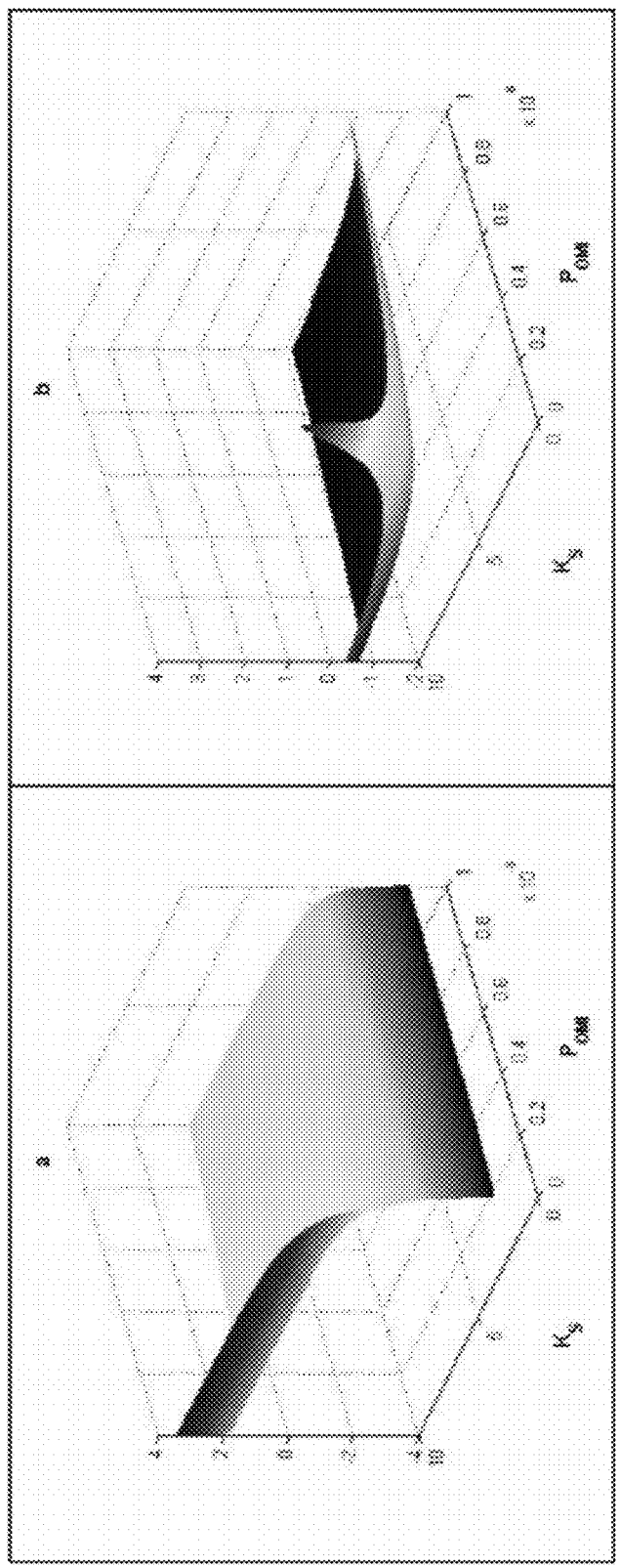
FIGS. 13A and 13B exemplarily show values of the auxiliary parameter functions a and b in dependence on the auxiliary parameters $K_S$ and $P_{OMI}$ according to an embodiment of the present is invention.
Figure 14:
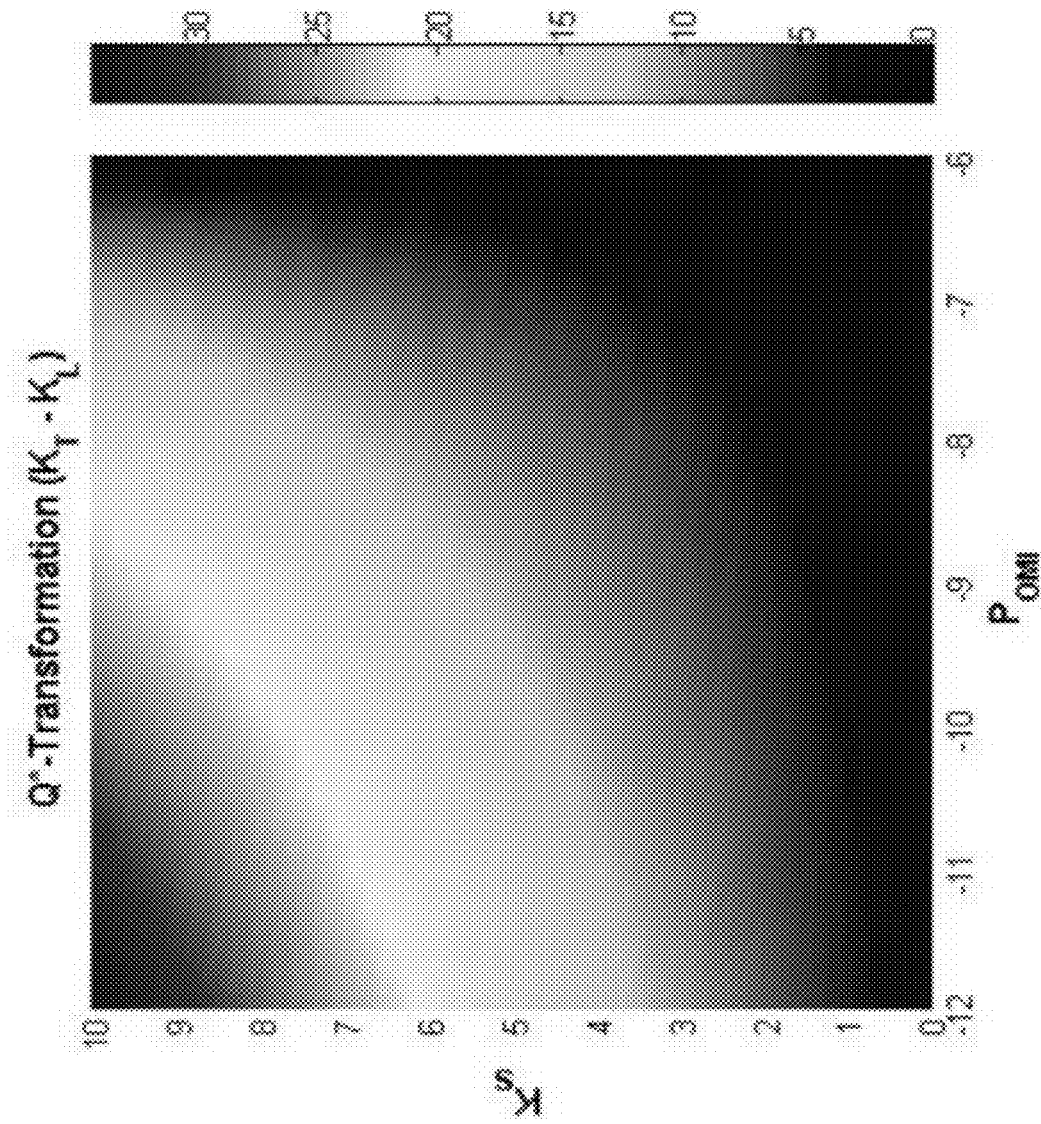
FIG. 14 exemplarily illustrates values of a parameter $K_T$-$K_L$ according to a Q*-transformation based on the auxiliary parameters $K_S$ and $P_{OMI}$ for determining parameters of a look-up table as, for example, shown in FIG. 10.

FIGS. 13A and 13B exemplarily show values of the auxiliary parameter functions a and b in dependence on the auxiliary parameters $K_S$ and $P_{OMI}$ according to an embodiment of the present invention. FIG. 14 exemplarily illustrates values of a parameter $K_T$-$K_L$ according to a Q*transformation based on the auxiliary parameters $K_S$ and $P_{OMI}$ for determining parameters of a look-up table as, for example, shown in FIG. 10.

Estimation of the Magnitude of Errors Introduced by the Simplifications of the Probability of Missed Detection and the Probability of Impact Reference is made to the above equations (9) and (11). For determining the absolute error $\epsilon_{abs,T}$ which is introduced by such a simplification as described with reference to equation (11) above, the difference between the probabilities $P_{MD}$ and $\tilde{P}_{MD}$ is determined as follows according to the below equation (35):

$$\varepsilon_{abs,T}(\xi \cdot \sigma_{SISA}, \sigma_{SISMA}) = \tag{35}$$

$$\left| \tilde{P}_{MD}(\xi, \sigma_{SISA}, \sigma_{SISMA}) - P_{MD}(\xi, \sigma_{SISA}, \sigma_{SISMA}) \right| =$$

$$\frac{1}{2} \mathrm{erfc}\left( \frac{\xi + T}{\sqrt{2}\, \sigma_{SISMA}} \right)$$

Furthermore, by introducing the non-dimensional variables $x_T$ and $\sigma_T$ according to the following equations (36) and (37), the absolute error $\epsilon_{abs,T}$ can be further rewritten according to the below equation (38);

$$x_T = \frac{\xi}{T} > 0 \tag{36}$$

$$\sigma_T = \frac{\sigma_{SISMA}}{T} = \frac{1}{k_{fa}\sqrt{\left(\frac{\sigma_{SISA}}{\sigma_{SISMA}}\right)^2 + 1}} < \frac{1}{k_{fa}} \tag{37}$$

$$\varepsilon_{abs,T}(x_T, \sigma_T) = \tag{38}$$

$$\frac{1}{2}\mathrm{erfc}\left(\frac{x_T+1}{\sqrt{2}\,\sigma_T}\right) < \frac{1}{2}\mathrm{erfc}\left(\frac{x_T+1}{\sqrt{2}\,\frac{1}{k_{fa}}}\right) < \frac{1}{2}\mathrm{erfc}\left(\frac{1}{\sqrt{2}\,\frac{1}{k_{fa}}}\right) = \frac{1}{2}P_{fa}$$

Here, the parameter $k_{fa}$ can be determined from the probability of false alarm $P_{fa}$ according to the following formula (39):

$$k_{fa} = \sqrt{2}\,\mathrm{erfc}^{-1}(P_{fa}) \tag{39}$$

Figure 15:
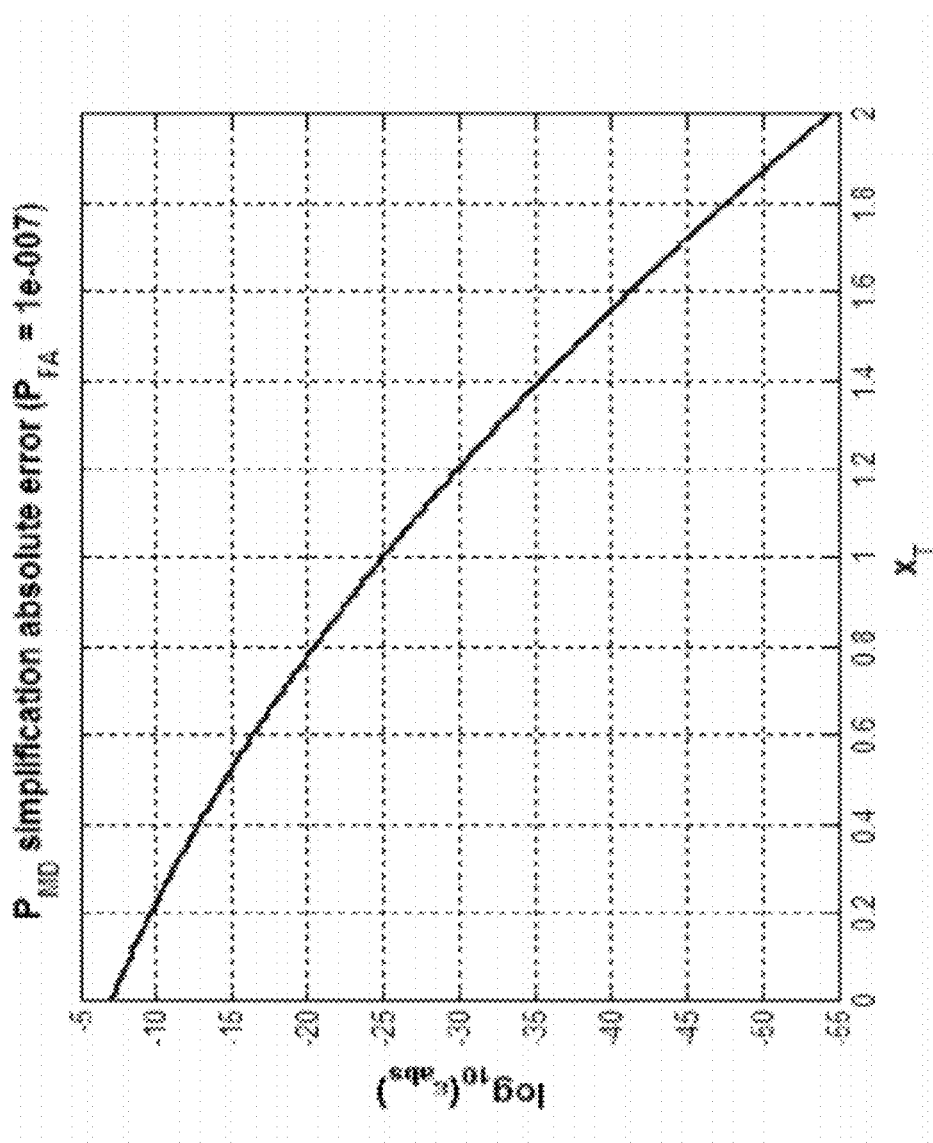
FIG. 15 exemplarily illustrates the absolute error of the simplification of the probability $P_{MD}$ of missed detection as a function of the non-dimensional variable $x_T = \xi/T$.

The values of the absolute error $\epsilon_{abs,T}$ of the simplification of the probability $P_{MD}$ of missed detection as introduced by the approximation according to equation (11) above is shown in FIG. 15 for the assumption of $P_{fa}=10^{-7}$. In this connection, it is to be noted that for this value of the probability $P_{fa}$ of false alarm, the parameter $k_{fa}$ is equal to 5.2, and the dimensionless parameter $\sigma_T$ is, therefore, smaller than 0.19.

In addition, the relative error $\epsilon_{rel,T}$ as introduced by the simplification of the probability $P_{MD}$ of missed detection according to equation (11) above can be determined as follows according to the equation (40):

$$\varepsilon_{rel,T}(\xi, \sigma_{SISA} \cdot \sigma_{SISMA}) = \frac{\tilde{P}_{MD}(\xi, \sigma_{SISA}, \sigma_{SISMA})}{P_{MD}(\xi, \sigma_{SISA}, \sigma_{SISMA})} - 1 = \tag{40}$$

$$\frac{\frac{1}{2}\mathrm{erfc}\left(\frac{\xi - T}{\sqrt{2}\,\sigma_{SISMA}}\right)}{-\frac{1}{2}\mathrm{erf}\left(\frac{\xi - T}{\sqrt{2}\,\sigma_{SISMA}}\right) + \frac{1}{2}\mathrm{erf}\left(\frac{\xi + T}{\sqrt{2}\,\sigma_{SISMA}}\right)} - 1$$

In terms of the above-mentioned non-dimensional variables $x_T$ and $\sigma_T$, this can be rewritten according to the below equation (41):

$$\varepsilon_{rel,T}(x_T, \sigma_T) = \frac{\frac{1}{2}\mathrm{erfc}\left(\frac{x_T - 1}{\sqrt{2}\,\sigma_T}\right)}{-\frac{1}{2}\mathrm{erf}\left(\frac{x_T - 1}{\sqrt{2}\,\sigma_T}\right) + \frac{1}{2}\mathrm{erf}\left(\frac{x_T + 1}{\sqrt{2}\,\sigma_T}\right)} - 1 = \tag{41}$$

$$\frac{\frac{1}{2}\mathrm{erfc}\left(\frac{x_T + 1}{\sqrt{2}\,\sigma_T}\right)}{-\frac{1}{2}\mathrm{erf}\left(\frac{x_T - 1}{\sqrt{2}\,\sigma_T}\right) + \frac{1}{2}\mathrm{erf}\left(\frac{x_T + 1}{\sqrt{2}\,\sigma_T}\right)}$$

Figure 16B:
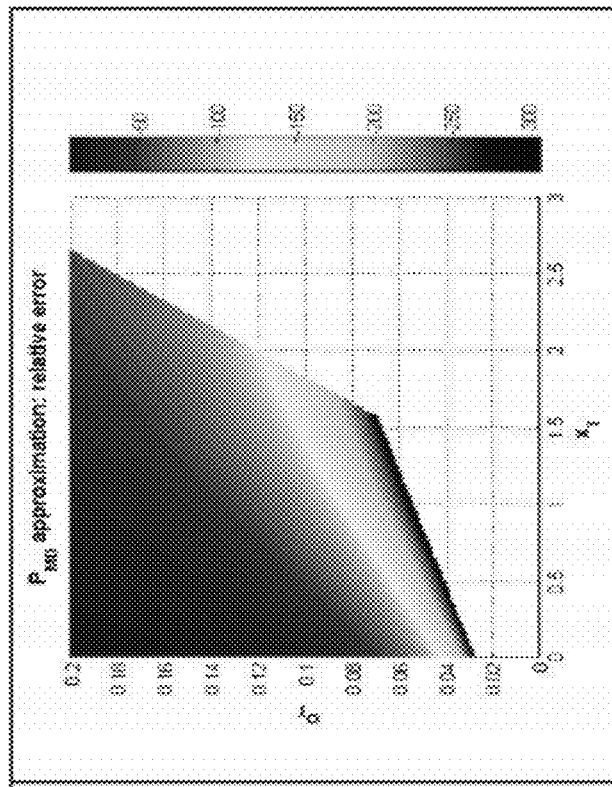
FIGS. 16A and 16B exemplarily illustrate the absolute error and the relative error introduced by the simplification of the probability $P_{MD}$ of missed detection as a function of the non-dimensional variables $x_T$ and $\sigma_P$.
Figure 16A:
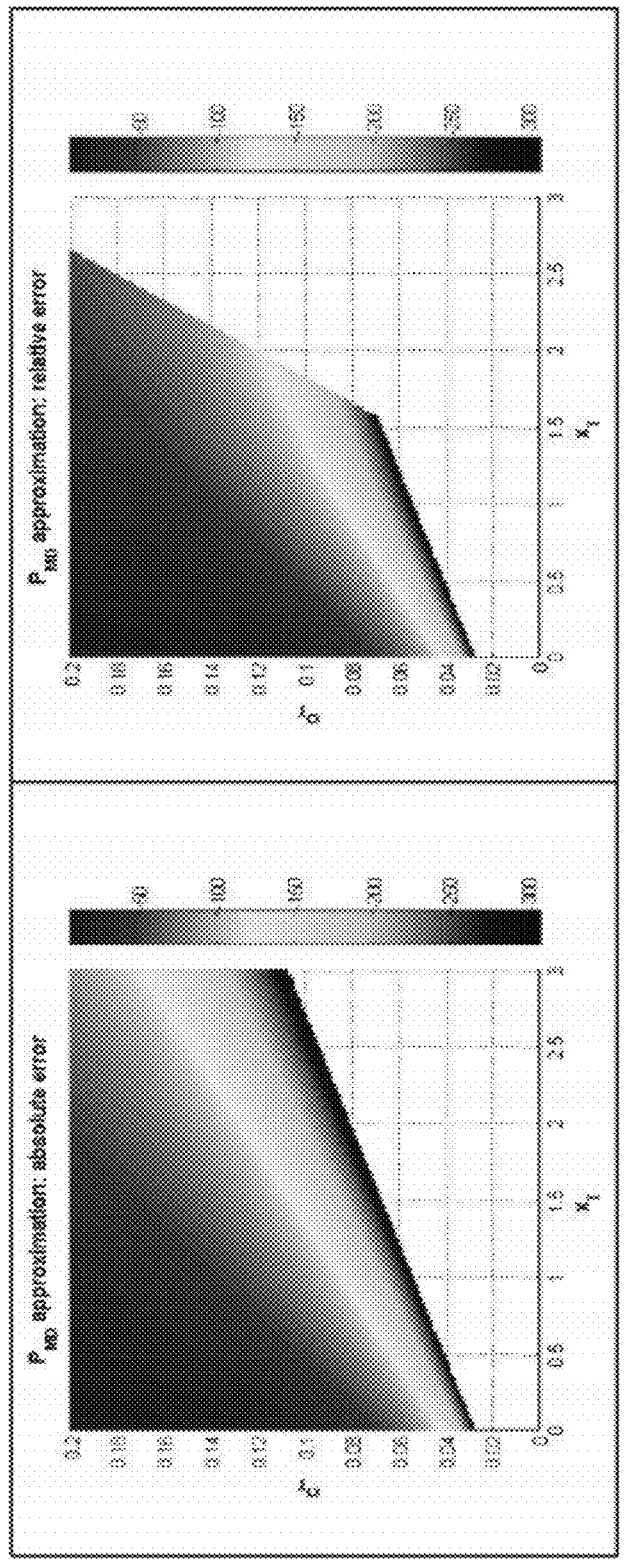

The absolute error $\epsilon_{abs,T}$ and the relative error $\epsilon_{rel,T}$ of the simplification of the probability $P_{MD}$ according to equation (11) above is further illustrated in FIGS. 16A and 16B, which show the absolute error $\epsilon_{abs,T}$ (left-hand side; FIG. 16A) and the relative error $\epsilon_{rel,T}$ (right-hand side; FIG. 16B) as functions of the dimensionless variables $x_T$ and $\sigma_T$.

Furthermore, regarding the simplification of the probability $I_{F,X}$ of impact on the positional domain X as described above with reference to equations (12) and (14), the absolute error introduced by such a simplification can be determined according to the following equation (42):

$$\varepsilon_{abs,I}(\xi, \sigma_{1D,F}, k_{1D,F}, I_{1D}) = \tag{42}$$

$$\left| \tilde{I}_{F-1D}(\xi, \sigma_{1D,F}, k_{1D,F}, I_{1D}) - I_{F-1D}(\xi, \sigma_{1D,F}, k_{1D,F}, I_{1D}) \right| =$$

$$\frac{1}{2}\mathrm{erfc}\left( \frac{\xi + \frac{I_{1D}}{k_{1D,F}}}{\sqrt{2}\,\frac{\sigma_{1D,F}}{k_{1D,F}}} \right)$$

Then, by introducing the non-dimensional variables $x_I$ and $\sigma_I$ according to the below equations (43) and (44), the absolute error $\epsilon_{abs,i}$ can be rewritten according to the equation (45) below:

$$x_I = \frac{\xi}{\frac{l_{1D}}{k_{1D,F}}} = \frac{k_{1d,F}\xi}{l_{1D}} > 0 \qquad (43)$$

$$\sigma_I = \frac{\sigma_{1D,F}}{l_{1D}} = \frac{\sigma_{1D,F}}{K_N \sigma_{1D,N}} < \frac{1}{K_N} \qquad (44)$$

$$\varepsilon_{abs,I}(x_I, \sigma_I) = \qquad (45)$$
$$\frac{1}{2}\text{erfc}\left(\frac{x_I+1}{\sqrt{2}\,\sigma_I}\right) < \frac{1}{2}\text{erfc}\left(\frac{x_I+1}{\sqrt{2}\,\frac{1}{K_N}}\right) < \frac{1}{2}\text{erfc}\left(\frac{1}{\sqrt{2}\,\frac{1}{K_N}}\right) = \frac{1}{2}P_N$$

Here, the parameter $K_N$ can be determined from the probability $P_N$ which is the probability that in a normal condition (i.e. a fault-free condition) the positional error exceeds the alert limit. The parameter $K_N$ is then determined according to the below equation (46):

$$K_N = \sqrt{2}\,\text{erfc}^{-1}(P_N) \qquad (46)$$

Figure 17:
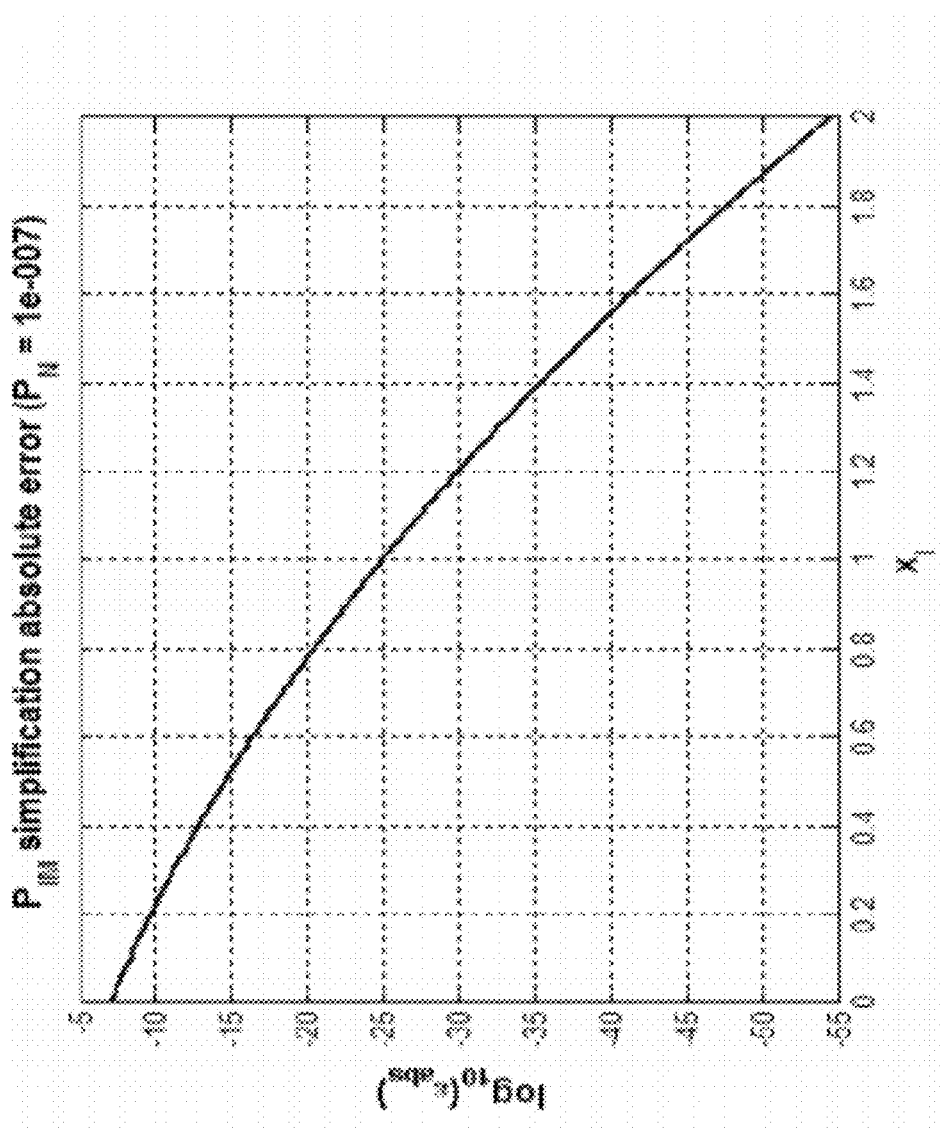
FIG. 17 exemplarily shows the absolute error of the simplification of the probability $P_{IM}$ of impact as a function of the non-dimensional variable $X_i = K_{X} \cdot \xi / l_X$.

The values of the absolute error $\epsilon_{abs,i}$ of the simplification of the probability $I_{F,X}$ of impact on the positional domain X as introduced by the approximation according to equation (12) above is shown in FIG. 17 for the assumption of $P_N = 10^{-7}$. It is to be noted that the parameter $K_N$ equals to 5.2 for a probability $P_N$ being equal to $10^{-7}$, while the parameter $\sigma_N$ is smaller than 0.19.

In addition thereto, the relative error $\epsilon_{rel,I}$ introduced by the simplification of the probability $I_{F,X}$ according to equation (14) above can be derived according to the following equation (47):

$$\varepsilon_{rel,I}(\xi, \sigma_{1D,F}, k_{1D,F}, l_{1D}) = 1 - \frac{\tilde{I}_{F-1D}(\xi, \sigma_{1D,F}, k_{1D,F}, l_{1D})}{I_{F-1D}(\xi, \sigma_{1D,F}, k_{1D,F}, l_{1D})} = \qquad (47)$$

$$1 - \frac{\frac{1}{2}\text{erfc}\left(\frac{\frac{l_{1D}}{k_{1D,F}} - \xi}{\sqrt{2}\,\frac{\sigma_{1D,F}}{k_{1D,F}}}\right)}{\frac{1}{2}\text{erfc}\left(\frac{\frac{l_{1D}}{k_{1D,F}} - \xi}{\sqrt{2}\,\frac{\sigma_{1D,F}}{k_{1D,F}}}\right) + \frac{1}{2}\text{erfc}\left(\frac{\xi + \frac{l_{1D}}{k_{1D,F}}}{\sqrt{2}\,\frac{\sigma_{1D,F}}{k_{1D,F}}}\right)}$$

This can be rewritten in terms of the above-mentioned non-dimensional variables $x_I$ and $\sigma_I$ according to the following equation (48):

$$\varepsilon_{rel,I}(x_I, \sigma_I) = 1 - \frac{\frac{1}{2}\text{erfc}\left(\frac{1-x_I}{\sqrt{2}\,\sigma_I}\right)}{\frac{1}{2}\text{erfc}\left(\frac{1-x_I}{\sqrt{2}\,\sigma_I}\right) + \frac{1}{2}\text{erfc}\left(\frac{x_I+1}{\sqrt{2}\,\sigma_I}\right)} \qquad (48)$$

The absolute error $\epsilon_{abs,i}$ and the relative error $\epsilon_{rel,I}$ of the simplification of the probability $I_{F,X}$ according to equation (12) above is further illustrated in FIGS. 18A and 18B, which show the absolute error $\epsilon_{abs,I}$ (left-hand side; FIG. 18A) and the relative error $\epsilon_{rel,I}$ (right-hand side; FIG. 18B) as functions of the dimensionless variables $x_I$ and $\sigma_I$.

On the basis of the above considerations of the absolute and relative errors introduced by the simplifications of the probability $P_{MD}$ of missed detection and the probability $I_{F,X}$ of impact on the positional domain X, it can be determined that the absolute error introduced by making these simplifications on the determined probability $F_{OMI,F,sat}$ is less than $10^{-7}$ times the probability $P_{sat,OC,F}$ of occurrence of a single failure event at the space vehicle sat.

This can be demonstrated according to the below equations (49) to (54) under the assumption that the probabilities $P_{fa}$ of false alarm and $P_N$ of a situation in which the positional error in a nominal condition (fault-free) is beyond the alert limit are equal to $10^{-7}$.

$$P_{OMI,F,sat} = \tilde{P}_{OMI,F,sat} + P_{sat,OC,F} \cdot \left(\varepsilon_{MD} \cdot \tilde{I}_{F-1D} + \tilde{P}_{MD} \cdot \varepsilon_I + \varepsilon_{MD} \cdot \varepsilon_I\right) \qquad (49)$$

$$\varepsilon_{IR} = P_{OMI,F,sat} - \tilde{P}_{OMI,F,sat} \qquad (50)$$
$$= P_{sat,OC,F} \cdot \left(\varepsilon_{MD} \cdot \tilde{I}_{F-1D} + \tilde{P}_{MD} \cdot \varepsilon_I + \varepsilon_{MD} \cdot \varepsilon_I\right)$$
$$= \varepsilon_{IR,1} + \varepsilon_{IR,2} + \varepsilon_{IR,3}$$

$$\frac{\varepsilon_{IR}}{P_{sat,OC,F}} = \qquad (51)$$
$$\varepsilon_{MD} \cdot \tilde{I}_{F-1D} + \tilde{P}_{MD} \cdot \varepsilon_I + \varepsilon_{MD} \cdot \varepsilon_I < P_{fa} \cdot 1 + 1 \cdot P_N + P_{fa} \cdot P_N$$

$$\varepsilon_{IR,1} = P_{sat,OC,F} \cdot \varepsilon_{MD} \cdot \tilde{I}_{F-1D} < P_{fa} \cdot 1 = 10^{-7} P_{sat,OC,F} \qquad (52)$$

$$\varepsilon_{IR,2} = P_{sat,OC,F} \cdot \tilde{P}_{MD} \cdot \varepsilon_I < 1 \cdot P_N = 10^{-7} P_{sat,OC,F} \qquad (53)$$

$$\varepsilon_{IR,3} = P_{sat,OC,F} \cdot \varepsilon_{MD} \cdot \varepsilon_I < P_{fa} \cdot P_N = 10^{-14} P_{sat,OC,F} \qquad (54)$$

Accordingly, the absolute error introduced by the above-mentioned simplifications of the probability $P_{MD}$ of missed detection and the probability $I_{F,X}$ of impact on the positional domain X is less than $10^{-7}$ times the probability $P_{sat,OC,F}$.

Specifically, it could be demonstrated that the above-described simplifications underlying the above-mentioned relations, such as the Q-transformation and the Q*-transformation, introduce only negligible errors so that the auxiliary relations which are provided by the Q-transformation and/or the Q*-transformation and also by the corresponding look-up tables as, for example, illustrated in FIGS. 9 and 10, so are very close to the mathematical exact solutions so that the determination of the integrity indicating parameters, such as for example the integrity risk and/or the protection level can be not only performed with less computational burden, but additionally significantly more accurate than in algorithms and methods known to the prior art. This is possible since the used relations correspond almost identically to the mathematical exact solutions so that the determined integrity indicating parameters reflect almost exactly the actual integrity situation of the global positioning system available to the user and/or the application which leads to an optimal availability of the system.

This allows to improve the determination of integrity indicating parameters significantly since methods known to the prior art only relate to estimations of conservative upper bounds of the integrity indicating parameters, thereby, leading to a reduced availability of the system compared to the embodiments of the present invention which are based on relations which consider the probability of missed detection, in particular, the product of the probability of missed detection with the probability of impact.

The overall introduced absolute error according to the above-described concept according to an embodiment of the present invention introduces only negligible errors in the order of $10^{-7}$ times the probability of occurrence of a single failure event at a space vehicle sat. Since the overall probability $P_{OMI,t,sat}$ is multiplied by the probability $P_{OC,t,sat}$, the absolute error introduced by the above-mentioned simplifications is clearly negligible in the determination of the integrity indicating parameters such as the integrity risk and/or the detection level parameters,

Q-Transformation and Q-Transformation for Receiver Autonomous Integrity Monitoring (RAIM)

The above discussed auxiliary relations referred to as Q-transformations and Q*transformations have been described mainly with regard to a case of a so-called ground integrity channel (GIC) integrity architecture, but such auxiliary relations can also be derived in a case of a receiver autonomous integrity monitoring (RAIM).

In fact, as will be derived in the following, in both cases, the equations for defining the Q-transformations and Q*-transformations can be similar. Also in case of RAIM integrity architecture, the Q-transformation and the Q*-transformation can be used for determining an integrity indicating parameter according to the protection level concept and also according to the integrity risk concept, i.e. it is possible to determine an integrity risk parameter as well as a protection level parameter similar to the embodiments as described above. Here, the algorithm relates to a so-called solution separation RAIM algorithm.

The general expression for a simplified RAIM probability of missed detection can be given as follows according to equation (55):

$$\tilde{P}_{MD}^{sat}(\xi, T^{sat}, \bar{\sigma}_s^{sat}) = \frac{1}{2} \text{erfc}\left[\frac{w^{sat}(\xi) - T^{sat}}{\sqrt{2}\,\bar{\sigma}_s^{sat}}\right] \quad (55)$$

Here, $w^{sat}(\xi)$ is corresponding to a test statistic function of the signal in space bias being function of the error magnitude $\xi$. In a solution separation RAIM, separation between a full-set solution and each of subset solutions obtained by omitting one of the plurality of space vehicles (supposed to be in a faulty condition) constitutes a test statistic.

In the absence of a bias in range measurements, the test static function is given according to the following equation (56):

$$w^{sat}(\xi) = k_F^{sat} \xi \quad (56)$$

Here, the parameter $k_F^{sat}$ a transformation parameter for the transformation from a range to a positional domain in the faulty condition, e.g. according to equation (57):

$$k_F^{sat} = S_{N,0}(:,\text{sat}) \quad (57)$$

where $S_{N,0}$ is the least-squares matrix corresponding to the nominal full-set solution:

$$S_{N,0} = (G^T W_{N,0} G)^{-1} G^T W_{N,0} \quad (58)$$

where G is a N by 4 direction cosine matrix and $W_{N,0}$ is a weight matrix (being the inverse of a covariance matrix) of the nominal full-set least-squares solution:

$$W_{N,0} = \begin{bmatrix} \frac{1}{\sigma_1^2} & 0 & \ldots & 0 & \ldots & 0 \\ 0 & \frac{1}{\sigma_2^2} & \ldots & 0 & \ldots & 0 \\ \ldots & \ldots & \ldots & \ldots & \ldots & \ldots \\ 0 & 0 & \ldots & \frac{1}{\sigma_{sat}^2} & \ldots & 0 \\ \ldots & \ldots & \ldots & \ldots & \ldots & \ldots \\ 0 & 0 & \ldots & 0 & \ldots & \frac{1}{\sigma_N^2} \end{bmatrix} \quad (59)$$

Here, this matrix $W_{N,0}$ has only entries on the diagonal while the off-diagonal entries are equal to zero. The entries on the diagonal are given by 1 over the square of the standard deviation for each of the space vehicles 1 to N, given according to the following formula (60):

$$\sigma_{sat}^2 = \sigma_{UERE,sat}^2 + \text{SISA}_{sat}^2 \quad (60)$$

Furthermore, in the above equation (55), $T^{sat}$ indicates a RAIM detection threshold which is given, in the absence of a bias in range measurements, according to the following formula (61):

$$T^{sat} = k_{fa} \cdot \sigma_s^{sat} \quad (61)$$

Here, $k_{fa}$ indicates the number of $\sigma$ that corresponds to the probability of false alarm and $\sigma_s^{sat}$ indicates a standard deviation of the saturation between the nominal full-set (i.e. all fault-free signal in space SIS) and the sat subset solution. The sat subset solution is obtained omitting the sat space vehicle:

$$\sigma_s^{sat} = \sqrt{dP_{sat}(:,:)} \quad (62)$$

Here, $dP_{sat}$ is a covariance matrix for the nominal separation:

$$dP_{sat} = (S_{N-1,sat} - S_{N,0})(W_{N,0})^{-1}(S_{N-1,sat} - S_{N,0})^T \quad (63)$$

where $S_{N-1,sat}$ is the least-squares matrix corresponding to the sat subset (i.e. the subset obtained by omitting the sat space vehicle) solution:

$$S_{N-1,sat} = (G^T W_{N-1,sat} G)^{-1} G^T W_{N-1,sat} \quad (64)$$

Here, $W_{N-1,sat}$ indicates a weight matrix (an inverse of a covariance matrix) of the sat subset least-squares solution. The weight matrix $W_{N-1,sat}$ is given according to the following equation (65):

$$W_{N-1,sat} = \begin{bmatrix} \frac{1}{\sigma_1^2} & 0 & \ldots & 0 & \ldots & 0 \\ 0 & \frac{1}{\sigma_2^2} & \ldots & 0 & \ldots & 0 \\ \ldots & \ldots & \ldots & \ldots & \ldots & \ldots \\ 0 & 0 & \ldots & 0 & \ldots & 0 \\ \ldots & \ldots & \ldots & \ldots & \ldots & \ldots \\ 0 & 0 & \ldots & 0 & \ldots & \frac{1}{\sigma_N^2} \end{bmatrix} = M_{sat} W_{N,0} \quad (65)$$

where $M_{sat}$ is a M by N identity matrix which has the diagonal element corresponding to the space vehicle sat set to zero.

Furthermore, in the above equation (55), the parameter $\bar{\sigma}_s^{sat}$ indicates standard deviations of the saturation between the non-nominal full-set (single failure event) and the sat subset solution.

The sat subset solution can be obtained by omitting the faulty space vehicle sat:

$$\overline{\sigma}_s^{sat} = \sqrt{d\overline{P}_{sat}(:,:)} \qquad (66)$$

Here, $d\overline{P}_{sat}$ describes the covariance matrix for the non-nominal saturation as follows:

$$dP_{sat} = (S_{N-1,sat} - S_{N,0})(W_{N,sat})^{-1}(S_{N-1,sat} - S_{N,0})^T \qquad (67)$$

Here, $W_{N,sat}$ is a weight matrix (inverse of a covariance matrix) of the non-nominal full-set (one single failure event) least-squares solution:

$$W_{N,sat} = \begin{bmatrix} \frac{1}{\sigma_1^2} & 0 & \cdots & 0 & \cdots & 0 \\ 0 & \frac{1}{\sigma_2^2} & \cdots & 0 & \cdots & 0 \\ \cdots & \cdots & \cdots & \cdots & \cdots & \cdots \\ 0 & 0 & \cdots & \frac{1}{\sigma_{UERE,sat}^2} & \cdots & 0 \\ \cdots & \cdots & \cdots & \cdots & \cdots & \cdots \\ 0 & 0 & \cdots & 0 & \cdots & \frac{1}{\sigma_N^2} \end{bmatrix} \qquad (68)$$

The weight matrix $W_{N,sat}$ is a diagonal matrix having only diagonal entries while all non-diagonal entries are equal to zero.

For all space vehicles besides the diagonal entries correspond to that of the above-mentioned weight matrix $W_{N,0}$ (cf. equation (59) and (60) above), while the diagonal entry for the space vehicle sat is depending on a standard deviation $\sigma_{UERE,sat}$, which can be calculated according to the following equation (69):

$$\sigma_{sat}^2 = \sigma_{UERE,sat}^2 + SISA_{sat}^2 \qquad (69)$$

Furthermore, the general expression of the simplified RAIM probability of impact on the positional domain is given according to the following equation (70):

$$\tilde{I}_{F-1D}(\xi, \sigma_F^{sat}, l) = \frac{1}{2}\mathrm{erfc}\left(\frac{l - w^{sat}(\xi)}{\sqrt{2}\,\sigma_F^{sat}}\right) \qquad (70)$$

Here, l represents an alert limit (e.g. an alert limit $l_X$ in positional domain X) and $\sigma_F^{sat}$ indicates a standard deviation of a positional error in the faulty condition:

$$\sigma_F^{sat} = \sqrt{P_{sat}(:,:)} \qquad (71)$$

where $P_{sat}$ is a covariance matrix for the non-nominal full-set solution (single failure event):

$$P_{sat} = S_{N,0} W_{N,sat}^{-1} S_{N,0}^T \qquad (72)$$

The equations which then define the Q-Transformation and Q*-Transformation equations do not change compared to the above described GIC related Q-transformations and Q*-transformations.

The only difference is to be considered in the determination of the auxiliary input variables $K_S$ and $K_T$ which have to be determined according to the following equation (73) and equation (74):

$$\hat{K}_S = \frac{\overline{\sigma}_s^{sat}}{\sigma_F^{sat}} \qquad (73)$$

$$\hat{K}_T = \frac{T^{sat}}{\sqrt{2}\,\sigma_F^{sat}} \qquad (74)$$

However, the determination of the variable $K_L$ does not change and is given according to the following (75) (cf. e.g. equation (32) above):

$$\hat{K}_{L,F} = \frac{l}{\sqrt{2}\,\sigma_F^{sat}} = K_{L,F} \qquad (75)$$

From the expressions of the simplified probability of missed detection and the probability of impact, as described above (of. e.g. equation (70) and equation (55) above), it is possible to retrieve the Q-transformation equations and demonstrate that they are similar to those described in the above sections relating to the GIC related Q-transformations (cf. e.g. equation (34) above).

ere, the probabilities of missed detection and probabilities of impact according to the simplification are repeated in the following equations (76) and (77):

$$\tilde{P}_{MD}^{sat}(\xi, T^{sat}, \overline{\sigma}_s^{sat}) = \frac{1}{2}\mathrm{erfc}\left[\frac{w^{sat}(\xi) - T^{sat}}{\sqrt{2}\,\overline{\sigma}_s^{sat}}\right] \qquad (76)$$

$$\tilde{I}_{F-1D}(\xi, \sigma_F^{sat}, l) = \frac{1}{2}\mathrm{erfc}\left(\frac{l - w^{sat}(\xi)}{\sqrt{2}\,\sigma_F^{sat}}\right) \qquad (77)$$

where $T^{sat}$ is the detection threshold which can be determined as follows:

$$T^{sat} = k_{fa} \cdot \sigma_s^{sat} \qquad (78)$$

and $w^{sat}(\xi)$ is the test static function which is in the absence of a bias in the range measurements determined according to the formula (79):

$$w^{sat}(\xi) = k_F^{sat} \xi \qquad (79)$$

The auxiliary variables a and b for the determination of the Q-transformations can be given by the following formulas (80) and (81):

$$a(\xi) = \frac{w^{sat}(\xi) - T^{sat}}{\sqrt{2}\,\overline{\sigma}_s^{sat}} = \frac{k_F^{sat}\xi - k_{fa} \cdot \sigma_s^{sat}}{\sqrt{2}\,\overline{\sigma}_s^{sat}} = \frac{\xi - \frac{T^{sat}}{k_F^{sat}}}{\sqrt{2}\,\frac{\overline{\sigma}_s^{sat}}{k_F^{sat}}} \qquad (80)$$

$$b(\xi) = \frac{l - w^{sat}(\xi)}{\sqrt{2}\,\sigma_s^{sat}} = \frac{l - k_F^{sat}\xi}{\sqrt{2}\,\sigma_F^{sat}} = \frac{\frac{l}{k_F^{sat}} - \xi}{\sqrt{2}\,\frac{\sigma_F^{sat}}{k_F^{sat}}} \qquad (81)$$

The formula for computing directly an integrity risk indicating parameter such as e.g. $P_{OMI,F,sat}$ may be regarded again as a product of the probability of occurrence, the probability of missed detection, and the probability of impact, and can be rewritten according to the equation (82) or in an equivalent (implicit) form according to the equation (83) which indicates again a equation for the parameter function $Q_P$ which is again an expression depending on the parameters a, b, and $P_{OMI,F,sat}$:

$$P_{OMI,F,sat}(a,b) \cong \frac{P_{OC,F,sat}}{4}, [\text{erfc}(a(\xi))] \cdot [\text{erfc}(b(\xi))] = \tilde{P}_{OMI,F,sat}(a,b) \quad (82)$$

$$P_{OMI,F,sat} - \frac{P_{OC,F,sat}}{4}, [\text{erfc}(a(\xi))] \cdot [\text{erfc}(b(\xi))] = \quad (83)$$
$$Q_P(P_{OMI,F,sat}, a, b) = 0$$

Thereafter, similar to the above described equations (20) to (34) and the description thereof, the three non-linear equations for the parameter functions $Q_P$, $Q_{dP}$, and $Q_{ab}$ can be derived according to the to following equations (87) to (97), as a result arriving then at the expression which corresponds to the above-mentioned equation (34); cf, the below equation (98) which indicates that the system of non-linear equations that identify the Q-transformations and Q*-transformations can be derived as exactly the same as in equation (34) above:

$$\frac{d\tilde{P}_{OMI,F,sat}[a(\xi), b(\xi)]}{d\xi} = 0 \quad (84)$$

$$\frac{d\tilde{P}_{OMI,F,sat}}{da} \cdot \frac{da}{d\xi} + \frac{d\tilde{P}_{OMI,F,sat}}{db} \cdot \frac{db}{d\xi} = 0 \quad (85)$$

$$\frac{d\text{erfc}(a)}{da} \cdot \text{erfc}(b) \cdot \frac{da}{d\xi} + \text{erfc}(a) \cdot \frac{d\text{erfc}(b)}{db} \cdot \frac{db}{d\xi} = 0 \quad (86)$$

$$\frac{d\text{erfc}(a)}{da} = \frac{d[1 - \text{erf}(a)]}{da} = -\frac{2}{\sqrt{\pi}} e^{-a^2} \quad (87)$$

$$\frac{da}{d\xi} = \frac{1}{\sqrt{2} \frac{\sigma_s^{sat}}{k_F^{sat}}} \quad (88)$$

$$\frac{db}{d\xi} = \frac{-1}{\sqrt{2} \frac{\sigma_F^{sat}}{k_F^{sat}}} \quad (89)$$

$$-e^{-a^2} \cdot \text{erfc}(b) \cdot \frac{1}{\frac{\sigma_s^{sat}}{k_F^{sat}}} + \text{erfc}(a) \cdot e^{-b^2} \cdot \frac{1}{\frac{\sigma_s^{sat}}{k_F^{sat}}} = 0 \quad (90)$$

$$-e^{-a^2} \cdot \text{erfc}(b) + K_S \cdot \text{erfc}(a) \cdot e^{-b^2} = Q_{dP}(a, b, K_S) = 0 \quad (91)$$

$$\hat{K}_S = \frac{\sigma_\varepsilon^{sat}}{\sigma_F^{sat}} \quad (92)$$

$$\xi = \sqrt{2} \frac{\sigma_s^{sat}}{k_F^{sat}} \cdot a + \frac{T^{sat}}{k_F^{sat}} \quad (93)$$

$$b = \frac{\frac{\sigma_s^{sat}}{k_F^{sat}}}{\frac{\sigma_F^{sat}}{k_F^{sat}}} \cdot a + \frac{\frac{l}{k_F^{sat}} - \frac{T^{sat}}{k_F^{sat}}}{\sqrt{2} \frac{\sigma_F^{sat}}{k_F^{sat}}} = -\frac{\sigma_s^{sat}}{\sigma_F^{sat}} \cdot a + \frac{l - T^{sat}}{\sqrt{2} \sigma_F^{sat}} \quad (94)$$

$$b + \hat{K}_S \cdot a - (\hat{K}_L - \hat{K}_T) = Q_{ab}(a, b, \hat{K}_S, \hat{K}_I, \hat{K}_T) = 0 \quad (95)$$

$$\hat{K}_{L,F} = \frac{l}{\sqrt{2} \sigma_F^{sat}} \quad (96)$$

$$\hat{K}_T = \frac{T^{sat}}{\sqrt{2} \sigma_F^{sat}} \quad (97)$$

-continued $$\begin{cases} Q_P(P_{OMI,F,sat}, a, b) = 0 \\ Q_{dP}(a, b, \hat{K}_S) = 0 \\ Q_{ab}(a, b, \hat{K}_S, \hat{K}_{LF,F}, \hat{K}_T) = 0 \end{cases} \quad (98)$$

Embodiment of a Method for Determining an Integrity Risk Parameter in a GIC-Based Scenario The total integrity risk IR is assumed to be the sum of three positional domains in this embodiment, namely, a sum of the longitudinal integrity risk $(IR)_{LG}$, the lateral integrity risk $(IR)_{LT}$, and the vertical integrity risk $(IR)_{VE}$, which are one-dimensional integrity risks having contributions from both, nominal (N) conditions corresponding to a fault-free condition, and faulty (F) conditions relating to single failure feared events.

As indicated in equation (99) below, the overall integrity risk IR is a sum of the longitudinal, lateral, and vertical integrity risk contributions $(IR)_{LG}$, $(IR)_{LT}$, and $(IR)_{VE}$.

$$IR = (IR)_{LG} + (IR)_{LT} + (IR)_{VE} \quad (99)$$

The respective integrity risks from the longitudinal, lateral, and vertical one-dimensional positional domains have contributions from the nominal state (i.e. $IR_{N,LG}$, $IR_{N,LT}$, and $IR_{N,VE}$). The contributions from the faulty conditions indicated by a subscript F have contributions from each of the space vehicles sat (1, 2, . . . , sat, . . . N being the number of total available space vehicles on which a position determination is based). This is indicated by the sums over the parameter sat of the contributions from the faulty condition from each of the space vehicles $IR_{F,X}^{sat}$, where X is longitudinal LG, lateral LT, or vertical VE:

$$(IR)_{LG} = (IR_N)_{LG} + (IR_F)_{LG} = (IR_N)_{LG} + \sum_{sat=1}^{N} (IR_F^{sat})_{LG} \quad (100)$$

$$(IR)_{LT} = (IR_N)_{LT} + (IR_F)_{LT} = (IR_N)_{LT} + \sum_{sat=1}^{N} (IR_F^{sat})_{LT} \quad (101)$$

$$(IR)_{VE} = (IR_N)_{VE} + (IR_F)_{VE} = (IR_N)_{VE} + \sum_{sat=1}^{N} (IR_F^{sat})_{VE} \quad (102)$$

Here, the parameters indicated as $(IR_N)_X$, where X is LG, LT, or VE, relate to the longitudinal, lateral, and vertical integrity risks associated to the occurrence of a fault-free feared event and the parameters indicated $(IR_F^{sat})_X$, where X is LG, LT, or VE, relate to the longitudinal, lateral, and vertical integrity risks associated to the occurrence of a single failure event of the space vehicle sat being in a faulty condition.

In the following, all steps of a method for computing (determining) the integrity risk IR, i.e. an overall integrity risk IR, based on the Q-transformation will be explained below.

Step 1: Determine $K_S$

For all faulty states, the value of the auxiliary parameters $K_{S,X}$ is determined being defined as follows for the lateral, longitudinal, and vertical parameters:

$$(K_S^{sat})_{LG} = \frac{\sigma_{SISMA}}{\frac{\sigma_{LG,F}}{k_{LG,F}}} \quad (103)$$

$$(K_S^{sat})_{LT} = \frac{\sigma_{SISMA}}{\frac{\sigma_{LT,F}}{k_{LT,F}}} \quad (104)$$

$$(K_S^{sat})_{VE} = \frac{\sigma_{SISMA}}{\frac{\sigma_{VE,F}}{k_{VE,F}}} \quad (105)$$

In the determination of the parameter $K_{S,X}$, the following parameters are used: σSISMA (signal in space monitoring accuracy SISMA), $\sigma_{LG,F}$, $\sigma_{LT,F}$, $\sigma_{VE,F}$ being the standard deviations of longitudinal, lateral, and vertical positional error in a faulty condition, and $k_{LG,F}$, $k_{LT,F}$, and $k_{VE,F}$ being the transformation a parameters from range to the longitudinal, lateral, and vertical positional domains in the faulty condition.

Step 2: Determine $K_T$

For all the faulty states, the value of the auxiliary parameter $K_{T,X}$ (X being longitudinal LG, lateral LT, and vertical VE) are defined according to the following equations (106) to (108):

$$(K_T^{sat})_{LG} = \frac{T}{\sqrt{2}\frac{\sigma_{LG,F}}{k_{LG,F}}} \quad (106)$$

$$(K_T^{sat})_{LT} = \frac{T}{\sqrt{2}\frac{\sigma_{LT,F}}{k_{LT,F}}} \quad (107)$$

$$(K_T^{sat})_{VE} = \frac{T}{\sqrt{2}\frac{\sigma_{VE,F}}{k_{VE,F}}} \quad (108)$$

where T is the detection threshold which is calculated according to equation (3) above based on the is parameter $k_{fa}$, σSISA, and σSISMA.

Furthermore, the standard deviations $\sigma_{LG,F}$, $\sigma_{LT,F}$, $\sigma_{VE,F}$ of longitudinal, lateral, and vertical positional error in the faulty condition and the transformation parameters $k_{LG,F}$, $k_{LT,F}$, and $k_{VE,F}$ from range to longitudinal, lateral, and vertical positional domain in faulty condition enter the definitions of the auxiliary parameters $K_T$.

Step 3: Determine $K_{L,F}$

For all faulty states, the values of the auxiliary parameters $K_{L,F,X}$ are determined for longitudinal, lateral, and vertical positional domains according to the equations (109) to (111) as indicated below:

$$(K_{L,F}^{sat})_{LG} = \frac{l_{LG}}{\sqrt{2}\,\sigma_{LG,F}} \quad (109)$$

$$(K_{L,F}^{sat})_{LT} = \frac{l_{LT}}{\sqrt{2}\,\sigma_{LT,F}} \quad (110)$$

$$(K_{L,F}^{sat})_{VE} = \frac{l_{VE}}{\sqrt{2}\,\sigma_{VE,F}} \quad (111)$$

Here, the parameters $I_{LG}$, $I_{LT}$, $I_{VE}$ relate to the longitudinal, lateral, and vertical alert limit (being given as input parameters for the determination of an integrity risk at the given alert limit). Furthermore, the standard deviations $\sigma_{LG,F}$, $\sigma_{LT,F}$, $\sigma_{VE,F}$ of longitudinal, lateral, and vertical positional error enter in the determination of the parameters $K_{L,F,X}$.

Step 4: Determine $K_{L,N}$

Also for the nominal state N, the value of the auxiliary parameters $K_{L,N,X}$ are determined for the longitudinal, lateral, and vertical positional domains according to the equations (112) to (114):

$$(K_{L,N})_{LG} = \frac{l_{LG}}{\sqrt{2}\,\sigma_{LG,N}} \quad (112)$$

$$(K_{L,N})_{LT} = \frac{l_{LT}}{\sqrt{2}\,\sigma_{LT,N}} \quad (113)$$

$$(K_{L,N})_{VE} = \frac{l_{VE}}{\sqrt{2}\,\sigma_{VE,N}} \quad (114)$$

Here, again the longitudinal, lateral, and vertical alert limits $I_{LG}$, $I_{LT}$, $I_{VE}$ enter the equations and, in addition thereto, the standard deviations of the longitudinal, lateral, and vertical positional error in nominal condition N enter the equations (i.e. $\sigma_{LG,N}$, $\sigma_{LT,N}$, and $\sigma_{VE,N}$).

Step 5: Determine the Integrity Risk for Each Space Vehicle sat Associated to the Faulty Condition of the Space Vehicle sat For all the faulty states, i.e. for each of the single failure events of each of the space vehicles sat, the longitudinal, lateral, and vertical integrity risk related to the space vehicle sat in the faulty condition can be determined according to the equations (115) to (117) based on the determined parameters $K_L$, $K_T$, and $K_S$, as for example illustrated according to the concept of FIG. 7 above.

$$(IR_F^{sat})_{LG} = Q\{(K_S^{sat})_{LG}, (K_{L,F}^{sat})_{LG} - (K_T^{sat})_{LG}\} \quad (115)$$

$$(IR_F^{sat})_{LT} = Q\{(K_S^{sat})_{LT}, (K_{L,F}^{sat})_{LT} - (K_T^{sat})_{LT}\} \quad (116)$$

$$(IR_F^{sat})_{VE} = Q\{(K_S^{sat})_{VE}, (K_{L,F}^{sat})_{VE} - (K_T^{sat})_{VE}\} \quad (117)$$

Here, Q{ } represents the Q-transformation which is applied to the auxiliary parameters $K_S$ and $K_{L,F}$-$K_T$ (embodying the first and second auxiliary parameter of the preferred aspects of the present so invention as described under the section "Summary of the Invention").

For a certain application, $K_{L,F}$ is constant and when the parameters $K_S$ and $K_T$ are given, it is possible to directly determine the one-dimensional integrity risk $IR_{F,X}^{sat}$ in a certain one-dimensional positional domain X.

The invariant mathematical Q-transformation can be provided and/or stored as a look-up table, for example in a receiver used by a user (for example in the same way in which other mathematical functions as the probability density function $X^2$ may be stored). Accordingly, the step 5 involves only negligible processing burden, since the Q-transformation relation can be pre-calculated and stored as a look-up table.

Step 6: Determine the Integrity Risk Associated to the Nominal Condition

For the nominal state, the longitudinal, lateral, and vertical integrity risks in the nominal condition $IR_{N,X}$ in the different positional domains X can be determined according to the following equations (118) to (120):

$$(IR_N)_{LG} = P_{OC,N} \cdot erfc[(K_{L,N})_{LG}] \quad (118)$$

$$(IR_N)_{LT} = P_{OC,N} \cdot erfc[(K_{L,N})_{LT}] \quad (119)$$

$$(IR_N)_{VE} = P_{OC,N} \cdot erfc[(K_{L,N})_{VE}] \quad (120)$$

Step 7: Determine the Longitudinal Integrity Risk

The resultant longitudinal integrity risk $(IR)_{LG}$ can then be determined by adding the corresponding integrity risks as determined above and being associated to the nominal states and the faulty states in the longitudinal positional domain:

$$(IR)_{LG} = (IR_N)_{LG} + (IR_F)_{LG} = (IR_N)_{LG} + \sum_{sat=1}^{N} (IR_F^{sat})_{LG} \quad (121)$$

Step 8: Determine the Lateral Integrity Risk

Similarly, the resultant lateral integrity risk $(IR)_{LT}$ can be determined according to equation (122):

$$(IR)_{LT} = (IR_N)_{LT} + (IR_F)_{LT} = (IR_N)_{LT} + \sum_{sat=1}^{N} (IR_F^{sat})_{LT} \quad (122)$$

Step 9: Determine the Vertical Integrity Risk

Similarly, also the resultant vertical integrity risk $(IR)_{VE}$ can be determined according to the following equation (123):

$$(IR)_{VE} = (IR_N)_{VE} + (IR_F)_{VE} = (IR_N)_{VE} + \sum_{sat=1}^{N} (IR_F^{sat})_{VE} \quad (123)$$

Step 10: Determine the Overall Integrity Risk

Finally, the overall integrity risk can be determined by adding the longitudinal, lateral, and vertical components as determined in steps 7 to 9 above according to the equation (124);

$$IR = (IR)_{LG} + (IR)_{LT} + (IR)_{VE} \quad (124)$$

With regard to the above described embodiments, it is to be noted that this embodiment can be to modified by interchanging some of the above steps and/or combining some of the above steps. Specifically, regarding the above steps 1, 2, 3, and 4, it is to be noted that these steps can be interchanged by any order and/or also be performed simultaneously. Also the steps 7 to 9 as described above can be interchanged in any order or be performed simultaneously. Step 6 can be interchanged with any of the steps 1 to 5 and 6 to 9 or performed simultaneously.

Furthermore, it is to be noted that the integrity risk parameters determined in the equations (115), (116), (117), (121), (122), (123), and (124) can each be considered as a parameter embodying an integrity indicating parameter in the sense of the present invention as described above under the section "Summary of the Invention".

Embodiment of a Method for Determining a Protection Level Parameter in a GIC-Based Scenario For the determination of integrity risk parameters as for example described with reference to the previous embodiment, for determining an overall integrity risk parameter, partial integrity risk parameters have been added together so as to determine an overall integrity risk. When determining a protection level or a protection level indicating parameters, it is possible to first determine protection level parameters indicating protection levels in different conditions such as faulty and fault free conditions and also in the case of the faulty condition for each of the plurality of available space vehicles, where these protection level parameters are not added together but the maximal value thereof is determined as the so overall protection level parameter, such as for example a protection level in a certain positional domain X (e.g. X being longitudinal LG, lateral LT, or vertical VE).

For instance, the longitudinal protection limit $PL_{LG}$, the lateral protection limit $PL_{LT}$, and the vertical protection limit $PL_{VE}$ (being one-dimensional protection limits in one of the three possible one-dimensional positional domains longitudinal, lateral and vertical) are given according to the following equations (125) to (127):

$$PL_{LG} = \max[(PL_N)_{LG}, (PL_F)_{LG}] = \max_{N,F}\left[(PL_N)_{LG}, \max_{1 \le sat \le N_{sat}} (PL_F^{sat})_{LG}\right] \quad (125)$$

$$PL_{LT} = \max[(PL_N)_{LT}, (PL_F)_{LT}] = \max_{N,F}\left[(PL_N)_{LT}, \max_{1 \le sat \le N_{sat}} (PL_F^{sat})_{LT}\right] \quad (126)$$

$$PL_{VE} = \max[(PL_N)_{VE}, (PL_F)_{VE}] = \max_{N,F}\left[(PL_N)_{VE}, \max_{1 \le sat \le N_{sat}} (PL_F^{sat})_{VE}\right] \quad (127)$$

Here, the parameters $(PL_N)_{LG}$, $(PL_N)_{LT}$, and $(PL_N)_{VE}$ indicate the longitudinal, lateral, and vertical protection limits (also referred to as protection levels) associated to the occurrence of a fault-free feared event.

The parameters $(PL_F^{sat})_{LG}$, $(PL_F^{sat})_{LT}$, and $(PL_F^{sat})_{VE}$ indicate the longitudinal, lateral, and vertical protection level associated to the occurrence of a single failure event related to a failure of the specific space vehicle sat. When taking the maximum value of all the protection levels of one positional domain associated to the occurrence of the space vehicles sat from 1 to $N_{sat}$, this maximum value indicates the overall protection level in this positional domain for the occurrence of a single failure event according to which exactly one of the space vehicles sat is in an abnormal condition (single failure event faulty case).

In the following, a method for determining a protection level parameter based on the above described Q*transformations (cf. e.g. FIG. 8 and the description thereof) will be explained according to an embodiment of the present invention below.

Step 1: Determine the Parameter $K_S$

For all possible faulty states (i.e. the assumptions that particularly the space vehicle sat is in an abnormal condition for each of the space vehicles sat), the values of the auxiliary parameters $(K_S^{sat})_{LG}$, $(K_S^{sat})_{LT}$, and $(K_S^{sat})_{VE}$ are determined according to the following equations (128) to (130) which are based on the definition of equation (28) above.

$$(K_S^{sat})_{LG} = \frac{\sigma_{SISMA}}{\frac{\sigma_{LG,F}}{k_{LG,F}}} \quad (128)$$

$$(K_S^{sat})_{LT} = \frac{\sigma_{SISMA}}{\frac{\sigma_{LT,F}}{k_{LT,F}}} \quad (129)$$

$$(K_S^{sat})_{VE} = \frac{\sigma_{SISMA}}{\frac{\sigma_{VE,F}}{k_{VE,F}}} \quad (130)$$

Here, $\sigma_{SISMA}$ is the signal in space monitoring accuracy, the parameters $\sigma_{X,F}$ (X being LG, LT, and VE) indicate the standard deviations of longitudinal, lateral, and vertical positional errors in a faulty condition, and the parameters $k_{X,F}$ (X being LG, LT, and VE) indicate the respective transformation parameters from range to the longitudinal, lateral, and vertical positional domains in the faulty condition.

Step 2: Determine the Parameter $K_T$

For all faulty states, i.e. for each space vehicle sat (under the assumptions that particularly the space vehicle sat is in an abnormal condition), the value of the auxiliary parameters $(K_T)_X$ (X being LG, LT, and VE) are determined according to the below equations (131) to (133) which are based on the definition of equation (33) above:

$$(K_T^{sat})_{LG} = \frac{T}{\sqrt{2}\frac{\sigma_{LG,F}^{sat}}{k_{LG,F}^{sat}}} \quad (131)$$

$$(K_T^{sat})_{LT} = \frac{T}{\sqrt{2}\frac{\sigma_{LT,F}^{sat}}{k_{LT,F}^{sat}}} \quad (132)$$

$$(K_T^{sat})_{VE} = \frac{T}{\sqrt{2}\frac{\sigma_{VE,F}^{sat}}{k_{VE,F}^{sat}}} \quad (133)$$

where T is the detection threshold which can be determined based on the parameter $k_{fa}$, $\sigma_{SISA}$, and $\sigma_{SISMA}$ according to equation (3) above (cf. equation (3')):

$$T = k_{fa}\sqrt{\sigma_{SISA}^2 + \sigma_{SISMA}^2} \quad (3')$$

Furthermore, the standard deviations of longitudinal, lateral, and vertical positional error in the faulty condition ($\sigma_{LG,F}$, $\sigma_{LT,F}$, $\sigma_{VE,F}$) and the transformation parameters from range to longitudinal, lateral, and vertical positional domain in faulty condition ($k_{LG,F}$, $k_{LT,F}$, and $k_{VE,F}$) enter the equations (131) to (133) according to the definitions of the auxiliary parameters $K_T$.

Step 3: Determine the Parameter $K_{L,F}$

For all the faulty states, i.e. for each space vehicle sat (under the assumptions that particularly the space vehicle sat is in an abnormal condition), the value of the auxiliary parameters $(K_{L,F})_X$ (X being LG, LT, and VE) can be determined by utilizing the Q*-transformation as for example described with reference to FIG. 7 above.

$$(K_{L,F}^{sat})_{LG} = Q^*\{(K_S^{sat})_{LG}, (P_F^{sat})_{LG}\} + (K_T^{sat})_{LG} \quad (134)$$

$$(K_{L,F}^{sat})_{LT} = Q^*\{(K_S^{sat})_{LT}, (P_F^{sat})_{LT}\} + (K_T^{sat})_{LT} \quad (135)$$

$$(K_{L,F}^{sat})_{VE} = Q^*\{(K_S^{sat})_{VE}, (P_F^{sat})_{VE}\} + (K_T^{sat})_{VE} \quad (136)$$

This can be, for example, performed by utilizing a look-up table such as, for example, a look-up table as described with reference to FIG. 10 above.

Q*{ } represents the Q*-transformation which is applied to the parameters $K_S$ and $P_F^{sat}$. For a certain application, for a given set of parameter $K_S$, $P_F^{sat}$, and $K_T$, it is accordingly possible to directly determine the parameter $K_{L,F}$. The invariant mathematical Q*-transformation can be provided and/or stored as a look-up table in the receiver (e.g. in a similar way to the provision of other mathematical functions as for example the probability density function $X^2$).

Step 4: Determine $K_{L,N}$

For the nominal state N (i.e. the fault-free condition), the value of the auxiliary parameters $(K_{L,N})_X$ (X being LG, LT, and VE) for the longitudinal, lateral, and vertical positional domain can be determined according to the following equations (137) to (139):

$$(K_{L,N})_{LG} = erfc^{-1}\left(\frac{P_{LG,N}}{P_{OC,N}}\right) \quad (137)$$

$$(K_{L,N})_{LT} = erfc^{-1}\left(\frac{P_{LT,N}}{P_{OC,N}}\right) \quad (138)$$

$$(K_{L,N})_{VE} = erfc^{-1}\left(\frac{P_{VE,N}}{P_{OC,N}}\right) \quad (139)$$

Here, the parameters $P_{X,N}$ (X being LG, LT, and VE) indicate the respective probabilities that the positional error in the positional domain X, i.e. the longitudinal positional error, the lateral positional error, or the vertical positional error, is greater than the protection level $PL_X$ in the nominal condition (i.e. the fault-free case which would mean that the positional error exceeds the error threshold corresponding to the given protection level although each of the satellites in a nominal condition). $P_{OC,N}$ indicates the probability of occurrence of a fault-free feared event.

It is to be noted that this step 4 can be performed before or after any of the above steps 1 to 3 and the below described step 5 since the parameter $K_{L,N}$ will be required not before step 6. It can be also performed simultaneously with one or more of the steps 1 to 5.

Step 5: Determine the Protection Level PL Associated to the Faulty Condition of a Certain Space Vehicle sat For all the faulty states, i.e. for each space vehicle sat (under the assumptions that particularly the space vehicle sat is in an abnormal condition), the longitudinal, lateral, and vertical space vehicle protection level in the faulty condition can be determined for the positional domains LG, LT, and VE according to the following equations (140) to (142):

$$(PL_F^{sat})_{LG} = \sqrt{2}(K_{L,F}^{sat})_{LG}\sigma_{LG,F}^{sat} \quad (140)$$

$$(PL_F^{sat})_{LT} = \sqrt{2}(K_{L,F}^{sat})_{LT}\sigma_{LT,F}^{sat} \quad (141)$$

$$(PL_F^{sat})_{VE} = \sqrt{2}(K_{L,F}^{sat})_{VE}\sigma_{VE,F}^{sat} \quad (142)$$

The parameters $\sigma_{X,F}^{sat}$ (X being LG, LT, and VE) indicate the standard deviations of longitudinal, lateral, and vertical positional errors in a faulty condition (can be the same value for each of the space vehicles sat or be independently provided for plural of the space vehicles sat).

Step 6: Determine the Protection Level Associated to the Nominal Condition (Fault-Free Condition)

For the nominal condition, the longitudinal, lateral, and vertical protection levels in nominal condition N, i.e. $(PL_N)_X$ (X being LG, LT, and VE) can be determined according to the following equations (143) to (145) based on the above definition according to equation (8):

$$(PL_N)_{LG} = \sqrt{2}(K_{L,N})_{LG}\sigma_{LG,N} \quad (143)$$

$$(PL_N)_{LT} = \sqrt{2}(K_{L,N})_{LT}\sigma_{LT,N} \quad (144)$$

$$(PL_N)_{VE} = \sqrt{2}(K_{L,N})_{VE}\sigma_{VE,N} \quad (145)$$

The parameters $\sigma_{X,N}$ (X being LG, LT, and VE) indicate the standard deviations of longitudinal, lateral, and vertical positional errors in a fault-free condition.

Step 7: Determine the Longitudinal Protection Level

The resulting longitudinal protection level $PL_{LG}$ can be determined by determining the maximum value amongst the corresponding protection levels associated to the nominal condition N and the corresponding protection levels associated to all faulty states according to the following equation (146):

$$PL_{LG} = \max[(PL_N)_{LG}, (PL_F)_{LG}] = \max_{N,F}\left[(PL_N)_{LG}, \max_{1 \le sat \le N_{sat}} (PL_F^{sat})_{LG}\right] \quad (146)$$

Step 8: Determine the Lateral Protection Level

The resulting lateral protection level $PL_{LT}$ can be determined by determining the maximum value amongst the corresponding protection levels associated to the nominal condition N and the corresponding protection levels associated to all faulty states according to the following equation (147):

$$PL_{LT} = \max[(PL_N)_{LT}, (PL_F)_{LT}] = \max_{N,F}\left[(PL_N)_{LT}, \max_{1 \le sat \le N_{sat}} (PL_F^{sat})_{LT}\right] \quad (147)$$

Step 9: Determine the Vertical Protection Level

The resulting vertical protection level $PL_{VE}$ can be determined by determining the maximum value amongst the corresponding protection levels associated to the nominal condition N and the corresponding protection levels associated to all faulty states according to the following equation (148):

$$PL_{VE} = \max[(PL_N)_{VE}, (PL_F)_{VE}] = \max_{N,F}\left[(PL_N)_{VE}, \max_{1 \le sat \le N_{sat}} (PL_F^{sat})_{VE}\right] \quad (148)$$

It is to be noted that the order of some of the above steps can be interchanged and some of the steps may even be performed simultaneously. For instance, steps 1 and 2 can be performed in any order or simultaneously, step 4 can be interchanged with any of steps 1 to 5, or be performed simultaneously with any of the steps 1 to 5, and finally, also the order of the steps 7 to 9 can be interchanged with each other or they can be performed simultaneously. Step 6 can be determined after or simultaneously with step 4, but can be interchanged with any of steps 1, 2, 3, and 5, or can be performed simultaneously.

According to this embodiment, it is possible to determine each of the protection levels associated to the positional domains lateral LT, longitudinal LG, and vertical VE. It is to be noted that each of the above partial protection limits being associated to the nominal or the faulty state or only a single faulty state of a specific space vehicle are integrity indicating parameters in the sense of the aspects of the invention as described under the section "Summary of the Invention". The integrity risk parameters determined in the equations (140), (141), (142), (146), (147), and (148) can each be considered as a parameter embodying an integrity indicating parameter in the sense of the present invention as described above under the section "Summary of the Invention".

Furthermore, it is also possible to further derive a more general protection limit parameter obtained from the above mentioned protection level parameters $PL_{LG}$, $PL_{LT}$, $PL_{VE}$ by combining these parameters such as for example by taking the maximum value thereof.

Embodiment of a Method for Determining an Integrity Risk Parameter in a RAIM-Based Scenario Step 1: Determine the Parameters $K_S$ For all the faulty states, i.e. for each of the available space vehicles sat (under the assumptions that particularly the space vehicle sat is in an abnormal condition), the value of the auxiliary parameters $(K_S)_X$ (X being LG, LT, and VE) can be determined according to the following equations (149) to (151) based on the definition of equation (73) above:

$$(\hat{K}_S^{sat})_{LG} = \frac{\bar{\sigma}_{s,LG}^{sat}}{\sigma_{LG,F}^{sat}} \quad (149)$$

$$(\hat{K}_S^{sat})_{LT} = \frac{\bar{\sigma}_{s,LT}^{sat}}{\sigma_{LT,F}^{sat}} \quad (150)$$

$$(\hat{K}_S^{sat})_{VE} = \frac{\bar{\sigma}_{s,VE}^{sat}}{\sigma_{VE,F}^{sat}} \quad (151)$$

Step 2: Determine the Parameters $K_T$

For all the faulty states, i.e. for each of the available space vehicles sat (under the assumptions that particularly the space vehicle sat is in an abnormal condition), the value of the auxiliary parameters $(K_T)_X$ (X being LG, LT, and VE) can be determined according to the following equations (152) to (154) which are based on the definition of equation (74) above:

$$(\hat{K}_T^{sat})_{LG} = \frac{T_{LG}^{sat}}{\sqrt{2}\,\sigma_{LG,F}^{sat}} \quad (152)$$

$$(\hat{K}_T^{sat})_{LT} = \frac{T_{LT}^{sat}}{\sqrt{2}\,\sigma_{LT,F}^{sat}} \quad (153)$$

$$(\hat{K}_T^{sat})_{VE} = \frac{T_{VE}^{sat}}{\sqrt{2}\,\sigma_{VE,F}^{sat}} \quad (154)$$

Step 3: Determine the Parameters $K_{L,F}$

For all the faulty states, i.e. for each of the available space vehicles sat (under the assumptions that particularly the space vehicle sat is in an abnormal condition), the value of the auxiliary parameters $(K_{L,F})_X$ (X being LG, LT, and VE) can be determined according to the following equations (155) to (157) which are based on the definition of equation (75) above:

$$(\hat{K}_{L,F}^{sat})_{LG} = \frac{l_{LG}^{sat}}{\sqrt{2}\,\sigma_{LG,F}^{sat}} \quad (155)$$

$$(\hat{K}_{L,F}^{sat})_{LT} = \frac{l_{LT}^{sat}}{\sqrt{2}\,\sigma_{LT,F}^{sat}} \quad (156)$$

$$(\hat{K}_{L,F}^{sat})_{VE} = \frac{l_{VE}^{sat}}{\sqrt{2}\,\sigma_{VE,F}^{sat}} \quad (157)$$

Here, the parameters $l_X^{sat}$ indicate the respective error thresholds (i.e. alert limits in the determination of an integrity risk) for the longitudinal (X=LG), lateral (X=LT), and vertical (X=VE) positional domains.

Step 4: Determine the Parameters $K_{L,N}$

For the nominal state N, i.e. for the fault-free condition, the value of the auxiliary parameter $(K_{L,N})_X$ (X being LG, LT, and VE) can be determined according to the following equations (158) to (160) which are similar to the definition of the respective parameter $K_{L,N}$ in the GIC-based scenario (cf. e.g. equation (8) above):

$$(K_{L,N})_{LG} = \frac{l_{LG}}{\sqrt{2}\,\sigma_{LG,N}} \tag{158}$$

$$(K_{L,N})_{LT} = \frac{l_{LT}}{\sqrt{2}\,\sigma_{LT,N}} \tag{159}$$

$$(K_{L,N})_{VE} = \frac{l_{VE}}{\sqrt{2}\,\sigma_{VE,N}} \tag{160}$$

Here, the parameters $\sigma_{X,N}$ indicate the standard deviations of the longitudinal (X=LG), lateral (X=LT), and vertical (X=VE) positional error in the nominal condition N which can be determined according to the following equations (161) to (163), $$\sigma_{LG,N} = \sqrt{P_0(1,1)} \tag{161}$$

$$\sigma_{LT,N} = \sqrt{P_0(2,2)} \tag{162}$$

$$\sigma_{VE,N} = \sqrt{P_0(3,3)} \tag{163}$$

where $P_0$ indicates the covariance matrix for the nominal full-set solution which is given according to the following equation (164) (for $W_{N,0}$, see equation (59) above):

$$P_0 = (G^T W_{N,0} G)^{-1} \tag{164}$$

Step 5: Determine the Integrity Risk IR Associated to the Faulty Condition of a Space Vehicle sat For all the faulty states, i.e. for each of the space vehicles sat (under the assumptions that particularly the space vehicle sat is in an abnormal condition), the longitudinal, lateral, and vertical integrity risk parameters $IR_F^{sat}$ can be determined by utilizing the Q-transformation similar to the above mentioned GIC-based scenario according to the following equations (165) to (167):

$$(IR_F^{sat})_{LG} = Q\{(\hat{K}_S^{sat})_{LG}, (\hat{K}_{L,F}^{sat})_{LG} - (\hat{K}_T^{sat})_{LG}\} \tag{165}$$

$$(IR_F^{sat})_{LT} = Q\{(\hat{K}_S^{sat})_{LT}, (\hat{K}_{L,F}^{sat})_{LT} - (\hat{K}_T^{sat})_{LT}\} \tag{166}$$

$$(IR_F^{sat})_{VE} = Q\{(\hat{K}_S^{sat})_{VE}, (\hat{K}_{L,F}^{sat})_{VE} - (\hat{K}_T^{sat})_{VE}\} \tag{167}$$

Step 6: Determine the Integrity Risk Parameters Associated to the Nominal Condition N For the nominal condition N, i.e. the fault-free condition also referred to as fault-free feared event, the longitudinal, lateral, and vertical integrity risks in the nominal condition N can be determined according to the following equations (168) to (170) which are based on equation (7) above:

$$(IR_N)_{LG} = P_{OC,N} \cdot erfc\lfloor (K_{L,N})_{LG} \rfloor \tag{168}$$

$$(IR_N)_{LT} = P_{OC,N} \cdot erfc\lfloor (K_{L,N})_{LT} \rfloor \tag{169}$$

$$(IR_N)_{VE} = P_{OC,N} \cdot erfc\lfloor (K_{L,N})_{VE} \rfloor \tag{170}$$

Step 7: Determine the Longitudinal Integrity Risk Parameter

The resultant longitudinal integrity risk $(IR)_{LG}$ for the longitudinal positional domain can be determined by adding the corresponding integrity risks as determined above associated to the nominal states N and the integrity risk parameters associated each of the possible faulty states (i.e. for each of the available space vehicles 1, 2, ..., $N_{sat}$) according to the following equation (171):

$$(IR)_{LG} = (IR_N)_{LG} + (IR_F)_{LG} = (IR_N)_{LG} + \sum_{sat=1}^{N} (IR_F^{sat})_{LG} \tag{171}$$

Step 8: Determine the Lateral Integrity Risk Parameter

The resultant lateral integrity risk $(IR)_{LT}$ for the lateral positional domain can be determined by adding the corresponding integrity risks as determined above associated to the nominal states N and the integrity risk parameters associated each of the possible faulty states (i.e. for each of the available space vehicles 1, 2, ..., $N_{sat}$) according to the following equation (172):

$$(IR)_{LT} = (IR_N)_{LT} + (IR_F)_{LT} = (IR_N)_{LT} + \sum_{sat=1}^{N} (IR_F^{sat})_{LT} \tag{172}$$

Step 9: Determine the Vertical Integrity Risk Parameter

The resultant vertical integrity risk $(IR)_{VE}$ can be determined by adding the corresponding integrity risks as determined above associated to the nominal states N and the integrity risk parameters associated each of the possible faulty states (i.e. for each of the available space vehicles 1, 2, ..., $N_{sat}$) according to the following equation (173):

$$(IR)_{VE} = (IR_N)_{VE} + (IR_F)_{VE} = (IR_N)_{VE} + \sum_{sat=1}^{N} (IR_F^{sat})_{VE} \tag{173}$$

Step 10: Determine the Overall Integrity Risk Parameter IR

The overall integrity risk parameter IR which has the contributions from each of the faulty conditions and the fault-free conditions and from each of the positional domain longitudinal, lateral, and vertical can be derived by adding the above derived longitudinal, lateral, and vertical components as determined in steps 7 to step 9 according to the following equation (174);

$$IR = (IR)_{LG} + (IR)_{LT} + (IR)_{VE} \tag{174}$$

With regard to the above described embodiments, it is to be noted that this embodiment can be modified by interchanging some of the above steps and/or combining some of the above steps. Specifically, regarding the above steps 1, 2, 3, and 4, it is to be noted that these steps can be interchanged by any order and/or also be performed simultaneously. Also the steps 7 to 9 as described above can be interchanged in any order or be performed simultaneously. Step 6 can be interchanged with any of the steps 1 to 5 and 6 to 9 or performed simultaneously.

Furthermore, it is to be noted that the integrity risk parameters determined in the equations (165), (166), (167), (171), (172), (173), and (174) can each be considered as a parameter embodying an integrity indicating parameter in the sense of the present invention as described above under the section "Summary of the Invention".

Embodiment of a Method for Determining a Protection Level Parameter in a RAIM-Based Scenario

Step 1: Determine the Parameter $K_S$

For all faulty states, i.e. for each of the available space vehicles sat (under the assumptions that particularly the space vehicle sat is in an abnormal condition), the value of the auxiliary parameters $(K_S^{sat})_X$ for the longitudinal (X=LG), lateral (X=LT), and vertical (X=VE) positional domain and for each so space vehicle sat can be determined according to the equations (175) to (177) below similar to the above step 1 of the integrity risk determination in a RAIM-based scenario:

$$(\hat{K}_S^{sat})_{LG} = \frac{\bar{\sigma}_{s,LG}^{sat}}{\sigma_{LG,F}^{sat}} \tag{175}$$

$$(\hat{K}_S^{sat})_{LT} = \frac{\bar{\sigma}_{s,LT}^{sat}}{\sigma_{LT,F}^{sat}} \tag{176}$$

$$(\hat{K}_S^{sat})_{VE} = \frac{\bar{\sigma}_{s,VE}^{sat}}{\sigma_{VE,F}^{sat}} \tag{177}$$

Here, the parameters $\bar{\sigma}_{s,X}^{sat}$ (X being LG, LT, or VE) indicate the standard deviations of the saturation between the non-nominal tuft-set (one single space vehicle fault condition) and the sat subset longitudinal, lateral, and vertical solution.

The sat subset solution can be obtained by omitting the faulty space vehicle sat. These standard deviations are given according to the equations (178) to (180):

$$\bar{\sigma}_{s,LG}^{sat} = \sqrt{d\bar{P}_{sat}(1,1)} \tag{178}$$

$$\bar{\sigma}_{s,LT}^{sat} = \sqrt{d\bar{P}_{sat}(2,2)} \tag{179}$$

$$\bar{\sigma}_{s,VE}^{sat} = \sqrt{d\bar{P}_{sat}(3,3)} \tag{180}$$

Here, $d\bar{P}_{sat}$ indicates the covariance matrix for the non-nominal separation according to the following equation (181):

$$d\bar{P}_{sat}(S_{N-1,sat} - S_{N,0})(W_{N,sat})^{-1}(S_{N-1,sat} - S_{N,0})^T \tag{181}$$

$S_{N-1,sat}$ and $S_{N,0}$ relate to the least-squares matrices corresponding to the sat subset (e.g. the is subset obtained by omitting the space vehicle sat) and the nominal full-set solution. They can be determined according to the following equations (182) and (183):

$$S_{N-1,sat} = (G^T W_{N-1,sat} G)^{-1} G^T W_{N-1,sat} \tag{182}$$

$$S_{N,0} = (G^T W_{N,0} G)^{-1} G^T W_{N,0} \tag{183}$$

Here, G indicates the N by 4 direction cosine matrix, and $W_{N,0}$ indicates the weight matrix (the inverse of the covariance matrix) of the nominal full-set least-squares solution:

$$W_{N,0} = \begin{bmatrix} \frac{1}{\sigma_1^2} & 0 & \ldots & 0 & \ldots & 0 \\ 0 & \frac{1}{\sigma_2^2} & \ldots & 0 & \ldots & 0 \\ \ldots & \ldots & \ldots & \ldots & \ldots & \ldots \\ 0 & 0 & \ldots & \frac{1}{\sigma_{sat}^2} & \ldots & 0 \\ \ldots & \ldots & \ldots & \ldots & \ldots & \ldots \\ 0 & 0 & \ldots & 0 & \ldots & \frac{1}{\sigma_N^2} \end{bmatrix} \tag{184}$$

$$\sigma_{sat}^2 = \sigma_{UERE,sat}^2 + SISA_{sat}^2 \tag{185}$$

The weight matrix $W_{N-1,sat}$ (inverse of a covariance matrix) is a weight matrix of the sat subset least-squares solution, $$W_{N-1,sat} = \begin{bmatrix} \frac{1}{\sigma_1^2} & 0 & \ldots & 0 & \ldots & 0 \\ 0 & \frac{1}{\sigma_2^2} & \ldots & 0 & \ldots & 0 \\ \ldots & \ldots & \ldots & \ldots & \ldots & \ldots \\ 0 & 0 & \ldots & 0 & \ldots & 0 \\ \ldots & \ldots & \ldots & \ldots & \ldots & \ldots \\ 0 & 0 & \ldots & 0 & \ldots & \frac{1}{\sigma_N^2} \end{bmatrix} = M_{sat} W_{N,0} \tag{186}$$

where $M_{sat}$ is a N by N identical matrix which has the entries 1 on each of the diagonal elements but the diagonal element corresponding to the sat space vehicle, wherein the diagonal element relating to the sat space vehicle is set to 0.

Furthermore, $W_{N,sat}$ indicates a weight matrix (inverse of a covariance matrix) of the non-nominal full-set (one single space vehicle fault) least-squares solution:

$$W_{N,sat} = \begin{bmatrix} \frac{1}{\sigma_1^2} & 0 & \ldots & 0 & \ldots & 0 \\ 0 & \frac{1}{\sigma_2^2} & \ldots & 0 & \ldots & 0 \\ \ldots & \ldots & \ldots & \ldots & \ldots & \ldots \\ 0 & 0 & \ldots & \frac{1}{\sigma_{UERE,sat}^2} & \ldots & 0 \\ \ldots & \ldots & \ldots & \ldots & \ldots & \ldots \\ 0 & 0 & \ldots & 0 & \ldots & \frac{1}{\sigma_N^2} \end{bmatrix} \tag{187}$$

$$\sigma_{sat}^2 = \sigma_{UERE,sat}^2 + SISA_{sat}^2 \tag{188}$$

Here, the standard deviations $\sigma_{X,F}^{sat}$ (X being LG, LT, and VE) of the longitudinal, lateral, and vertical positional error in the faulty condition are given to following equations (189) to (191):

$$\sigma_{LG,F}^{sat} = \sqrt{P_{sat}(1,1)} \tag{189}$$

$$\sigma_{LT,F}^{sat} = \sqrt{P_{sat}(2,2)} \tag{190}$$

$$\sigma_{VE,F}^{sat} = \sqrt{P_{sat}(3,3)} \tag{191}$$

Here, $P_{sat}$ indicates the covariance matrix for the non-nominal full-set solution and can be determined according to equation (192):

$$P_{sat} = S_{N,0} W_{N,sat}^{-1} S_{N,0}^T \tag{192}$$

Step 2: Determine Parameter $K_T$

For all of the faulty states, i.e. for each of the space vehicles sat (under the assumptions that particularly the space vehicle sat is in an abnormal condition), the value of the auxiliary parameters $K_{T,X}^{sat}$ (X being LG, LT, and VE) can be determined according to the following equations (193) to (195) which correspond to the equations (155) to (157) of step 3 of the above described embodiment for a method for the determination of an integrity risk in a RAIM-based scenario.

$$(\hat{K}_T^{sat})_{LG} = \frac{T_{LG}^{sat}}{\sqrt{2}\,\sigma_{LG,F}^{sat}} \tag{193}$$

$$(\hat{K}_T^{sat})_{LT} = \frac{T_{LT}^{sat}}{\sqrt{2}\,\sigma_{LT,F}^{sat}} \tag{194}$$

$$(\hat{K}_T^{sat})_{VE} = \frac{T_{VE}^{sat}}{\sqrt{2}\,\sigma_{VE,F}^{sat}} \tag{195}$$

Here, the parameter $T_X^{sat}$ (X being LG, LT, and VE) indicate the longitudinal, lateral, and vertical detection thresholds which are given according to the following formulas (196) to (198):

$$T_{LG}^{sat} = k_{fa,LG} \cdot \sigma_{s,LG}^{sat} \tag{196}$$

$$T_{LT}^{sat} = k_{fa,LT} \cdot \sigma_{s,LT}^{sat} \tag{197}$$

$$T_{VE}^{sat} = k_{fa,VE} \cdot \sigma_{s,VE}^{sat} \tag{198}$$

Here, the parameters $k_{fa,X}$ (X being LG, LT, and VE) indicate the number of $\sigma$ that corresponds to the probability of false alarm (respectively the longitudinal, lateral, and vertical components thereof), and the parameters $\sigma_{s,X}^{sat}$ (X being LG, LT, and VE) indicate the standard deviations of the separation between the nominal full-set (all fault-free signal in space SIS) and the sat subset longitudinal, lateral, and vertical solution.

The sat subset solution can be obtained by omitting the space vehicle sat:

$$\sigma_{s,LG}^{sat} = \sqrt{dP_{sat}(1,1)} \tag{199}$$

$$\sigma_{s,LT}^{sat} = \sqrt{dP_{sat}(2,2)} \tag{200}$$

$$\sigma_{s,VE}^{sat} = \sqrt{dP_{sat}(3,3)} \tag{201}$$

Here, $dP_{sat}$ indicate the covariance matrix for the nominal separation which can be determined according to the following equation (202):

$$dP_{sat} = (S_{N-1,sat} - S_{N,0})(W_{N,0})^{-1}(S_{N-1,sat} - S_{N,0})^T \tag{202}$$

Here, $S_{N-1,sat}$ and $S_{N,0}$ represent the least-squares matrices corresponding to the sat subset (the subset obtained by omitting the space vehicle sat) and the nominal full-set solution (as explained above).

Step 3: Determine the Parameters $K_{L,F}$

For all the faulty states, i.e. for each of the space vehicles sat (under the assumptions that particularly the space vehicle sat is in an abnormal condition), the value of the auxiliary parameters $(K_{L,F})_X$ (X being LG, LT, and VE) can be determined by using the Q*-transformations as illustrated already with respect to an example in FIG. 8 and the description thereof.

The corresponding formulas are:

$$(\hat{K}_{L,F}^{sat})_{LG} = Q^*\{(\hat{K}_S^{sat})_{LG}, (P_F^{sat})_{LG}\} + (\hat{K}_T^{sat})_{LG} \tag{203}$$

$$(\hat{K}_{L,F}^{sat})_{LT} = Q^*\{(\hat{K}_S^{sat})_{LT}, (P_F^{sat})_{LT}\} + (\hat{K}_T^{sat})_{LT} \tag{204}$$

$$(\hat{K}_{L,F}^{sat})_{VE} = Q^*\{(\hat{K}_S^{sat})_{VE}, (P_F^{sat})_{VE}\} + (\hat{K}_T^{sat})_{VE} \tag{205}$$

Here $(P_F^{sat})_X$ (X being LG, LT, and VE) indicate the respective probabilities that the longitudinal, lateral, and vertical positional errors exceed the respective longitudinal, lateral, and vertical protection levels in the faulty condition.

Step 4: Determine the Parameters $K_{L,N}$

For the nominal state N (i.e. the fault-free feared event), the value of the auxiliary parameters $(K_{L,N})_X$ (X being LG, LT, and VE) can be determined according to the following equations (206) to (208):

$$(K_{L,N})_{LG} = erfc^{-1}\left[\frac{(P_N)_{LG}}{P_{OC,N}}\right] \tag{206}$$

$$(K_{L,N})_{LT} = erfc^{-1}\left[\frac{(P_N)_{LT}}{P_{OC,N}}\right] \tag{207}$$

$$(K_{L,N})_{VE} = erfc^{-1}\left[\frac{(P_N)_{VE}}{P_{OC,N}}\right] \tag{208}$$

Here, $P_{OC,N}$ indicated the probability of an occurrence of a fault-free condition (in this regard, it is to be noted that in a typical scenario, the probability $P_{OC,N}$ can be assumed to be equal to 1, i.e. $P_{OC,N}=1$). Furthermore, the parameters $(P_N)_X$ (X being LG, LT, and VE) indicate the respective probabilities that the longitudinal, lateral, and vertical positional error exceeds the longitudinal, lateral, and vertical protection levels, respectively, in nominal condition N.

Step 5: Determine the Protection Limit PL Associated to the Faulty Condition

For all the faulty states, i.e. for each of the space vehicles sat (under the assumptions that particularly the space vehicle sat is in an abnormal condition), the longitudinal, lateral, and vertical protection limit $(PL_F^{sat})_X$ (X being LG, LT, and VE) can be determined according to the following equations (209) to (211):

$$(PL_F^{sat})_{LG} = \sqrt{2}(\hat{K}_{L,F}^{sat})_{LG}\sigma_{LG,F}^{sat} \tag{209}$$

$$(PL_F^{sat})_{LT} = \sqrt{2}(\hat{K}_{L,F}^{sat})_{LT}\sigma_{LT,F}^{sat} \tag{210}$$

$$(PL_F^{sat})_{VE} = \sqrt{2}(\hat{K}_{L,F}^{sat})_{VE}\sigma_{VE,F}^{sat} \tag{211}$$

Step 6: Determine the Protection Limit PL Associated to with the Nominal Condition N For nominal state N i.e. a fault-free condition, the longitudinal, lateral, and vertical protection limits in nominal condition N can be determined according to the following equations (212) to (214):

$$(PL_N)_{LG} = \sqrt{2}(K_{L,N})_{LG}\sigma_{LG,N} \tag{212}$$

$$(PL_N)_{LT} = \sqrt{2}(K_{L,N})_{LT}\sigma_{LT,N} \tag{213}$$

$$(PL_N)_{VE} = \sqrt{2}(K_{L,N})_{VE}\sigma_{VE,N} \tag{214}$$

Here, the parameters $\sigma_{X,N}$ (X being LG, LT, and VE) indicate the standard deviations of longitudinal, lateral, and vertical positional error in the nominal condition N and can be determined according to the following equations (215) to (217):

$$\sigma_{LG,N} = \sqrt{P_0(1,1)} \tag{215}$$

$$\sigma_{LT,N} = \sqrt{P_0(2,2)} \tag{216}$$

$$\sigma_{VE,N} = \sqrt{P_0(3,3)} \tag{217}$$

Here, $P_0$ represents the covariance matrix for the nominal full-set solution and can be determined according to equation (218):

$$P_0 = (G^T W_{N,0} G)^{-1} \tag{218}$$

Step 7: Determine the Longitudinal Protection Limit $PL_{LG}$

The resultant longitudinal protection limit $PL_{LG}$ in the longitudinal domain can be determined by determining the maximum value amongst the corresponding protection limits associated to the nominal state and the protection limits associated to all faulty states in the longitudinal positional domain:

$$PL_{LG} = \tag{219}$$
$$\max[(PL_N)_{LG}, (PL_F)_{LG}] = \max_{N,F}\left[(PL_N)_{LG}, \max_{1 \leq sat \leq N_{sat}}(PL_F^{sat})_{LG}\right]$$

Step 8: Determine the Lateral Protection Limit $PL_{LT}$

The resultant lateral protection limit $PL_{LT}$ in the lateral domain can be determined by determining the maximum value amongst the corresponding protection limits associated to the nominal state and the protection limits associated to all faulty states in the lateral positional domain:

$$PL_{LT} = \tag{220}$$
$$\max[(PL_N)_{LT}, (PL_F)_{LT}] = \max_{N,F}\left[(PL_N)_{LT}, \max_{1 \leq sat \leq N_{sat}}(PL_F^{sat})_{LT}\right]$$

Step 9: Determine the Vertical Protection Limit $PL_{VE}$

The resultant vertical protection limit $PL_{VE}$ in the vertical domain can be determined by determining the maximum value amongst the corresponding protection limits associated to the nominal state and the protection limits associated to all faulty states in the vertical positional domain:

$$PL_{VE} = \tag{221}$$
$$\max[(PL_N)_{VE}, (PL_F)_{VE}] = \max_{N,F}\left[(PL_N)_{VE}, \max_{1 \leq sat \leq N_{sat}}(PL_F^{sat})_{VE}\right]$$

It is to be noted that the order of some of the above steps can be interchanged and some of the steps may even be performed simultaneously. For instance, steps 1 and 2 can be performed in any order or simultaneously, step 4 can be interchanged with any of steps 1 to 5, or be performed simultaneously with any of the steps 1 to 5, and finally, also the order of the steps 7 to 9 can be interchanged with each other or they can be performed simultaneously. Step 6 can be determined after or simultaneously with step 4, but can be interchanged with any of steps 1, 2, 3, and 5, or can be performed simultaneously.

According to this embodiment, it is possible to determine each of the protection levels associated to the positional domains lateral LT, longitudinal LG, and vertical VE. It is to be noted that each of the above partial protection limits being associated to the nominal or the faulty state or only a single faulty state of a specific space vehicle are integrity indicating parameters in the sense of the aspects of the invention as described under the section "Summary of the Invention". The integrity risk parameters determined in the equations (209), (210), (211), (219), (220), and (221) can each be considered as a parameter embodying an integrity indicating parameter in the sense of the present invention as described above under the section "Summary of the Invention".

Furthermore, it is also possible to further derive a more general protection limit parameter obtained from the above mentioned protection level parameters $PL_{LG}$, $PL_{LT}$, $PL_{VE}$ by combining these parameters such as for example by taking the maximum value thereof.

Figure 19:
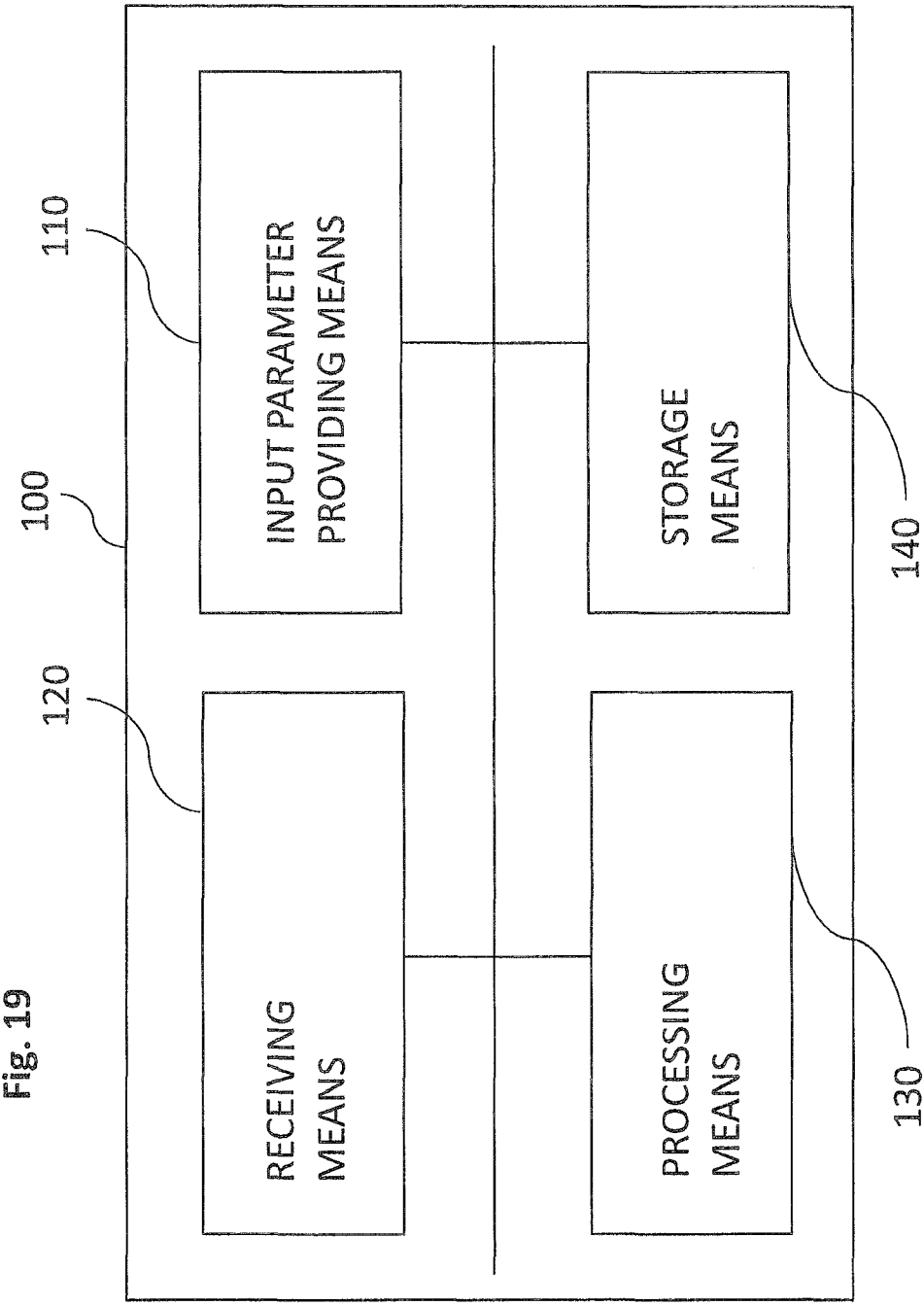
FIG. 19 shows an example of an apparatus for determining an integrity indicating parameter according to an embodiment of the present invention.

Embodiment of an Apparatus for Determining an Integrity Indicating Parameter According to the Present Invention FIG. 19 shows an example of an embodiment of an apparatus 100 for determining an integrity indicating parameter (such as, for example, an integrity risk IR, and a protection level PL, or partial parameters thereof) which are suitable to indicate the integrity or at least a partial integrity of positioning information determined from positioning information signals which are disseminated from a plurality of space vehicles of a global positioning, such as for example satellites of a global positioning system such as e.g. OPS or Galileo, or the like.

The apparatus 100 according to this embodiment comprises an input parameter providing means 110 for providing an input parameter. For example, when determining an integrity risk IR or at least a partial integrity risk parameter, there are the required input parameters such as for example at least an alert limit AL or partial alert limits, such as alert limits $AL_X$ in a certain positional domain. These can then be associated with an error threshold $I_X$ which can be used for the determination of an integrity risk at the alert limit AL or for a partial integrity risk $IR_X$ at the partial alert limit $AL_X$. Furthermore, when determining a protection level PL as an integrity indicating parameter in the sense of the present invention, an input parameter such as an integrity risk or at least a partial integrity risk is to be inputted as an input parameter.

The integrity parameter providing means 110 is configured to provide an input parameter for the determination of an integrity indicating parameter according to at least one of the above described embodiments and preferred aspects of methods of the present invention. For example, the input parameter providing means 110 can have predetermined input parameters stored in a storage moans which can be provided for the determination of the integrity indicating parameter. Also, it is possible that the input parameter providing means 110 comprises input means which can be used by a user or an administrator to input the input parameters to be used for the determination of the integrity indicating parameters. Furthermore, the input parameter providing means 110 can be configured to determine or receive instructions by a user or an administrator if the input parameter is an integrity risk related so parameter so that a protection level related integrity indicating parameter is to be determined, or if the input parameter is a protection level related so that an integrity risk related integrity indicating parameter can be determined.

Furthermore, as described with reference to the above mentioned embodiments and preferred aspects of the present invention, the determination of an integrity indicating parameter requires integrity indicating parameters which have also to be known or be possibly derived in order to be able to determine the integrity indicating parameter. At least some of the integrity indicating parameters are received at the apparatus 100 by a receiving means 120 which is considered to receive a plurality of integrity information parameters which are, for example, sent from one or more of the space vehicles and/or one or more of ground stations of the global positioning system. For example, parameters such as the signal in space accuracy SISA and the signal in space monitoring accuracy SISMA can be received from ground stations or from the space vehicles directly at a receiver of a user, while other integrity information parameters may also be already stored in a storage means 140 of the apparatus 100.

Accordingly, the apparatus 100 also comprises a storage means 140 which is configured to store data and can be used to store predetermined input parameters, some of the required integrity information parameters, program means which are configured to determine an integrity indicating parameter in combination with a processing means 130 of the apparatus 100 or perform one or more of the above mentioned method steps of the embodiments of the method for determining an integrity indicating parameter in combination with the processing means 130 of the apparatus 100.

The storage means 140 can be further used to provide/stare one or more look-up tables corresponding to auxiliary relations such as for example the Q-transformation and Q*-transformation according to the examples of the FIGS. 9 and 10, for instance. Also, similar auxiliary relations and other mathematical functions such as probability density function $X^2$ can be stored in the storage means 140.

For realizing the storage means 140, it is possible to use any of the known storage means technologies, such as for example hard disk, flash memory, mobile storage means such as USB storage means, optical disks, RAM, ROM, or the like.

Finally, the apparatus 100 comprises a processing means 130 which may, for example, comprise a CPU, wherein the apparatus 100 is adapted such that the processing means 140 in combination with the receiving means 120, the input parameter providing means 110, and the storage means 140, which may be connected via a bus to the processing means 130, is configured to determine an integrity indicating parameter according to at least one of the above mentioned embodiments, aspects and preferred aspects of methods according to the present invention. Preferably, the apparatus is configured such that the apparatus 100 is adapted to perform plural or even all of the above mentioned embodiments, aspects, and preferred aspects of methods of the present invention. In particular, the processing means 130 can be adapted to perform mathematical operations such as addition and multiplication of parameters, such as e.g. the input parameter, the received and/or stored integrity information parameters, and/or other parameters.

Effects of the Present Invention

The present invention provides a method and an apparatus for determining an integrity indicating parameter according to an integrity risk based integrity concept and/or according to a protection level based integrity concept for a global positioning system such as e.g. GPS or Galileo.

For instance, for the integrity risk based concept, generally an integrity risk IR is defined as the probability that the positional error of position information determined from the signal in space SIS received from a plurality of available space vehicles, such as satellites of the global positioning system, exceeds a certain tolerance threshold without being detected (typically, such situations can be detected since the space vehicles monitor themselves and/or are monitored by ground stations GSS of the global positioning system; however, when it is not detected and an alert for warning a user is not issued in time, there may be a loss of integrity i.e. within a predetermined time period).

Such an integrity risk parameter IR can be used as an integrity performance indicator of the determined positioning information which can be used by a user and/or an application to estimate the current integrity of the positioning information for being able to decide whether to rely on the positioning information or not. For the determination of an integrity risk, there are considered two different conditions which could contribute to a loss of integrity as defined in the definition of the integrity risk above, namely, a so-called fault-free integrity risk contribution and a faulty integrity risk contribution.

Fault-free integrity risk contributions relate to the hypothesis that all space vehicles which are is available to the users are in a nominal condition, i.e. the signal in space SIS sent from these space vehicles does not exceed the tolerable error thresholds, but the stochastic combination of the ranging errors of all available space vehicles still leads to an overall positional error that exceeds the tolerance, thereby being a possible contribution to the overall integrity risk IR.

Space vehicles in a nominal condition exhibit a vector error between the perfect navigation data and the actually transmitted navigation data for which there is usually an accurate statistical "a priori" knowledge and no deterministic "a priori" knowledge.

On the other hand, the so-called faulty condition integrity risk contribution comes from the hypothesis that exactly one of the space vehicles is in a non-nominal condition (also referred to as a faulty condition or failure condition) in which the time and/or positional error exceeds a certain threshold for the exactly one space vehicle and the ranging error therefore leads to a positional error to exceed the tolerance based on this single failure event of exactly one space vehicle.

A space vehicle in a non-nominal condition exhibits a vector error between the perfect navigation data and the transmitted navigation data for which there is no statistical "a priori" knowledge and no deterministic "a priori" knowledge.

Therefore, it is difficult to determine the faulty case integrity risk contribution accurately without providing conservative estimates that lead to an unnecessarily high unavailability of the system due to the determination of an upper bound of an overall integrity risk which is larger then an actual integrity risk.

In this connection, it is to be noted that failure feared events in which two or more space vehicles are in a non-nominal condition at the same time is neglected in the above-described embodiments, since such events are significantly less probable then single failure events in which exactly one space vehicle is in a non-nominal condition. However, the present invention is not limited to this and the overall integrity risk could furthermore also include the considered contributions from the hypothesis that two or more space vehicles are in the non-nominal condition at the same time (cf. e.g. WO 2005/088332 A2 with regard to the additional contributions from hypothesis of two or more satellites in the non-nominal condition).

For the faulty case, it is usually necessary to make an estimate of the probability of a fault occurrence (i.e. of a single failure event in this case), where this probability $P_{OC}$ can be derived from an analysis (e.g. generally $2.7 \times 10^{-6}$ in 150 seconds).

According to a first aspect of the present invention, the contributions to the integrity risk from the faulty condition (relating to single failure events) are based on an almost exact simplification of the product of a probability of missed detection $P_{MD}$ and a probability of impact on the positional domain $I_{F,X}$, so that it is possible to base the determination of the integrity indicating parameters on an exact simplification of the product $P_{MD} \times I_{F,X}$ (cf. e.g. FIGS. 2, 3, and 4 and the description thereof).

Accordingly, it is possible according to this aspect to determine a very exact and accurate integrity indicating parameter which is almost exactly representing the actual integrity risk or protection level so that the availability of the system according to this aspect of the present invention can be significantly improved, for instance, compared to the current algorithm as intended for the Galileo integrity risk (cf. e.g. WO 2006/032422 A1).

This aspect of the present invention can take into account the probability of a missed detection of a single failure event which is almost 100% mathematically and physically rigorous and accurate so as to allow the determination of a integrity risk parameter lower than the integrity risk parameter determined according to the algorithm of WO 2006/032422 A1 by a factor between 5.5 and 8.5 according to simulations and comparisons of algorithms performed by the inventors of the present invention.

Therefore, the availability of the system can be significantly improved and increased with this aspect of the present invention by a factor up to 100%. This is also possible because the fault magnitude according to the algorithm of WO 2006/032422 A1 relies on a deterministic component, such as a detection barrier threshold, and a stochastic component, such as a Gaussian standard deviation barrier uncertainty, while this aspect of the present invention makes it possible to determine the integrity risk indicating parameter without assumptions about maximizing the integrity risk (cf. FIG. 4, i.e. using the maximum of the product of $P_{MD}$ and $I_F$), thereby, allowing to reflect almost exactly the actual integrity so that the availability can be significantly improved without any decrease in integrity and reliability of the integrity concept.

Furthermore, according to a second aspect of the present invention, it is possible to determine the integrity indicating parameters by utilizing a simple auxiliary relation which needs only two auxillarily determined parameters as input parameters which can be easily determined based on the input parameter and the received and/or stored integrity information parameters so as to give an output parameter which either already directly corresponds to or at least allows to easily determine the resulting integrity indicating parameter so that the processing burden and computational burden in the determination of the integrity indicating parameters can be significantly reduced.

Moreover, it is advantageously possible to provide such an auxiliary relation according to the so above mentioned so-called Q-transformation and Q*transformation (which is a name given to the algorithms of this aspect of the present invention by the inventors of the present invention) which can be stored in form of one or more look-up tables. These can, for example, be pre-computed and stored in a storage means (e.g. storage means 140) which allows to efficiently determine an output parameter without any computational effort and computational burden based on two auxiliary input parameters.

Accordingly, the computational burden can be drastically reduced. According to simulations performed by the inventors of the present invention, according to this aspect of the present invention, it is possible to reduce the computational burden by a factor of 5 in comparison to the algorithm for determining an integrity risk according to WO 2006/032422 A1. This even advantageously allows to more efficiently determine an integrity indicating parameter at a compact receiver device at the user level, i.e. a global positioning means which is comprised in electronic apparatuses such as cell phones, notebook computers, or the like.

The accuracy of the method can be further improved by not only taking the exact values of the look-up table but making it possible by a processing means of an apparatus for determining the integrity indicating parameter to interpolate between different entries in the look-up tables representing one or more auxiliary relations such as the Q-transformation or the Q*-transformation.

When combining the first and the second aspect of the present invention, i.e. determining the integrity indicating parameter on the basis of a relation which involves the probability of missed detection, in particular the product of the probability of missed detection with the probability of impact, with the second aspect of the present invention, i.e. determining the integrity indicating parameter by utilizing an auxiliary relation which is preferably an auxiliary relation between two auxiliary parameters and an output parameter from which the integrity indicating parameter can be easily determined or already corresponds to the output parameter, the effects of the invention can be obtained as follows:
 the availability of the system can be significantly increased while keeping the high level of integrity, and
 the processing/computational burden and effort can be significantly reduced so that it is possible to determine integrity indicating parameters efficiently and accurately at the same time at high availability of the system.

It is to be noted that the present invention makes it possible to determine integrity indicating parameters based on the integrity risk based concept and based on the protection level based concept, i.e., it is possible to efficiently and accurately determine integrity risks as well as protection levels by using a similar method according to one or more aspects of the present invention, which makes it further advantageously possible to determine integrity indicating parameters according to both, the integrity risk based concept and the protection level based concept so as to advantageously make it possible to compare results of the one concept with results of the other concept. This makes it possible that the application may be independent of the actual concept, even if it requires an integrity indicating parameter according to only one these concepts, since an apparatus and method according to the present invention can be used to determine both, an integrity risk as well as a protection level based integrity indicating parameter.

Features, components and specific details of the structures of the above-described embodiments may be exchanged or combined to form further embodiments optimized for the respective application. As far as those modifications are readily apparent for an expert skilled in the art they shall be disclosed implicitly by the above description without specifying explicitly every possible combination, for the sake of conciseness of the present description.

The invention claimed is:

1. Method for determining an integrity indicating parameter which indicates the integrity of positioning information determined from positioning information signals disseminated from a plurality of space vehicles of a satellite positioning system,
 said method comprising:
  providing an input parameter,
  receiving a plurality of integrity information parameters, and
  determining the integrity indicating parameter on the basis of said input parameter and on the basis of a first relation between said integrity indicating parameter and said input parameter and said plurality of integrity information parameters, wherein determining the integrity indicating parameter comprises
calculating a first auxiliary parameter and a second auxiliary parameter on the basis of said input parameter and said plurality of received integrity information parameters, and
determining an output parameter in dependence of said first and said second auxiliary parameters on the basis of an auxiliary relation which is a relation between said first and second auxiliary parameters and said output parameter and which corresponds to the first relation between said integrity indicating parameter and said input parameter, said auxiliary relation being provided in the form of a stored two-dimensional look-up table,
wherein said output parameter corresponds to said integrity indicating parameter or said integrity indicating parameter is determined from said output parameter.

2. Method according to claim 1, wherein it is detected if said space vehicles are in a normal condition or in an abnormal condition, wherein only positioning information signals disseminated from space vehicles for which a normal condition is detected are used for said position information determination,
wherein said first relation is a relation between
a first probability, said first probability indicating a probability that a positional error of said positioning information determination exceeds an error threshold because of an abnormal condition of a space vehicle which is not detected,
the error threshold, and
a plurality of said received integrity information parameters.

3. Method according claim 2, wherein said first relation is based on a second probability a third probability, and a fourth probability,
said second probability indicating a probability for the occurrence of a single failure event, said single failure event being defined as an event in which exactly one of the plurality of space vehicles is in an abnormal condition,
said third probability indicating a probability of an impact of the occurrence of said single failure event to the positional error of said positioning information determination, and
said fourth probability indicating a probability that an occurrence of an abnormal condition of a monitored space vehicle is not detected.

4. Method according to claim 3, wherein
said first relation is based on a probability relation according to which the first probability is equal to a product of said second, third, and fourth probabilities or wherein said first relation represents an approximation of said probability relation, said approximation introducing an absolute error equal or less than $10^{-7}$ times the second probability.

5. Method according to claim 1, wherein
said integrity indicating parameter indicates an integrity risk, if said input parameter relates to a predetermined alert limit, and
said integrity indicating parameter indicates a protection level, if said input parameter relates to a predetermined integrity risk.

6. Method according to claim 2, wherein
said integrity indicating parameter indicates an integrity risk, if said input parameter relates to said error threshold corresponding to a predetermined alert limit, and
said integrity indicating parameter indicates a protection level corresponding to said error threshold, if said input integrity parameter relates to a predetermined integrity risk.

7. Method according to claim 6, wherein
said integrity indicating parameter indicates an integrity risk in a certain positional domain, if said input parameter relates to said error threshold in said certain positional domain corresponding to a predetermined alert limit in said certain positional domain, wherein said step of determining the integrity indicating parameter is performed for a plurality of positional domains, and an overall integrity risk is determined based on a sum of the determined integrity indicating parameters for the plurality of positional domains, or
said integrity indicating parameter indicates a protection level in a certain positional domain corresponding to said error threshold in a certain positional domain, if said input integrity parameter relates to a predetermined integrity risk in said certain positional domain, wherein said step of determining the integrity indicating parameter is performed for a plurality of positional domains, and an overall protection level is determined based on one or more of said plurality of determined protection levels, in particular or the overall protection level is determined based on the maximum value of one or more of said plurality of determined protection levels.

8. Method according to claim 2, wherein, determining said integrity indicating parameter is further performed on the basis of a second relation which is a relation between
a fifth probability, said fifth probability indicating a probability that a positional error of said positioning information determination in a certain positional direction exceeds an error threshold although each of said space vehicles is in a normal condition,
the error threshold, and
two or more of said received integrity information parameters.

9. Method according claim 8, wherein
said second relation is based on a sixth probability and a seventh probability, said sixth probability indicating a probability for the occurrence of a fault-free failure event, said fault-free failure event being defined as an event in which an overall positional error of said positioning information determination exceeds an error threshold and said seventh probability indicating a probability of an impact of the occurrence of said fault-free failure event to the positional error of said positioning information determination in said certain positional direction.

10. Method according to claim 1, wherein,
said plurality of received integrity information parameters are disseminated from said space vehicles of said satellite positioning system;
said plurality of received integrity information parameters are disseminated from one or more ground stations of said satellite positioning system, which ground stations are monitoring said space vehicles of said satellite positioning system; or
a first group comprising one or more of said received integrity information parameters are disseminated from said space vehicles of said satellite positioning system and a second group comprising one or more of said received integrity information parameters are disseminated from said one or more ground stations of said satellite positioning system.

11. Method according to claim 2, wherein said auxiliary relation is based on said relation between said first probability and said error threshold and said plurality of received integrity information parameters.

12. Method according to claim 3, wherein said auxiliary relation is based on said second probability, said third probability, and said fourth probability, said auxiliary relation representing an approximation of a probability relation according to which the first probability is equal to a product of said second, third, and fourth probabilities, wherein said approximation introduces an absolute error equal or less than $10^{-7}$ times the second probability.

13. Apparatus for determining an integrity indicating parameter which indicates the integrity of positioning information determined from positioning information signals disseminated from a plurality of space vehicles of a satellite positioning system,
the apparatus comprising:
  a receiver configured to receive a plurality of integrity information parameters; and
  a processor configured to execute determining the integrity indicating parameter on the basis of an input parameter and said plurality of received integrity information parameters,
wherein, for determining the integrity indicating parameter, the processor of the apparatus is configured to execute
  calculating a first auxiliary parameter and a second auxiliary parameter on the basis of said input parameter and said plurality of received integrity information parameters, and
  determining an output parameter in dependence of said first and said second auxiliary parameters on the basis of an auxiliary relation which is a relation between said first and second auxiliary parameters and said output parameter and which corresponds to the first relation between said integrity indicating parameter and said input parameter, said auxiliary relation being provided in the form of a stored two-dimensional look-up table,
wherein said output parameter corresponds to said integrity indicating parameter or said integrity indicating parameter is determined from said output parameter.

14. Computer program product comprising computer program code configured to cause a processor of an apparatus to determine an integrity indicating parameter such that the apparatus is adapted to determine said integrity indicating parameter according to a method according to claim 1, said apparatus comprising:
  a receiver configured to receive a plurality of integrity information parameters; and
  a processor configured to execute determining the integrity indicating parameter on the basis of an input parameter and said plurality of received integrity information parameters.

* * * * *